United States Patent
Yahata et al.

[19]

[11] Patent Number: 6,087,577
[45] Date of Patent: Jul. 11, 2000

[54] MUSIC NAVIGATOR WITH VISUAL IMAGE PRESENTATION OF FINGERING MOTION

[75] Inventors: Takashi Yahata, Hamura; Shigeru Matsuyama, Mitaka, both of Japan

[73] Assignee: Casio Computer Co., Ltd., Tokyo, Japan

[21] Appl. No.: 09/103,740

[22] Filed: Jun. 24, 1998

[30] Foreign Application Priority Data

Jul. 1, 1997 [JP] Japan .................................. 9-188944
Oct. 21, 1997 [JP] Japan .................................. 9-305056
Mar. 24, 1998 [JP] Japan .................................. 10-093918

[51] Int. Cl.[7] .......................... G09B 15/00; G09B 15/02; G09B 15/08
[52] U.S. Cl. ........................ 84/478; 84/470 R; 84/477 R; 84/485 R; 84/601; 84/609
[58] Field of Search ..................... 84/601–602, 609–613, 84/634–637, 649–652, 666–669, 470 R, 477 R, 478, 484, 485 R

[56] References Cited

U.S. PATENT DOCUMENTS 5,392,682  2/1995  McCartney-Hoy ................... 84/470 R

*Primary Examiner*—Robert E. Nappi
*Assistant Examiner*—Marlon Fletcher
*Attorney, Agent, or Firm*—Frishauf, Holtz, Goodman, Langer & Chick, P.C.

[57] ABSTRACT

A music navigator provides a visual image indication or presentation of fingering motion of a hand in playing notes. In an embodiment, the music navigator employs a fingered music storage and a hand image device. When music is played on a keyboard instrument, the music navigator reads fingered music data and selects appropriate hand image data indicative of fingering motion (e.g., turning over or under of a finger) in playing a current note for visual display. In another embodiment, the music navigator provides a sequence of hand images representative of fingering motion in playing notes in a motion picture manner.

32 Claims, 59 Drawing Sheets

| NOTE ON | |
|---|---|
| C3 | |
| B28 | |
| 21 | E1 |
| 0.5 | |
| 0.3 | |
| NOTE OFF | |
| C3 | E2 |
| 0 | |
| NOTE ON | |
| D3 | |
| B8 | |
| 22 | E3 |
| 0.5 | |
| 0.3 | |
| NOTE OFF | |
| D3 | E4 |
| 0 | |
| NOTE ON | |
| E3 | |
| B10 | |
| 23 | E5 |
| 0.5 | |
| 0.35 | |
| NOTE OFF | |
| E3 | E6 |
| 0 | |
| NOTE ON | |
| F3 | |
| B15 | |
| 21 | E7 |
| 0.5 | |
| 0.3 | |
| NOTE OFF | |
| F3 | E8 |
| 0 | |

FIG.45

| |
|---|
| REST TIME |
| NOTE-TO-NOTE TIME |
| CURRENT NOTE |
| NEXT NOTE |
| CURRENT FINGER |
| NEXT FINGER |
| BIAS |
| NOTE TIME COUNTER |
| TEMPO COUNTER |
| ELAPSED TIME COUNTER |
| DISPLAY COUNTER |
| REST FLAG |
| SHIFT FLAG |

FIG.53

| CUR FINGER | NEXT FINGER | (NEXT NOTE)-(CURRENT NOTE) |
|---|---|---|
| 1 | 1 | = -12 |
| 1 | 1 | = -11 |
| 1 | 1 | ⋮ |
| 1 | 1 | = 0 |
| 1 | 1 | ⋮ |
| 1 | 1 | = 11 |
| 1 | 1 | = 12 |
| 1 | 2 | = -12 |
| 1 | 2 | ⋮ |
| 1 | 2 | = 12 |
| ≈ | ≈ | ≈ |
| 1 | 5 | =12 |
| 2 | 1 | = -12 |
| ≈ | ≈ | ≈ |
| 5 | 5 | = -12 |
| 5 | 5 | ⋮ |
| 5 | 5 | = 12 |

BIAS=(3-1)*2=4
(NEXT NOTE)-(CUR NOTE)=-5

C4+(-5-4)*1/3=C4-3

C4+(-5-4)*2/3=C4-6

C4+(-5-4)*3/3=C4-9

MUSIC NAVIGATOR WITH VISUAL IMAGE PRESENTATION OF FINGERING MOTION

BACKGROUND OF THE INVENTION

The present invention relates to music navigators which guide a player to perform music with navigation display. More specifically, the invention pertains to an apparatus and method for controlling navigating on display for music performance on a music instrument, such as a keyboard, and a storage medium on which a computer-readable navigation display control program is recorded.

Electronic music instruments having a keyboard music navigator feature are known. A typical keyboard music navigator employs key lights (e.g., LEDs) arranged along a music keyboard so as to correspond to respective keys. When music is played, the music navigator reads music data and timely turns on a key light corresponding to a key to be played, thus helping a player perform the music. An improved keyboard music navigator has been proposed, in which fingered music data is stored and a picture of a hand is printed on an instrument panel. LED segments are disposed at respective fingers of the hand picture. In operation, the music navigator reads fingered music data, and timely selects and turns on LED segment(s) of finger(s) to be used as well as selecting and turning on appropriate key light(s), thus informing a player of finger(s) to be used to play note(s).

The prior art keyboard music navigator has failed, however, to indicate the manner how a finger is moved and positioned to play a note since it merely indicates a note (key) to play and a finger to be used to play the note.

In general, music performance on a music keyboard involves complicated control of fingers including turning over and under. For example, when you play an ascending major scale of CDEFGABC on a keyboard instrument, you begin with the right hand thumb, index and middle fingers for CDE, respectively and then you have to control the thumb to turn under the index and middle to reach and play the F note. Then, the remaining G to C notes are played with the index, middle, ring and little fingers, respectively. For a descending major scale of CBAGFEDC, you have to control the middle finger to turn over the thumb in changing a key to note E from F. Exercise on turning over and under takes a considerable time to learn but it is an essential skill for a keyboard player to have.

Clearly, the prior art keyboard music navigator has failed to indicate turning over and under of fingers.

SUMMARY OF THE INVENTION

It is, therefore, a general object of the invention to provide a music navigator capable of indicating a fingering motion of a hand in playing notes.

A specific object of the invention is to provide a music navigator capable of providing a visual image indication of turning over and under of fingers.

Another object of the invention is to provide a music navigator capable of providing visual and animated hand image presentation of fingering motion in playing notes.

A further object of the invention is to provide a music navigator capable of displaying a motion picture of fingering actions of a hand in playing notes.

A still further object of the invention is to provide a music navigator capable of displaying an image sequence of a moving hand in playing notes.

In accordance with an aspect of the invention, there is provided. an apparatus for controlling navigation display for music performance, which comprises: music piece storage means for storing data of a music piece, the data including information on musical notes and fingers to be played on a keyboard instrument; turning over and under providing means for providing information on turning over and under of fingers based on the data of the music piece; image storage means for storing a plurality of image data of a hand including indication of turning over and under; and display control means operative when the music piece is played for successively selecting appropriate ones of the plurality of image data based on the provided information on turning over and under to thereby provide visual image indication of turning over and under of fingers.

The turning over and under providing means may comprise storage means for storing the information on turning over and under so as to correspond to the data of the music piece.

The turning over and under providing means may comprise determining means for selectively determining turning over or under of a current finger from information on current and previous notes and current and previous fingers, the information included in the data of the music piece.

The plurality of image data may include image data of a hand in which a finger that turns over or under is distinctly indicated.

The plurality of image data may include image data of a hand in which a finger that turns over or under is distinctly indicated and an arrow showing direction of turning over or under of the finger is marked.

The data of the music piece may comprise a succession of event data each including data items of a note, a finger to be used to play the note, a duration of the note and a note-on time.

The turning over and under providing means may comprise determining means for selectively determining absence of turning over or under of a current finger from current and previous note and finger data included in the data of the music piece when a rest time longer than a predetermined time value exists between a previous note-off time and a current note-on time.

The turning over and under providing means may comprise determining means for selectively determining absence of turning over or under of a current finger from current and previous note and finger data included in the data of the music piece when a time difference between a previous note-on time and a current note-on time is longer than a predetermined time value.

The apparatus may further comprise tempo selecting means for selecting a tempo of the music piece, wherein the determining means comprises: computing means for computing the rest time so as to depend on the selected tempo; and comparing means for comparing the computed rest time with the predetermined time value.

In the alternative, the determining means may comprise: computing means for computing the time difference so as to depend on the selected tempo; and comparing means for comparing the computed time difference with the predetermined time value.

Another aspect of the invention provides an apparatus for controlling navigation display for music performance played on a keyboard instrument, which comprises: fingered music storage means for storing data of a music piece, the data comprising a succession of note records each including information on a note, a finger to be used to play the note and presence or absence of turning over or under of the finger;

image storage means for storing a plurality of image data of a hand each corresponding to a different one of combinations of a finger and presence or absence of turning over or under, in which such image data that corresponds to a combination of a finger and presence of turning over or under includes visual image indication of turning over or under; music reading means operative when the music piece is played for reading the succession of note records from the fingered music storage means at a tempo of play of the music piece; and image selecting and outputting means for selecting appropriate one of the plurality of image data based on a note record currently read by the music reading means and for outputting the selected image data for display control to thereby provide visual image indication of turning over and under of fingers.

Another aspect of the invention provides an apparatus for controlling navigation display for music performance played on a keyboard instrument, which comprises: fingered music storage means for storing data of a music piece, the data comprising a succession of note records each including information on a note and a finger to be used to play the note; image storage means for storing a plurality of image data of a hand each corresponding to a different one of combinations of a finger and presence or absence of turning over or under, in which such image data that corresponds to a combination of a finger and presence of turning over or under includes visual image indication of turning over or under; music reading means operative when the music piece is played for reading the succession of note records from the fingered music storage means at a tempo of play of the music piece; determining means for determining presence or absence of turning over or under of a current finger from current and previous note records read by the music reading means; and image selecting and outputting means for selecting appropriate one of the plurality of image data based on a current note record read by the music reading means and determined results from the determining means and for outputting the selected image data for display control to thereby provide visual image indication of turning over and under of fingers.

Another aspect of the invention provides an apparatus for controlling navigation display for music performance, which comprises: music piece storage means for storing data of a music piece, the data including information on musical notes and fingers to be played on a keyboard instrument; turning over and under providing means for providing information on turning over and under of fingers based on the data of the music piece; and display control signal producing means operative when the music piece is played for successively producing display control signals based on the provided information, the display control signals convertible to a sequence of visual images including indication of turning over and under of fingers.

Another aspect of the invention provides an apparatus for controlling navigation display for music performance played on a keyboard instrument, which comprises: fingered music storage means for storing data of a music piece, the data comprising a succession of note records each including information on a note, a finger to be used to play the note and presence or absence of turning over or under of the finger; music reading means operative when the music piece is played for reading the succession of note records from the fingered music storage means at a tempo of play of the music piece; and display control signal producing means for producing a display control signal based on a note record currently read by the music reading means; the display control signal convertible to a visual image including indication of presence or absence of turning over or under of a current finger.

Another aspect of the invention provides an apparatus for controlling navigation display for music performance played on a keyboard instrument, which comprises: fingered music storage means for storing data of a music piece, the data comprising a succession of note records each including information on a note and a finger to be used to play the note; music reading means operative when the music piece is played for reading the succession of note records from the fingered music storage means at a tempo of play of the music piece; determining means for determining presence or absence of turning over or under of a current finger from current and previous note records read by the music reading means; and display control signal producing means for producing a display control signal based on a current note record read by the music reading means and determined results from the determining means, the display control signal convertible to a visual image including indication of presence or absence of turning over or under of a current finger.

Another aspect of the invention provides an apparatus for controlling navigation display for music performance played on a keyboard instrument, which comprises: fingered music storage means for storing data of a music piece, the data comprising a succession of note records each including information on a note and a finger to be used to play the note; image storage means for storing a plurality of image data of a hand in fingering action, each corresponding to a different one of combinations of old and new notes and old and new fingers; music reading means for reading the succession of note records from the fingered music storage means at a tempo of play of the music piece; and display control means for selecting appropriate image data from the plurality of image data based on current and next note records read by the music reading means and for outputting the selected image data for display control to thereby provide visual image presentation of fingering of a hand in playing notes, including indication of turning over and under of fingers.

Another aspect of the invention provides an apparatus for controlling navigation display for music performance played on a music instrument, which comprises: fingered music storage means for storing data of a music piece, the data comprising a succession of note records each including information on a note and a finger to be used to play the note; image storage means for storing a plurality of image data of a hand in fingering action, each corresponding to a different one of combinations of notes and fingers, the notes including old and new ones and the fingers including old and new ones; music reading means for reading the succession of note records from the fingered music storage means at a tempo of play of the music piece; and display control means responsive to the music reading means for selecting appropriate image data from the plurality of image data based on note records including current and next ones read by the music reading means and for outputting the selected image data for display control to thereby provide visual image presentation of fingering of a hand in playing notes.

Each of the note records may include, as the information on the note, a note-on or note-off command, a note number and a note-on or note-off time and, as the information on the finger, a finger number indicative of a finger to be used to play the note on a keyboard instrument.

The image storage means may comprise look-up table means which stores the plurality of image data each addressable by arguments of new and old fingers and note difference of a new note from an old note.

The display control means may comprise means for selecting, as the appropriate image data, a sequence of image data representative of fingering motion of a hand in playing current and next notes in a motion picture manner.

The display control means may comprise: segmenting means for dividing a time interval between a current note time and a next note time into a plurality of time segments; selecting means for selecting, for each of the plurality of time segments, appropriate image data of a hand from the plurality of image data based on current and next notes and current and next fingers; and outputting means for outputting the selected image data at a time of each time segment to thereby provide visual and animated image presentation of fingering motion in playing notes.

Another aspect of the invention provides an apparatus for controlling navigation display for music performance played on a keyboard instrument, comprising: fingered music storage means for storing data of a music piece, the data comprising a succession of note records each including information on a note and a finger to be used to play the note; image storage means for storing a plurality of image data of a hand in action of playing a note, each corresponding to a different one of combinations of old and new notes and old and new fingers; music reading means for reading the succession of note records from the fingered music storage means at a tempo of play of the music piece; determining means responsive to the music reading means for determining whether a rest time longer than a predetermined time value exists between a current note-off time and next note-on time; image selecting means operative when the determining means has found the rest time longer than the predetermined time value for selecting image data of a hand from the plurality of image data based on a current note record read by the music reading means; and image shifting and outputting means for shifting display position of, the selected image data and for outputting resultant image data to thereby provide visual image presentation of a moving hand.

In accordance with a further aspect of the invention, there is provided a method for controlling navigation display for music performance, which comprises the steps of: storing data of a music piece, the data including information on musical notes and fingers to be played on a keyboard instrument; providing means for providing information on turning over and under of fingers based on the data of the music piece; storing a plurality of image data of a hand including indication of turning over and under; and successively selecting appropriate ones of the plurality of image data based on the provided information on turning over and under, when the music piece is played, to thereby provide visual image indication of turning over and under of fingers.

Another aspect of the invention provides a method for controlling navigation display for music performance played on a keyboard instrument, which comprises the steps of: storing data of a music piece, the data comprising a succession of note records each including information on a note, a finger to be used to play the note and presence or absence of turning over or under of the finger; storing a plurality of image data of a hand each corresponding to a different one of combinations of a finger and presence or absence of turning over or under, in which such image data that corresponds to a combination of a finger and presence of turning over or under includes visual image indication of turning over or under; reading the succession of note records at a tempo of play of the music piece; and selecting appropriate one of the plurality of image data based on a note record currently read and outputting the selected image data for display control to thereby provide visual image indication of turning over and under of fingers.

Another aspect of the invention provides a method for controlling navigation display for music performance played on a keyboard instrument, which comprises the steps of: storing data of a music piece, the data comprising a succession of note records each including information on a note and a finger to be used to play the note; storing a plurality of image data of a hand each corresponding to a different one of combinations of a finger and presence or absence of turning over or under, in which such image data that corresponds to a combination of a finger and presence of turning over or under includes visual image indication of turning over or under; reading the succession of note records at a tempo of play of the music piece; determining presence or absence of turning over or under of a current finger from current and previous note records read; and selecting appropriate one of the plurality of image data based on a current note record read and determined results and outputting the selected image data for display control to thereby provide visual image indication of turning over and under of fingers.

Another aspect of the invention provides a method for controlling navigation display for music performance played on a keyboard instrument, comprising the steps of: storing data of a music piece, the data comprising a succession of note records each including information on a note and a finger to be used to play the note; storing a plurality of image data of a hand in fingering action, each corresponding to a different one of combinations of old and new notes and old and new fingers; reading the succession of note records at a tempo of play of the music piece; and selecting appropriate image data from the plurality of image data based on current and next note records read and outputting the selected image data for display control to thereby provide visual image presentation of fingering of a hand in playing notes, including indication of turning over and under of fingers.

Another aspect of the invention provides a method for controlling navigation display for music performance played on a keyboard instrument, which comprises the steps of: storing data of a music piece, the data comprising a succession of note records each including information on a note and a finger to be used to play the note; storing a plurality of image data of a hand in fingering action, of playing a note, each corresponding to a different one of combinations of old and new notes and old and new fingers; reading the succession of note records at a tempo of play of the music piece; determining whether a rest time longer than a predetermined time value exists between a current note-off time and next note-on time; selecting image data of a hand from the plurality of image data based on a current note record read when the rest time longer than the predetermined time value has been found; and shifting display position of the selected image data and outputting resultant image data to thereby provide visual image presentation of a moving hand.

In accordance with a further aspect of the invention, there is provided a storage medium on which a program is recorded, the program readable by a computer for controlling the computer to function as: music piece storage means for storing data of a music piece, the data including information on musical notes and fingers to be played on a keyboard instrument; turning over and under providing means for providing information on turning over and under based on the data of the music piece; image storage means for storing a plurality of image data of a hand including indication of turning over and under; and display control means operative when the music piece is played for successively selecting appropriate ones of the plurality of image data based on the provided information on turning over and under to thereby provide visual image indication on turning over and under of fingers.

Another aspect of the invention provides a storage medium on which a program is recorded, the program readable by a computer for controlling the computer to function as: fingered music storage means for storing data of a music piece, the data comprising a succession of note records each including information on a note, a finger to be used to play the note and presence or absence of turning over or under of the finger; image storage means for storing a plurality of image data of a hand each corresponding to a different one of combinations of a finger and presence or absence of turning over or under, in which such image data that corresponds to a combination of a finger and presence of turning over or under includes visual image indication of turning over or under; music reading means operative when the music piece is played for reading the succession of note records from the fingered music storage means at a tempo of play of the music piece; and image selecting and outputting means for selecting appropriate one of the plurality of image data based on a note record currently read by the music reading means and for outputting the selected image data for display control to thereby provide visual image indication of turning over and under of fingers.

Another aspect of the invention provides a storage medium on which a program is recorded, the program readable by a computer for controlling the computer to function as: fingered music storage means for storing data of a music piece, the data comprising a succession of note records each including information on a note and a finger to be used to play the note; image storage means for storing a plurality of image data of a hand each corresponding to a different one of combinations of a finger and presence or absence of turning over or under, in which such image data that corresponds to a combination of a finger and presence of turning over or under includes visual image indication of turning over or under; music reading means operative when the music piece is played for reading the succession of note records from the fingered music storage means at a tempo of play of the music piece; determining means for determining presence or absence of turning over or under of a current finger from current and previous note records read by the music reading means; and image selecting and outputting means for selecting appropriate one of the plurality of image data based on a current note record read by the music reading means and determined results from the determining means and for outputting the selected image data for display control to thereby provide visual image indication of turning over and under of fingers.

Another aspect of the invention provides provides a storage medium on which a program is recorded, the program readable by a computer for controlling the computer to function as: fingered music storage means for storing data of a music piece, the data comprising a succession of note records each including information on a note and a finger to be used to play the note; image storage means for storing a plurality of image data of a hand in fingering action, each corresponding to a different one of combinations of old and new notes and old and new fingers; music reading means for reading the succession of note records from the fingered music storage means at a tempo of play of the music piece; and display control means for selecting appropriate image data from the plurality of image data based on current and previous note records read by the music reading means and for outputting the selected image data for display control to thereby provide visual image presentation of fingering of a hand in playing notes, including indication of turning over and under of fingers.

Another aspect of the invention a storage medium on which a program is recorded, the program readable by a computer for controlling the computer to function as: fingered music storage means for storing data of a music piece, the data comprising a succession of note records each including information on a note and a finger to be used to play the note; image storage means for storing a plurality of image data of a hand in fingering action, each corresponding to a different one of combinations of old and new notes and old and new fingers; music reading means for reading the succession of note records from the fingered music storage means at a tempo of play of the music piece; determining means responsive to the music reading means for determining whether a rest time longer than a predetermined time value exists between a current note-off time and next note-on time; image selecting means operative when the determining means has found the rest time longer than the predetermined time value for selecting image data of a hand from the plurality of image data based on a current note record read by the music reading means; and image shifting and outputting means for shifting display position of, the selected image data and for outputting resultant image data to thereby provide visual image presentation of a moving hand.

BRIEF DESCRIPTION OF THE DRAWINGS

The above and other objects and features of the invention will become more apparent from the following description taken in conjunction with the accompanying drawings in which:

FIG. 45 shows variables used in hand display control in accordance with the sixth embodiment of the invention;

FIG. 53 is a table of three arguments used to look up a hand image in accordance with the sixth embodiment of the invention;

DETAILED DESCRIPTION OF THE PREFERRED EMBODIMENTS

The invention is now described in more detail with respect to the preferred embodiments thereof. Each preferred embodiment is implemented in an electronic music instrument having a music keyboard.

Figure 1:
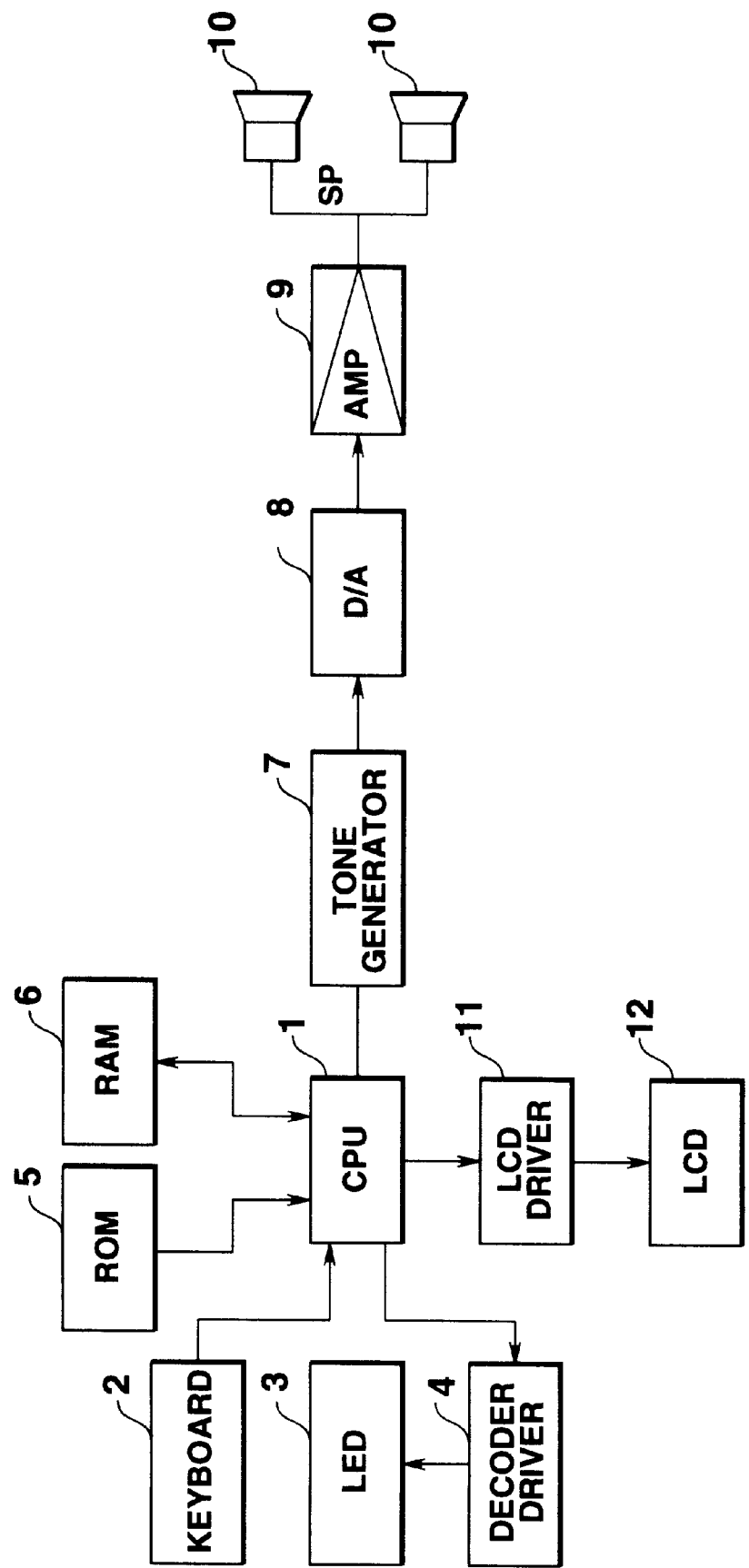
FIG. 1 is a block diagram of a hardware arrangement of an electronic music instrument in accordance with first to fifth embodiments of the invention.

FIG. 1 shows a system organization of an electronic music instrument common to the first to fifth embodiments of the invention. CPU 1 controls the entirety of the electronic instruments. In accordance with the invention, CPU 1 functions as determining means for determining turning over and under of fingers from stored music data and display control means for controlling display of a hand image sequence including visual image indication of turning over and under of fingers based on the determined results. CPU 1 has two timers (timers 1 and 2) for periodical timer interruption. A music keyboard 2 signals key operations to CPU 1. A display switch (not shown) is disposed near the keyboard 2. The display switch is used to enable or disable (turn on or off) navigation display for music performance, as will be described.

An LED 3 is an array of LEDs arranged along the keyboard 2. Each LED is disposed under a corresponding key, as a light source of the key. A decoder driver 4 decodes a key light on or off command from CPU 1 to turn on or off a corresponding LED. ROM 5 stores programs for controlling CPU 1, initial data, and music and image data for navigation display. RAM 6 includes a key data area for storing key data from the keyboard 2, and register and flag areas for temporarily storing those data required in execution of the programs.

A tone generator 7 generates or releases a tone signal in response to a note on or off command from CPU 1. A digital to analog converter 8 converts digital tone signal from the tone generator 7 to a corresponding analog signal. An amplifier 9 filters and level-controls the analog tone signal from the detail to analog converter 8 and supplies the resultant signal to a speaker 10. An LCD 12 displays a sequence of hand images showing fingerings in playing notes. An LCD driver 11 drives LCD 11 in response to display data from CPU 1.

Figure 2:
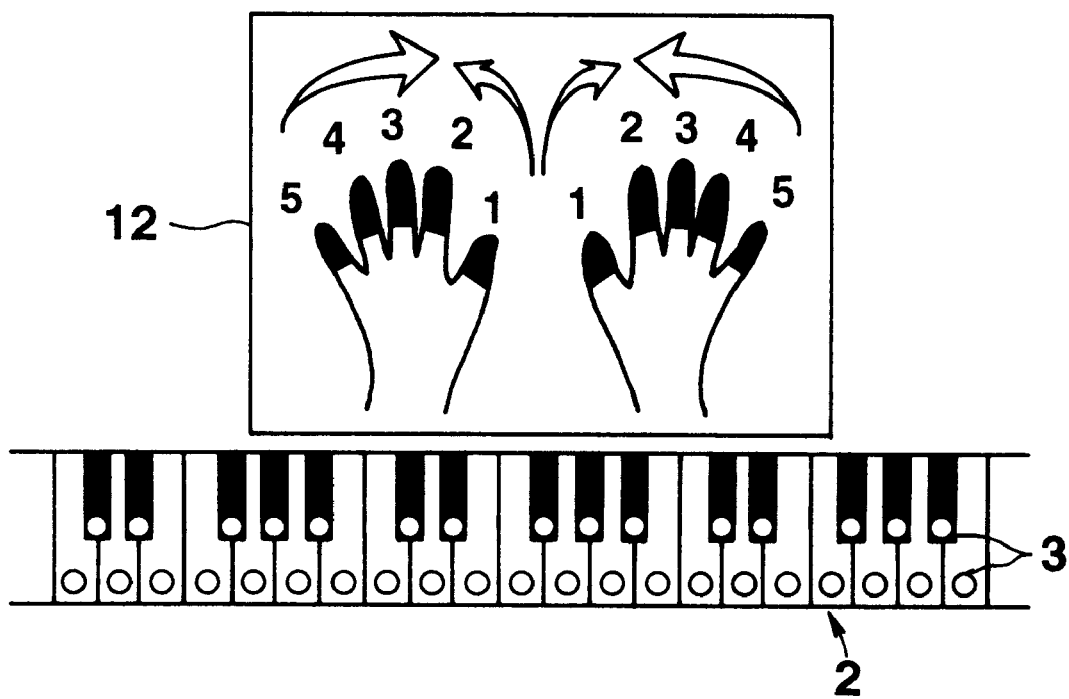
FIG. 2 is a simplified view of a keyboard and a LCD, showing LCD image segments and key lights in accordance with the first to third embodiments of the invention.

FIG. 2 shows an arrangement of LED array 3 corresponding to respective keys of the keyboard 2. FIG. 2 also shows image objects displayed on LCD 12 for displaying fingerings. The image objects include those of respective fingers of right and left hands, finger numbers, and arrows for showing direction of turning over and under. In response to a key operation, a corresponding key is lit up. At the same time, on LCD 12, an image object of a finger used to play the key is highlighted and the image object of a corresponding finger number is displayed. Further, a right or left direction arrow is selectively displayed to show direction of turning over or under of the finger, as will be described.

Figure 3:
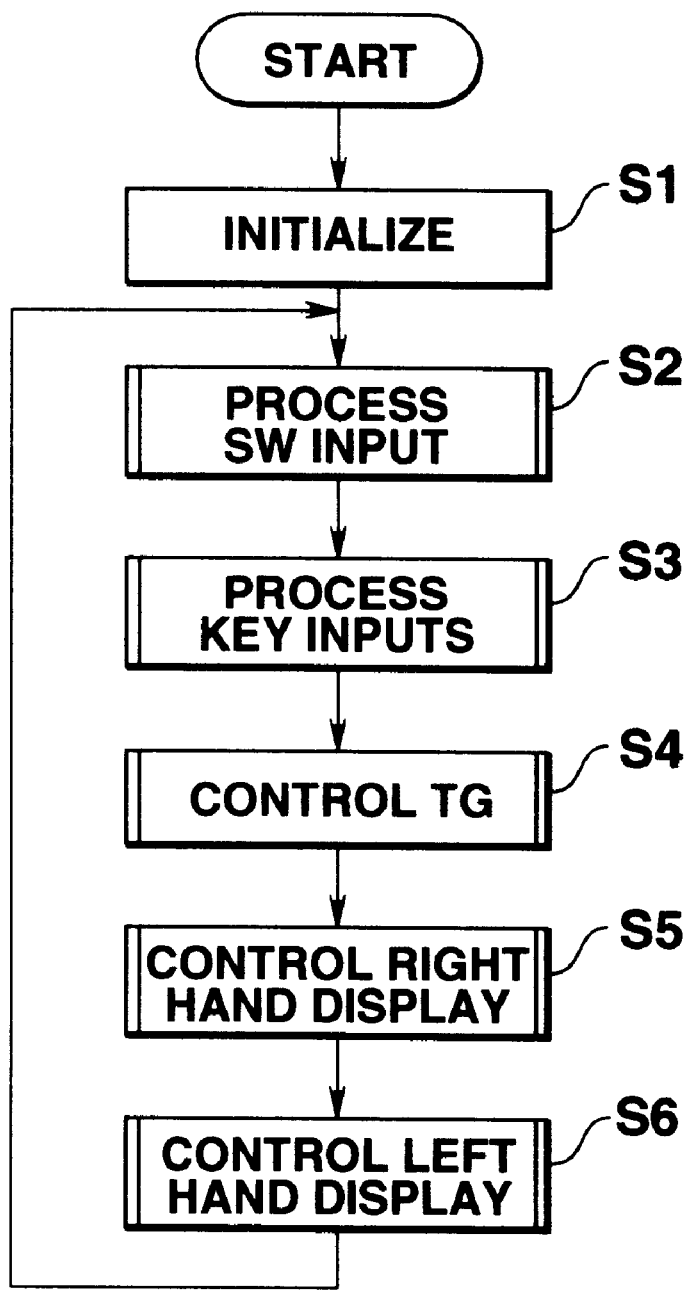
FIG. 3 is a flowchart of a main program in accordance with the invention.

FIG. 3 shows a flowchart of a main program executed by CPU. After initializing the system (step S1), CPU 1 repeatedly executes a loop process including process switch input (step S2), process key inputs (step S3), control tone generator (step S4) control right hand display (step S5) and control left hand display (step S6). The process switch input step S2, process key inputs step S3 and control tone generator step S4 are common to respective embodiments whereas the control right hand display step S5 and control left hand display step S6 are unique to respective embodiments.

Figure 4:
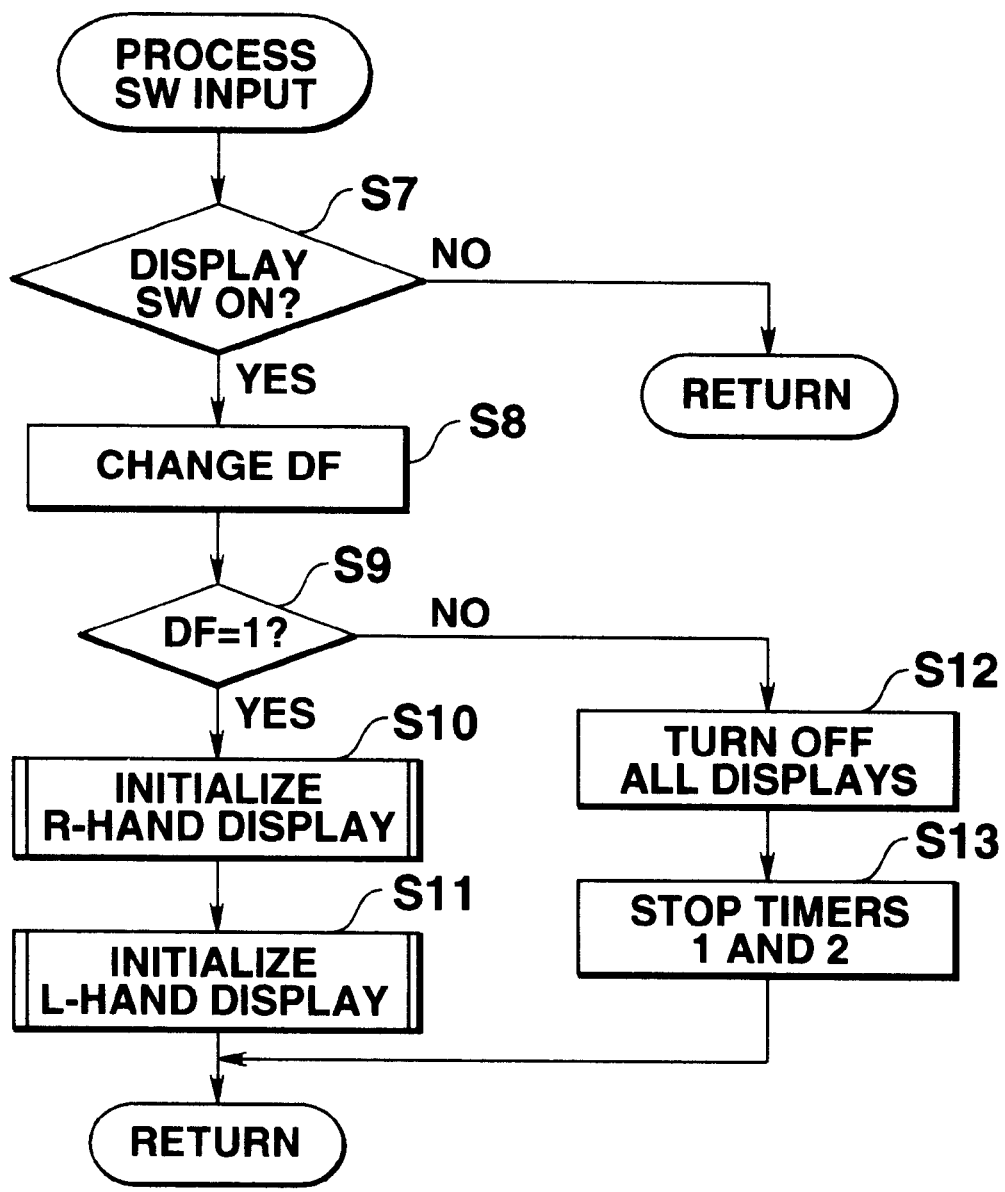
FIG. 4 is a flowchart of a process switch input routine called in step S2 in FIG. 3.

FIG. 4 shows a flowchart of the process switch input step S2. Step S7 checks if the display switch is on. When the display switch is off, the process returns to the main program. When the display switch is on, step S8 changes a display flag DF. Step S9 checks if the flag DF is "1". In the affirmative, step 10 initializes right hand display and step S11 initializes left hand display. In the negative, step S12 turns off all displays and step S13 stops timers 1 and 2. Then, the process returns to the main program.

Figure 5:
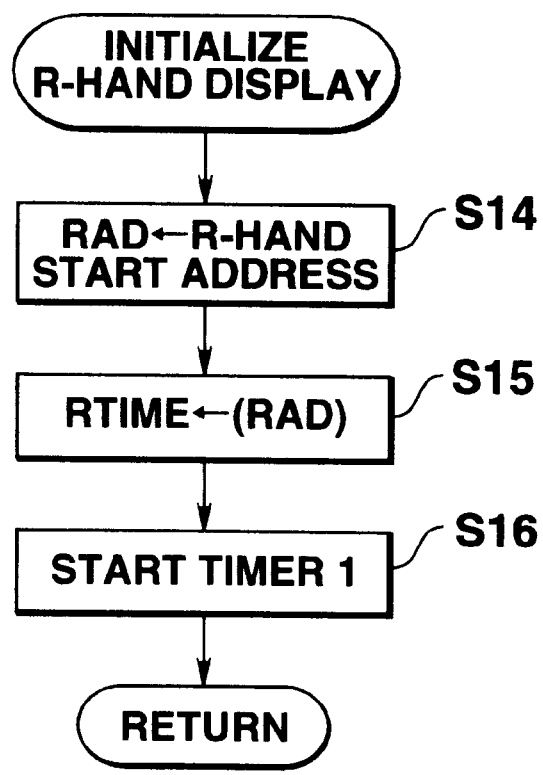
FIG. 5 is a flowchart of an initialize left hand display routine called in step S10 in FIG. 4.
Figure 6:
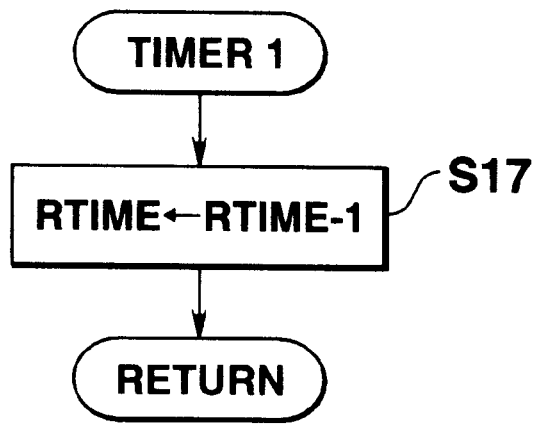
FIG. 6 is a flowchart of a timer 1 interrupt routine.

FIG. 5 shows a flowchart of the initialize right hand display step S10. Step S14 sets a right hand address pointer RAD to the start address of the right hand part of music. Step S15 sets a timer register RTIME to data stored at RAD. The data (RAD) indicates an event to event time. Step S16 starts the timer 1, thus enabling a timer 1 interupt routine. FIG. 6 shows the timer 1 interrupt routine executed each time when the timer 1 signals an interrupt request. In the timer 1 interrupt routine, the time data RTIME is decremented (step S17).

Figure 7:
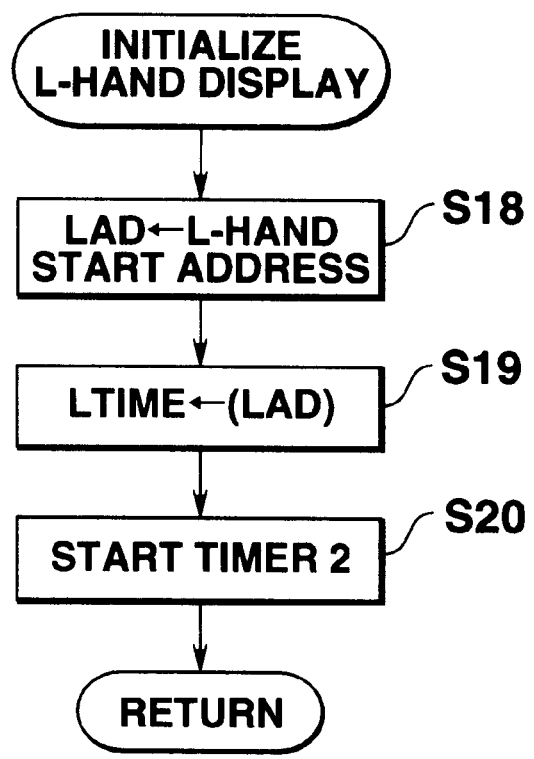
FIG. 7 is a flowchart of an initialize left hand display routine called in step S11 in FIG. 4.
Figure 8:
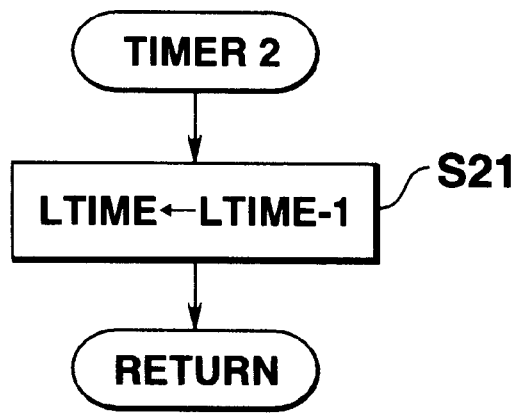
FIG. 8 is a flowchart of a timer 2 interrupt routine.

FIG. 7 shows a flowchart of the initialize left hand display step S11. Step S18 sets a left hand address pointer LAD to the start address of the left hand part of music. Step S19 sets a timer register LTIME to the data stored at LAD. The data (LAD) indicates an event to event time. Step S20 starts the timer 2, thus enabling a timer 2 interrupt routine. FIG. 8 shows the timer 2 interrupt routine called each time when the timer 2 outputs an interrupt request signal. In the timer 2 interrupt routine, the time data LTIME is decremented (step S21).

Figure 9:
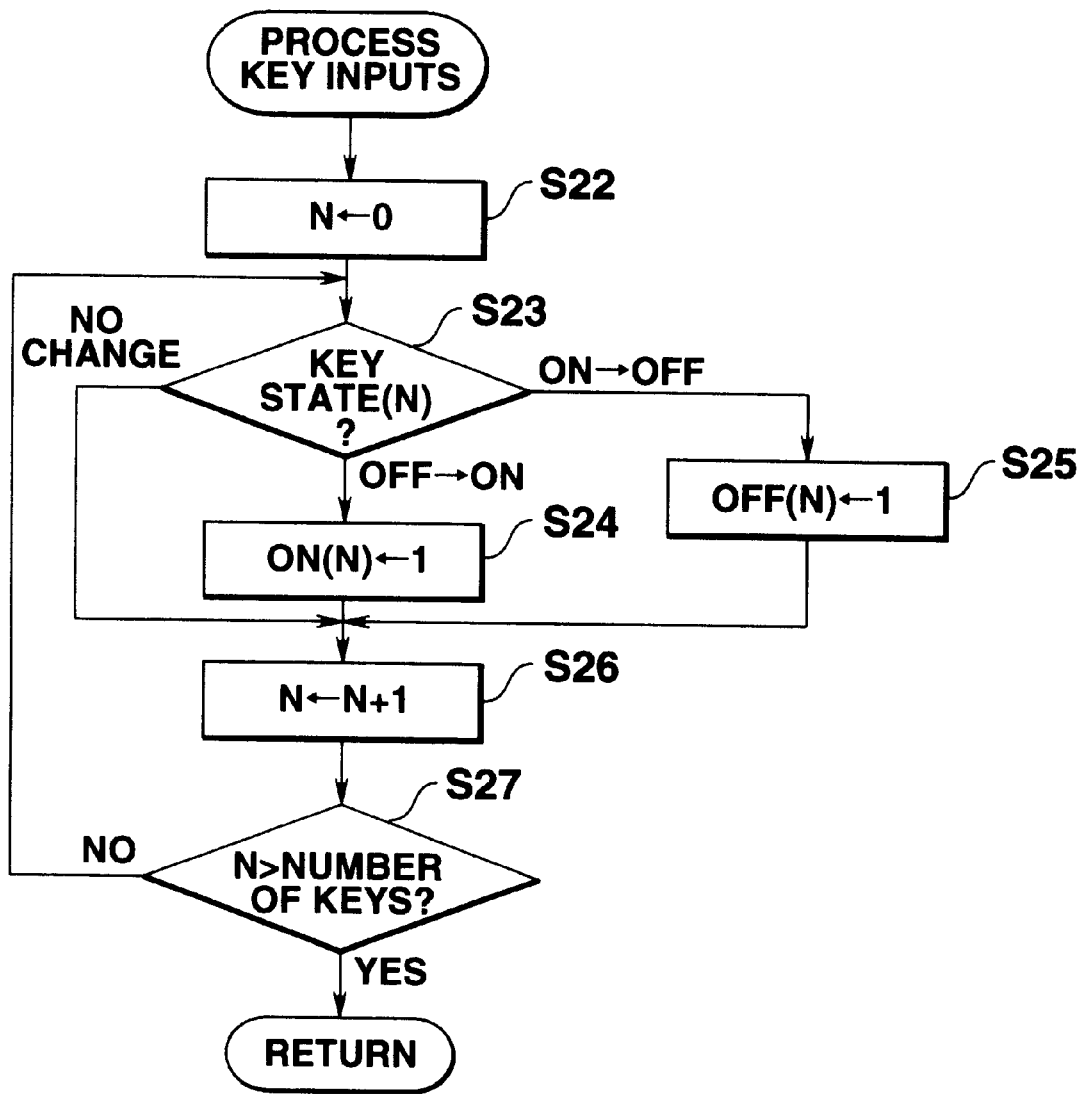
FIG. 9 is a flowchart of a process key input routine called in step S3 in FIG. 3.

FIG. 9 is a flowchart of the process key inputs step S3. Step S22 initializes a key pointer N to "0." In the loop of S23–S27, the step S23 checks the state change of a key pointed to by the key pointer N. It the key state changes to "ON" from "OFF", a corresponding key on flag ON (N) is set to "1" (step S24). It the keystate changes to "OFF" from "ON", corresponding key off flag OFF (N) is set to "1" (S25). Step S26 increments the key pointer N. Step S27 checks if the key pointer N has exceeded the number of keys. In the negative, the process returns to the step S23 to repeat the loop. In affirmative, the process returns to the main program.

Figure 10:
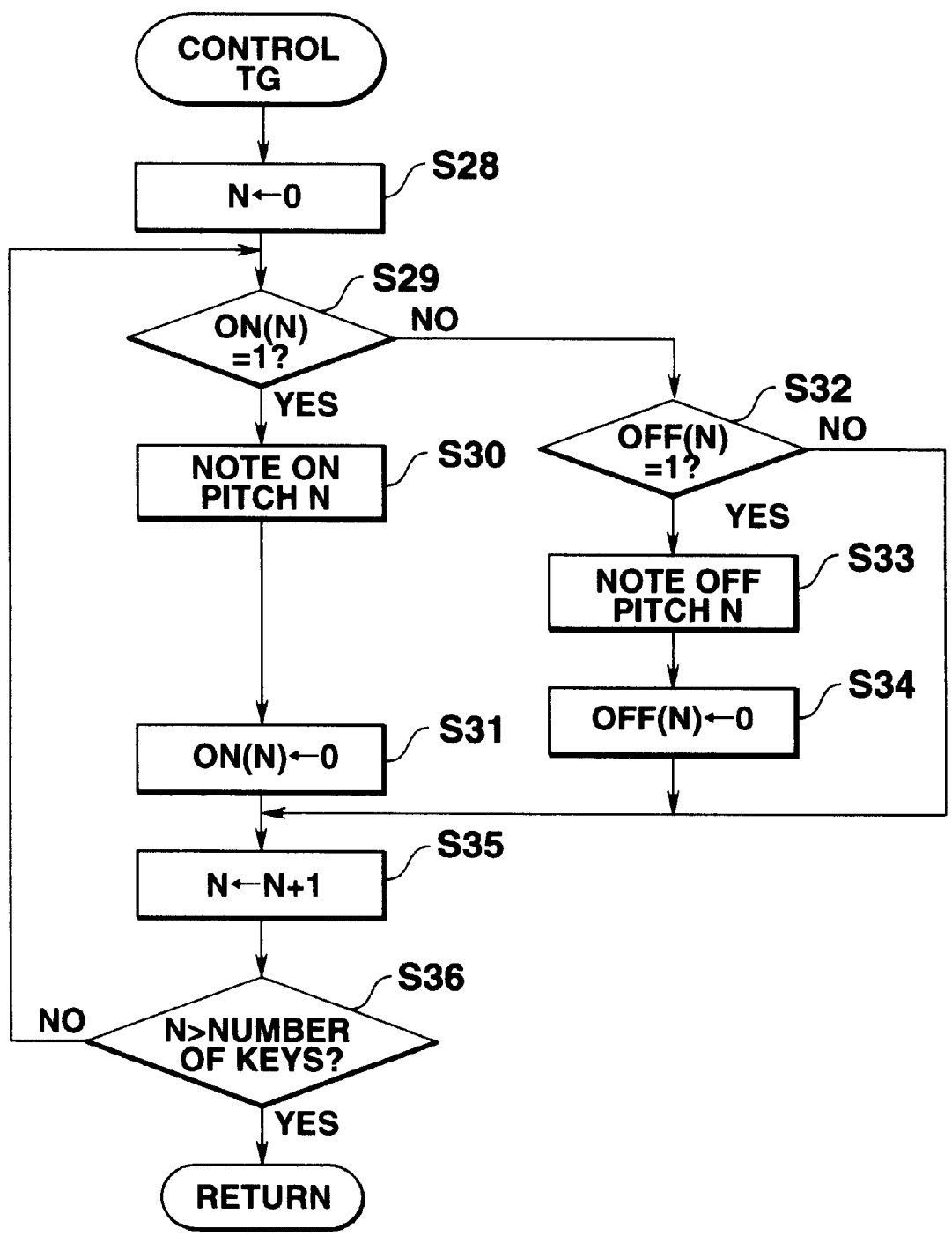
FIG. 10 is a flowchart of a control tone generator routine called in step S4 in FIG. 3.

FIG. 10 shows a flowchart of the control tone generator step S4. Step S28 initializes the key or note pointer N to "0." In the loop of S29-S36, step 29 checks the key on flag (N) of the note N to see whether it is "1." In the affirmative, CPU 1 sends a note on command including note number N as pitch to the tone generator 7, thus controlling the tone generator 7 to generate a corresponding tone (step 30). Then, step 31 resets the key on flag ON (N) to "0." If the step 29 finds the key on flag ON (N) "0", step 32 tests the key off flag OFF (N) to see whether it is "1". In the affirmative, CPU 1 sends a note off command to the tone generator 7, thus controlling the tone generator to release the tone of pitch N (step 33). Then, step 34 resets the key off flag OFF (N) to "0". A step 35 increments the key pointer N. Step 36 checks if the key pointer N has exceeded the number of keys. In the negative, the process returns to the step 29 to repeat the loop. In the affirmative, the process returns to the main program.

Features of the first embodiment are now described.

Figure 11A:
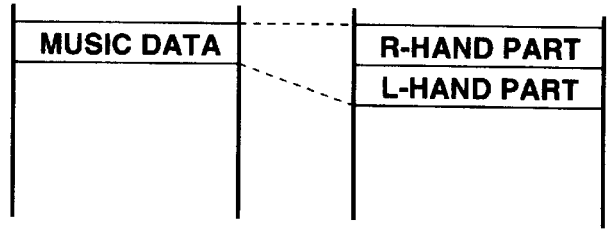
FIGS. 11 is a storage map of fingered music data in accordance with the first embodiment of the invention.
Figure 11B:
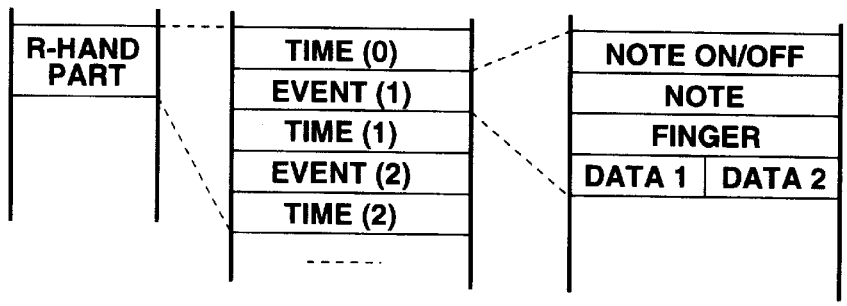
Figure 11C:
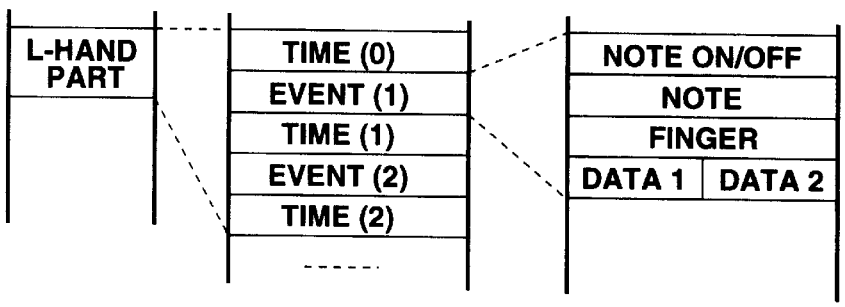

FIGS. 11A–11C show data structures of fingered music data stored in ROM 5 in accordance with the first embodiment. The fingered music data comprises a right hand part and left hand part (see FIG. 11A). Each music part comprises a sequence of event records with event-to-event time data inserted between adjacent events as TIME (0), EVENT(1), TIME (1), EVENT (2), TIME (2) and so on (see FIGS. 11B and 11C). Each event record is stored at four consecutive addresses. The first address store 6 a note on or off code. The second address stores a note number. The third address stores a finger number indicative of a finger to be used to play the note. The fourth address stores DATA 1 (as higher bits) and DATA (as lower bits) for turning over or under of the finger. The DATA 1 indicates presence or absence of turning over or under. The presence of turning over or under is indicated by DATA 1=1 whereas absence of turning over and under is indicated by DATA 1=0. The DATA 2 indicates the direction of turning over or under. The DATA 2=1 indicates when the finger turns over or under in the left direction whereas the data 2=0 indicates when the finger turns over or under in the right direction.

Figure 12:
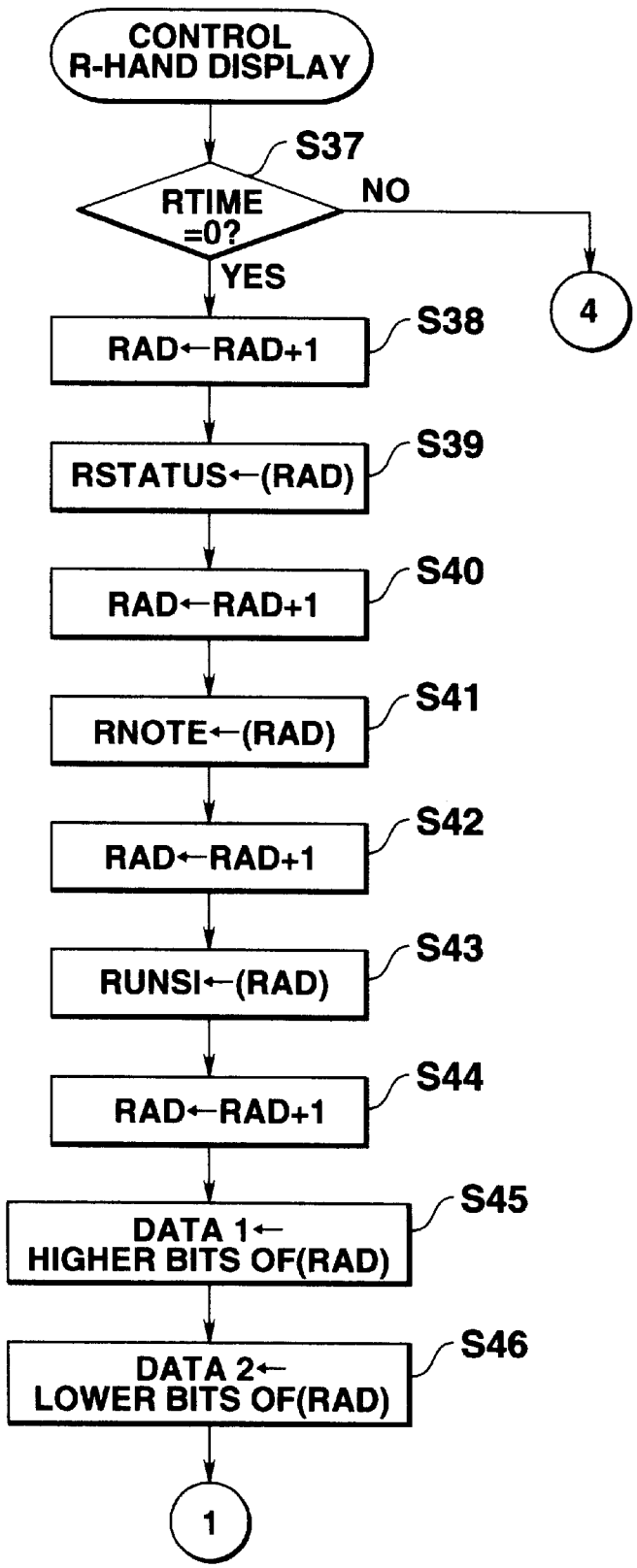
FIGS. 12–14 are flowcharts of a control right hand display routine in accordance with the first embodiment of the invention.
Figure 13:
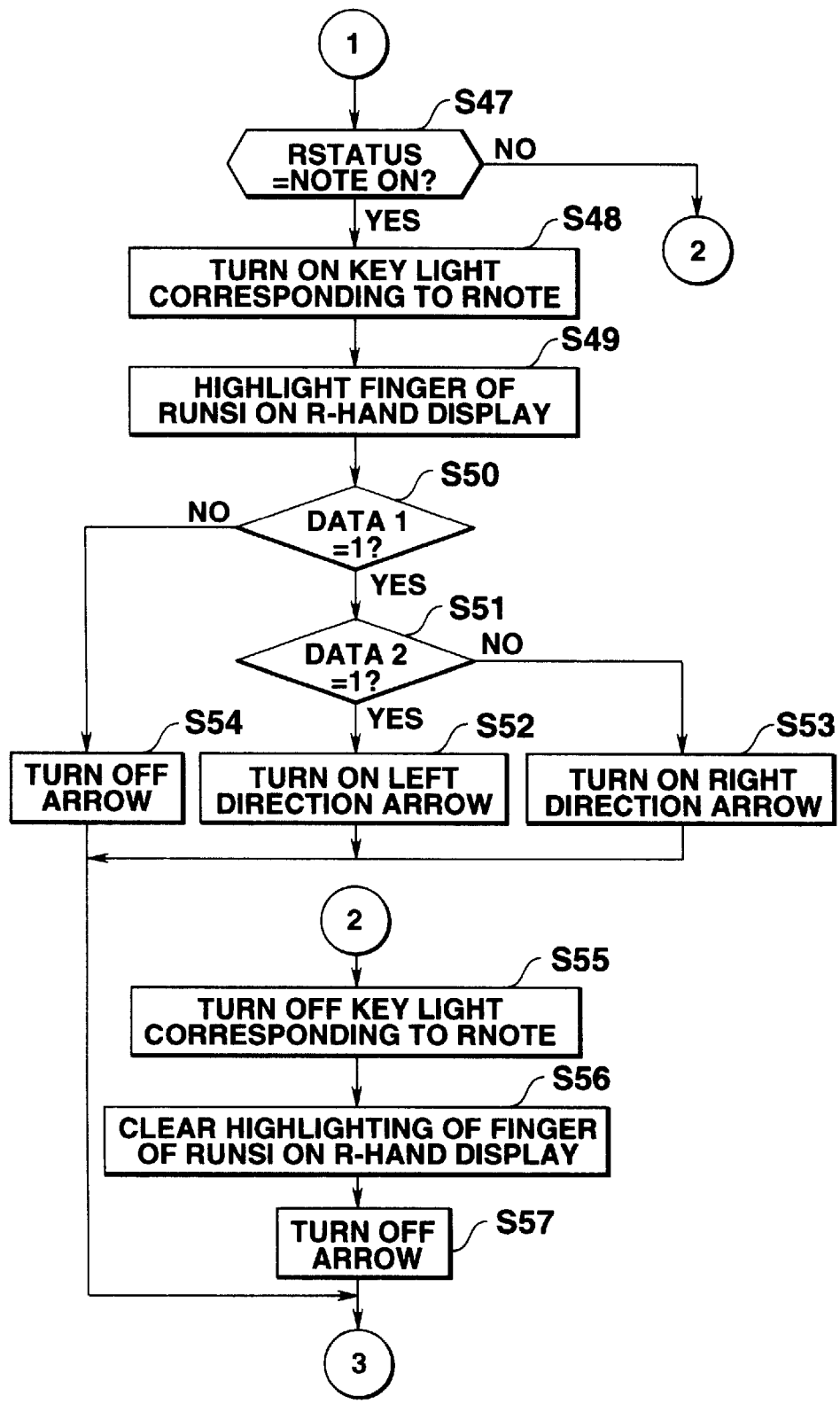
Figure 14:
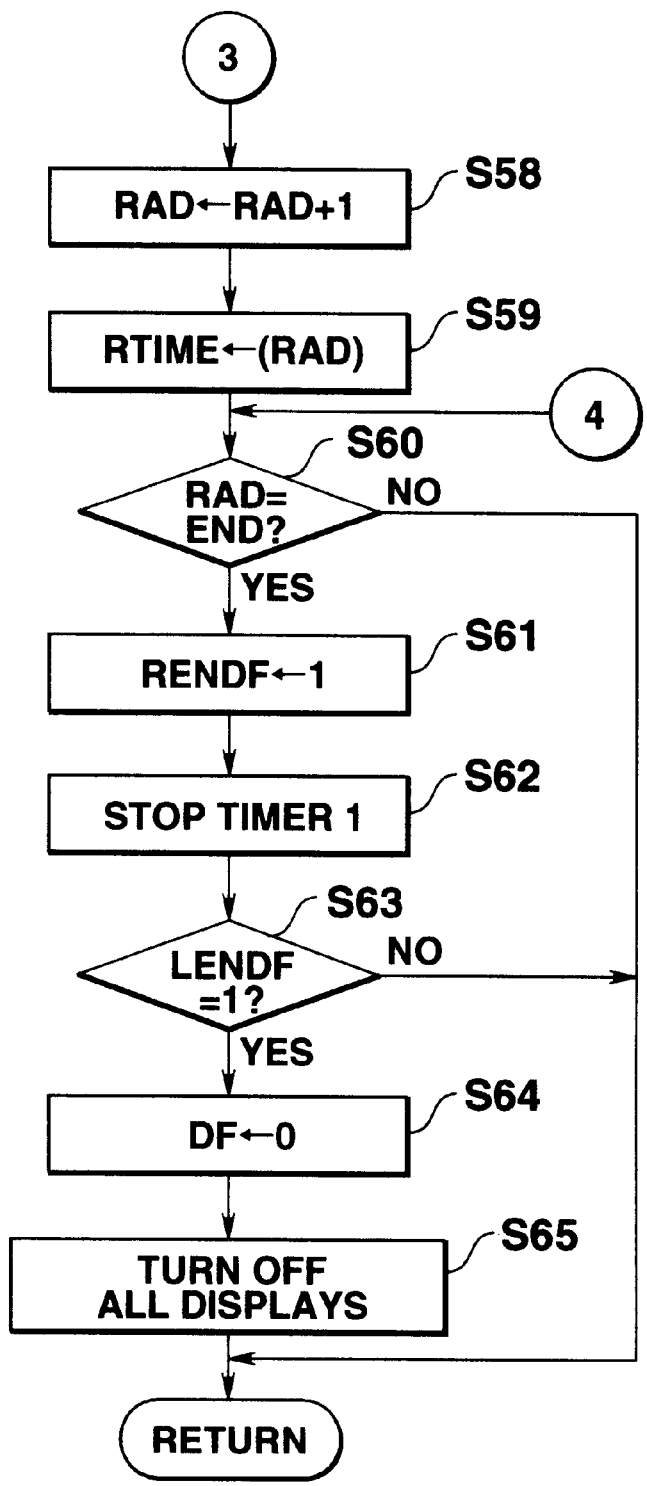

The control right hand display routine of the first embodiment is now described by the reference to FIGS. 12 to 14.

In FIG. 12, step S37 checks if RTIME=0, indicative of a new event time. In the affirmative, step S38 increments the right hand address pointer RAD. Step S39 loads the note on or off code (RAD) into register RSTATUS. Step S40 increments the address pointer RAD. Step S41 load the note number (RAD) into right note register RNOTE. Step S42 increments the address pointer RAD. Step S43 loads the finger number data (RAD) into finger register RUNSI. Step S44 increments the address pointer RAD. Step S45 loads the higher bits of RAD data, indicative presence or absence of turning over or under, into a register DATA 1. Step S46 loads the lower bits of RAD data, indicative direction of turning over and under, into a register DATA 2.

Then, in FIG. 13, step S47 tests the register RSTATUS to see whether it is a note on event, or note off event. In the case of note on event, step S48 turns on a key light (LED) corresponding to RNOTE.

Step S49 turns on or highlights a finger of RUNSI on a right hand display portion of the LCD 12 screen, and displays a corresponding finger number. Step S50 checks if DATA 1=1, indicative presence of turning over or under. In the affirmative, step S51 checks DATA 2 to see the direction of turning over or under. If DATA 2=1, step S52 turns on or displays the left direction arrow. If DATA 2=0, step S53 turns on the right direction arrow. If step S50 finds DATA 1=0, indicative of absence of turning over or under of the finger, there is no need of displaying an arrow showing direction of turning over or under. Step S54 turns off or clears an arrow if any. Step S54 may be omitted since an arrow display may be cleared at the time of note off (see step S57). If the step S47 finds a note off event from RSTATUS, step S55 turns off a key light (LED) corresponding to RNOTE. Step S56 clears highlighting of the finger of RUNSI from the left hand display screen and clears the corresponding finger number. Step S57 turns off of clears an arrow, if any, from the display screen. After step S54, S52, S53 or S57, step S58 (see FIG. 14) is executed to increment the right hand address pointer RAD. Step S59 loads the event-to-event time data (RAD) into RTIME. After the step S59 or after the step S37 finding RTIME≠0, step S60 tests RAD to see whether it has reached the end of the right hand music part. In the negative, the process returns to the main program. In the affirmative, step S61 set a flag RENDF to "1", indicative end of right hand display. Step S62 stops timer 1, thus inhibiting timer 1 interrupt routine (FIG. 6). Step S63 tests a flag LENDF to see whether it is "1", indicative end of left hand display. In the negative, the process returns to the main program. In the affirmative, step S64 sets the display flag DF to "0". Step S65 turns off all displays, and the process returns the main program.

The control left hand display routine of the first embodiment is now described by reference to FIGS. 15–17.

Figure 15:
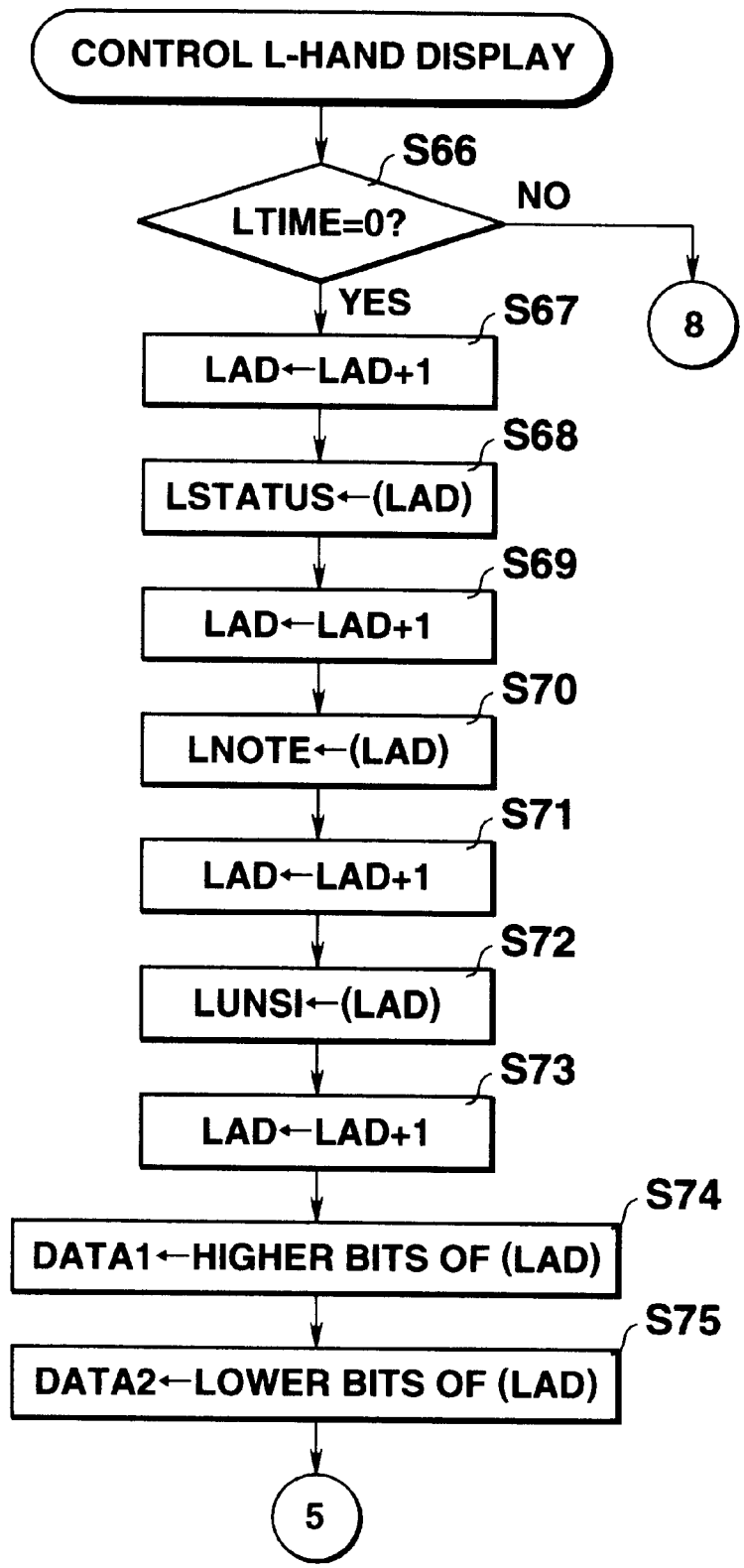
FIGS. 15–17 are flowcharts of a control left hand display routine in accordance with the a first embodiment of the invention.

In FIG. 15, step S66 checks if LTIME=0, indicative of a new event time of left hand music part. In the affirmative, step S67 increments the left hand music address pointer LAD. Step S68 loads the event-to-event time data (LAD) into the status register LSTATUS. Step S69 increments the address pointer LAD. Step S70 those the note number data (LAD) into a left note register LNOTE. Step S71 increments the address pointer LAD. Step S72 loads finger number data (LAD), indicative of a finger to be used to play the note, into a finger register LUNSI. Step S73 increments the address pointer LAD. Step S74 loads higher bits of LAD data, indicative of presence or absence of turning over or under of the finger, into a register DATA 1. A step S75 loads lower bits of LAD data, indicative of direction of turning over or under, into a register DATA 2.

Figure 16:
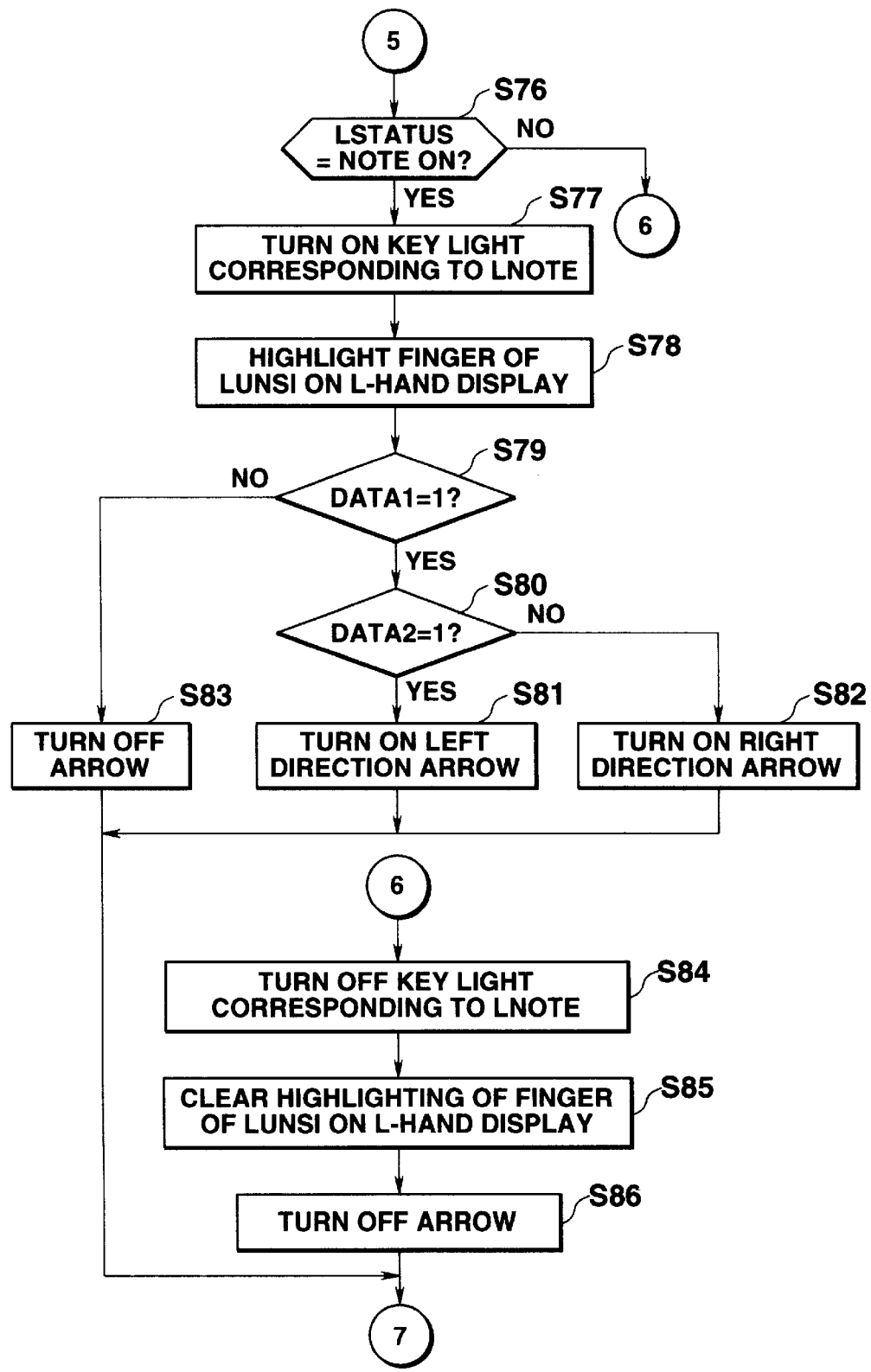
Figure 17:
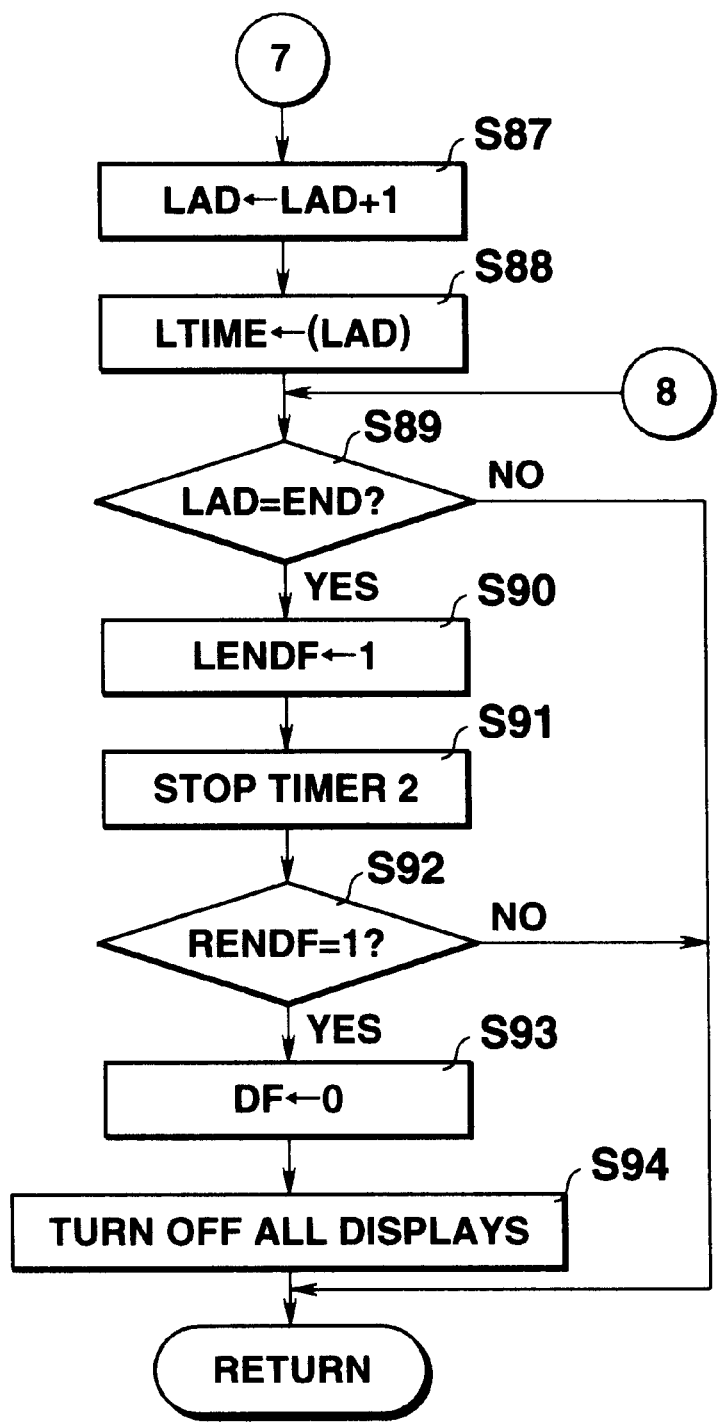

Then, in FIG. 16, step S76 checks the status register LSTATUS to see whether it is note on or note off event time. In the affirmative, step S77 turns on a key light (LED) corresponding to LNOTE. Step S78 highlights a finger of LUNSI on the left hand display of the LCD 12 display screen, and displays a corresponding finger number. Step S79 checks if DATA 1=1 indicative of presence of turning over or under of the finger. In the affirmative, step S80 checks DATA 2 to determine the direction of turning over or under. If DATA 2=1, step S81 turns on or displays the left direction arrow. If DATA 2=0, step S82 turns on or displays the right direction arrow.

If step S79 finds DATA 1=0, indicative of absence of turning over or under of the finger, there is no need of displaying an arrow showing direction of turning over or under. Step S89 turns off or clears an arrow, if any, from the left hand display screen. The step S83 may be omitted since an arrow display may be cleared at the time of note off (see step S86). If the step S76 finds a note off event from LSTATUS, step 84 turns off a key light corresponding to LNOTE. Step S85 clears highlighting of the finger of LUNSI and clears the corresponding finger number from the left hand display screen. Step 86 turns off or clears an arrow, if any, from the left hand display screen.

After step S83, S81, S82, or S86, step S87 (see FIG. 17) increments the left hand music address pointer LAD. Step S88 loads the event-to-event time data (LAD) into LTIME. After the step S88 or after the step S66 finding LTIME≠0, step S89 checks LAD to see whether it has reached end of the left hand music part. In the negative, the process returns to the main program. In the affirmative, step S90 sets a flag LENDF to "1", indicative end of the left hand display. Step S91 stops the timer 2, thus disabling the timer 2 interrupt routine (FIG. 8). Step S92 checks if RENDF=1, indicative end of the right hand display. In the negative the process to returns the main program. In the affirmative, step S93 resets the display flag DF to "0". Step S94 turns off all displays, and the process returns to the main program.

Figure 18A:
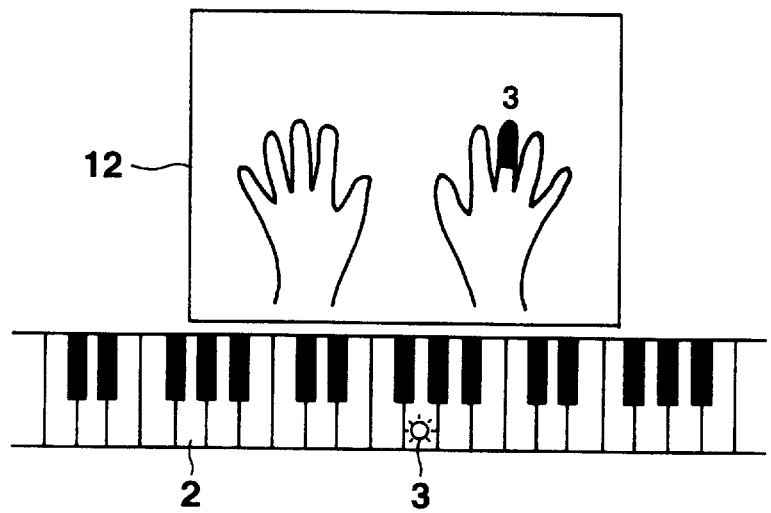
FIGS. 18A–C illustrate hand image presentations provided by the first embodiment of the invention.
Figure 18B:
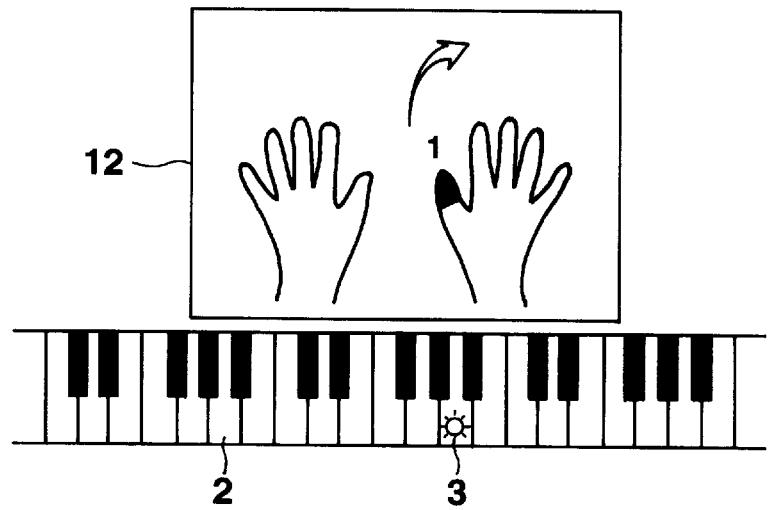
Figure 18C:
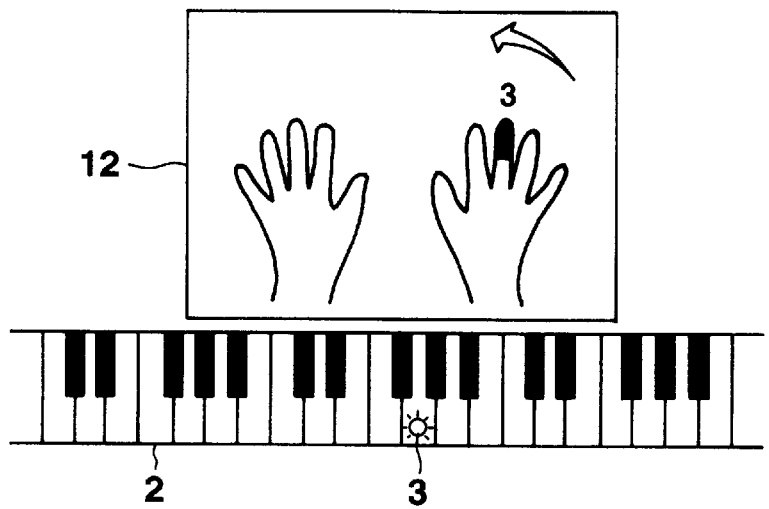

In this manner, the first embodiment employs a fingered music storage that stored fingered music data including information on notes and fingers to be used to play the notes and information on turning over and under of fingers. The first embodiment further employs a image storage which stores a plurality of image data of a hand including indication of turning over and under. When a music piece is played, CPU 1 reads the stored fingered music data at a tempo play of music piece. Based on a current note record from the fingered music storage, CPU 1 selects a appropriate image data for display control, thus providing visual image indication of turning over and under of fingers. For example, when the middle finger of right hand is used normally without turning over to play a note, a LCD 12 displays a highlighted middle finger and a corresponding finger number 3 on the left hand display section, as seen in FIG. 18A, and a corresponding key LED of the keyboard 2 is turned on. When the thumb of the right hand has to turn under to play a note, LCD 12 displays a highlighted thumb, corresponding finger number 1 and right direction arrow showing the direction of turning under on the right hand display section, as seen in FIG. 18B . Corresponding key LED of the keyboard 2 is also is turned on. When a player has to control the middle finger of the right hand so as to turn over to play a note, LCD 12 displays a highlighted middle finger, corresponding finger number 3 and left direction arrow on the right hand display section, as seen in FIG. 18C. Corresponding key LED of the keyboard 2 is also turned on. The visual image indication of turning over and under of fingers will greatly help a player play music on a keyboard instrument.

In the first embodiment, LCD 12 may be of either segment-driven type or dot (picture element)-matrix type. In LCD of segment-driven type, an individual image object (e.g., finger, arrow) is displayed or appears by statically driving a single or group of LCD segments disposed in the display panel. To control display of an image object, a CPU sends to a LCD driver segment turn on/off command(s) including information on segment number(s) indicative of such segment(s) that form(s) the image object Thus, each hand image data takes the form of a set of segment numbers or IDs. Image data selecting and outputting is done by selecting segment turn on/off commands and sending them as a display control signal to an LCD driver.

For LCD of dot-matrix type, an LCD driver or controller receives, from CPU, hand image data in the form of a set of dots or picture elements (pels). When updating a displayed hand image, CPU writes new hand image data into a storage, called frame or refresh buffer, in a LCD controller whereas the LCD controller periodically scans and reads the hand image data therefrom. Source data of a hand image may be represented either directly by data of a complete image or indirectly by a plurality of image object data each representative of an image object (e.g., background, keyboard, hand, arrow). In the latter case, complete image data is generated by selecting and combining a plurality of image object data. The combining may involve superimposing an image object (e.g., hand) on another image object (e.g., keyboard).

Thus, hand image data selecting and outputting is done by selecting or generating appropriate complete image data and sending them as a display control signal to an LCD driver or controller.

Whereas the first embodiment employs an LCD as a display for displaying a hand image, any suitable display, such as CRT, may be used for the purpose.

Therefore, irrespective of type of a display or data structure of image data, it can be said as follows.

In accordance with an aspect of the invention, or features of the first embodiment, there is provided an apparatus for controlling navigation display for music performance, which comprises: music piece storage means for storing data of a music piece, the data including information on musical notes and fingers to be played on a keyboard instrument; turning over and under providing means for providing information on turning over and under of fingers based on the data of the music piece; image storage or providing means for storing or providing a plurality of image data of a hand including indication of turning over and under; and display control means operative when the music piece is played for successively selecting appropriate ones of said plurality of image data based on the provided information on turning over and under to thereby provide visual image indication of turning over and under of fingers.

It can also be said as follows. In accordance with an aspect of the invention, or features of the first embodiment, there is provided an apparatus for controlling navigation display for music performance, which comprises: music piece storage means for storing data of a music piece, the data including information on musical notes and fingers to be played on a keyboard instrument; turning over and under providing means for providing information on turning over and under of fingers based on the data of the music piece; and display control signal producing means operative when the music piece is played for successively producing display control signals based on the provided information, the display control signals convertible to a sequence of visual images including indication of turning over and under of fingers.

We have discussed independency of features of the first embodiment from type of a display and data structure of image data. The discussion may also be applied to other embodiments of the invention unless otherwise stated or implied.

Features of the second embodiment are now described.

Figure 19A:
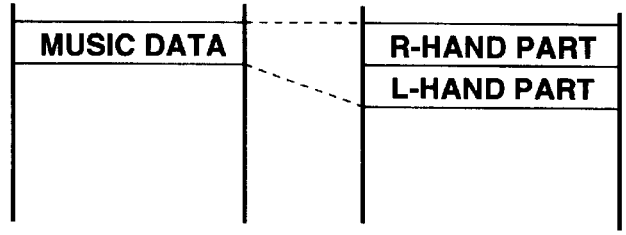
FIG. 19 is a storage map of fingered music data in accordance with the second embodiment of the invention.
Figure 19B:
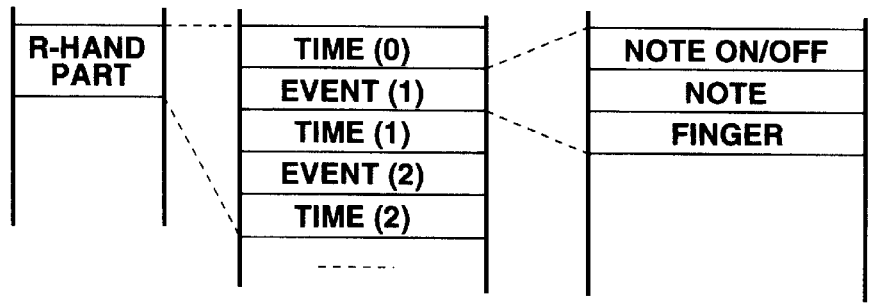
Figure 19C:
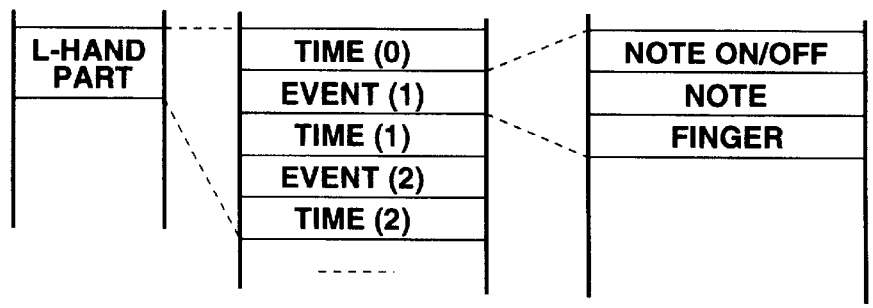

FIGS. 19A–19C show data structures of fingered music data stored in ROM 5 in accordance with the second embodiment. The fingered music data comprises right and left hand parts (see FIG. 19A) as in the first embodiment. Each music part comprises a sequence of event records with event-to-event time data inserted between adjacent events, as TIME (0), EVENT (1), TIME (1), EVENT (2), TIME (2) and so on. Each event record is stored in three consecutive addresses. The first address stores a note on or off code. The second address stores note number data. The third address stores finger number data indicative of a finger to be used to play the note. Unlike the first embodiment, the event records of the second embodiment do not contain information on turning over and under of fingers. However, in accordance with the second embodiment, presence or absence of turning over or under of a current finger can be determined from current and previous event records, as will be under stood from the following description.

The control right hand display routine of the second embodiment is now described by reference to FIGS. 20–22.

Figure 20:
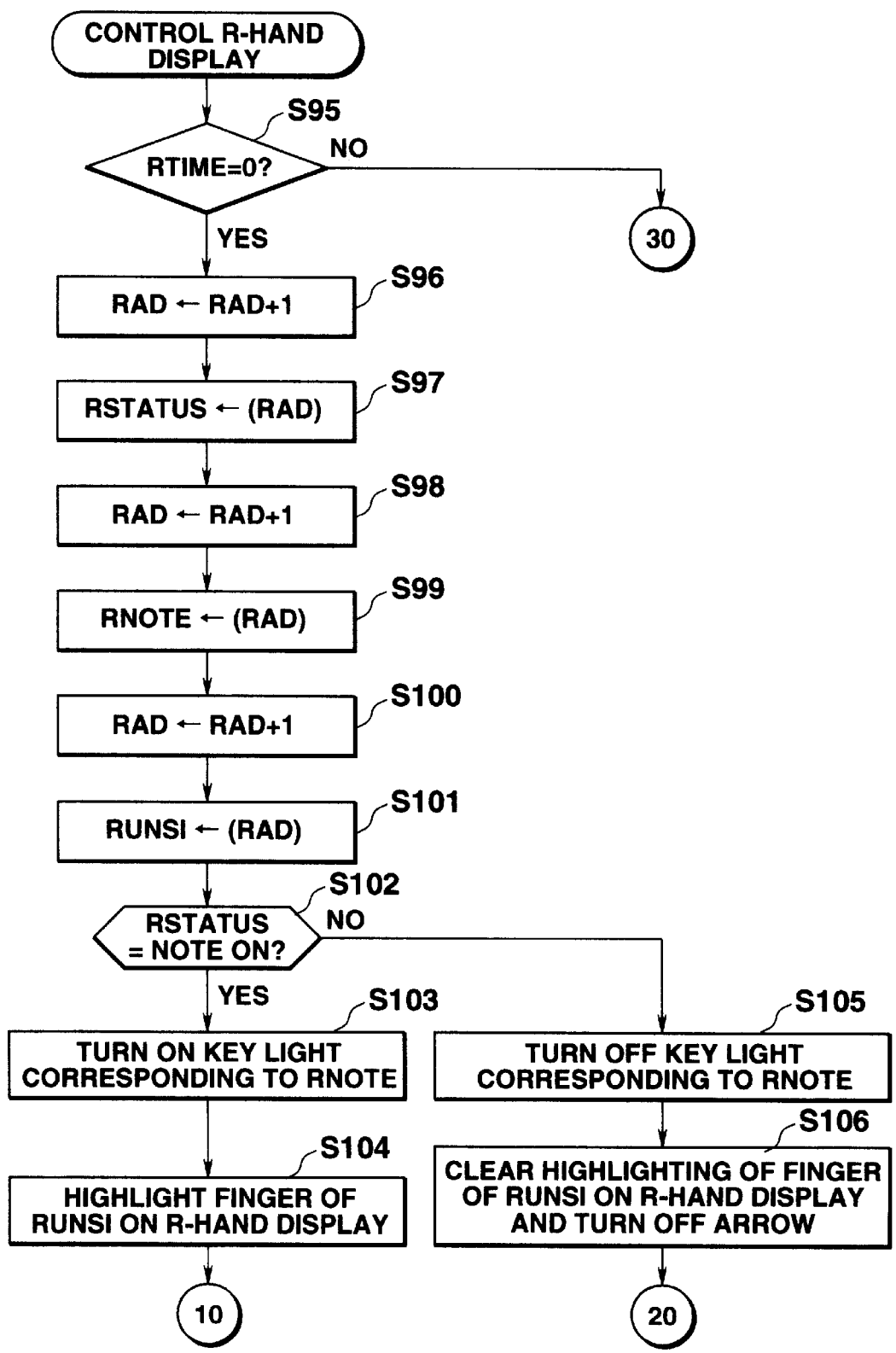
FIGS. 20–22 are flowcharts of a control right hand display routine in accordance with the second embodiment of the invention.

In FIG. 20, step S95 checks if RTIME=0, indicative of a note on or off event time. In the affirmative, step S96 increments the right hand music address pointer RAD. Step S97 loads the note on or off code (RAD) into register RSTATUS. Step S98 increments the address pointer RAD. Step S99 loads the note number data (RAD) into register RNOTE. Step S100 increments the address pointer RAD. Step S101 loads the finger number data (RAD) into register RUNSI. Step S102 checks the register RSTATUS to see whether it is a note on event or note off event. In the affirmative, step S103 turns on a key light (LED) corresponding to RNOTE. Step S104 turns on or highlights the finger of RUNSI and displays a corresponding finger number on the right hand display. In the case of note off event, step S105 turns off a key light corresponding to RNOTE. Step S106 clears highlighting of the finger of RUNSI and turns off or clears an arrow, if any, from the right hand display.

Figure 21:
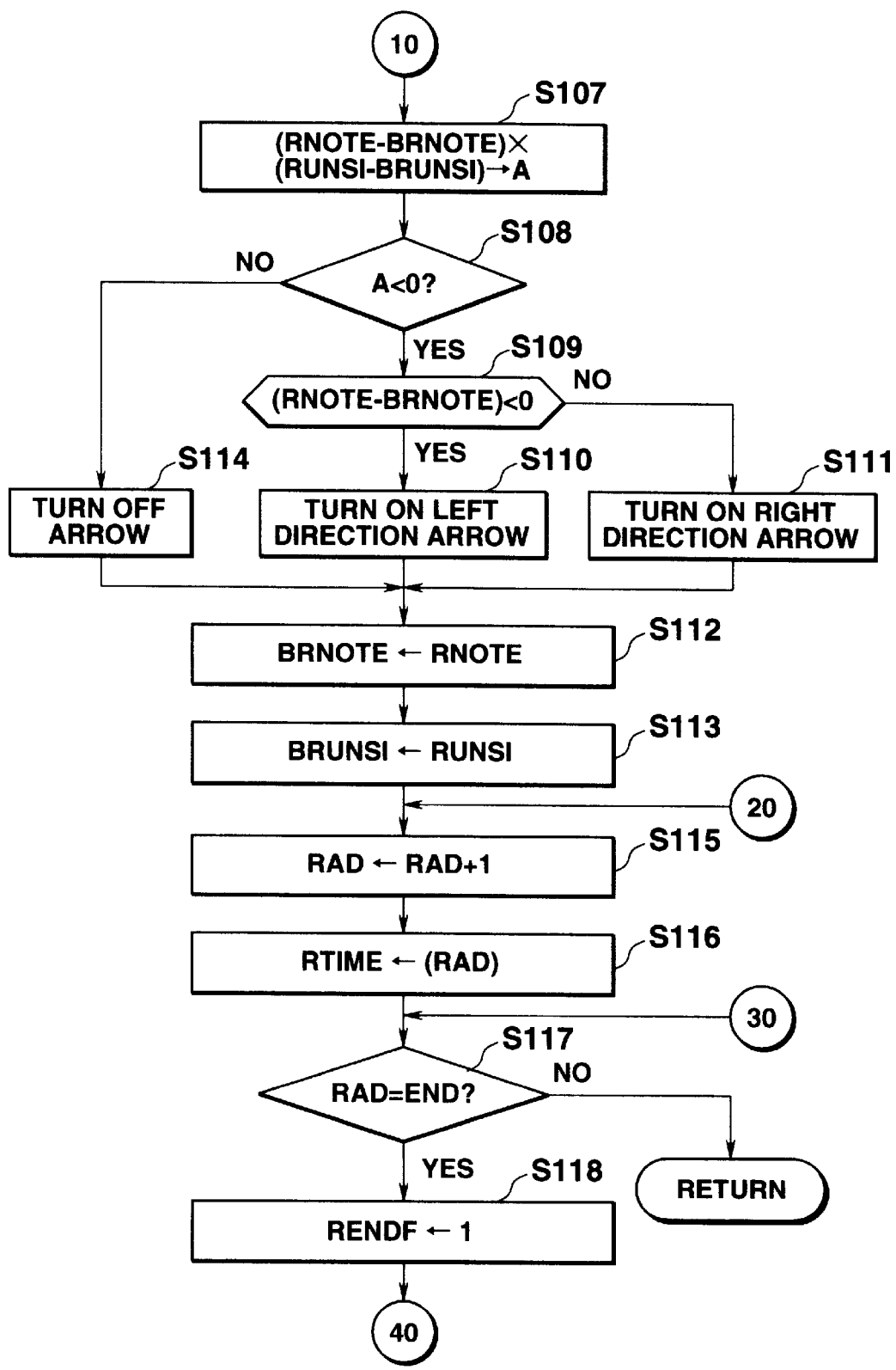
Figure 22:
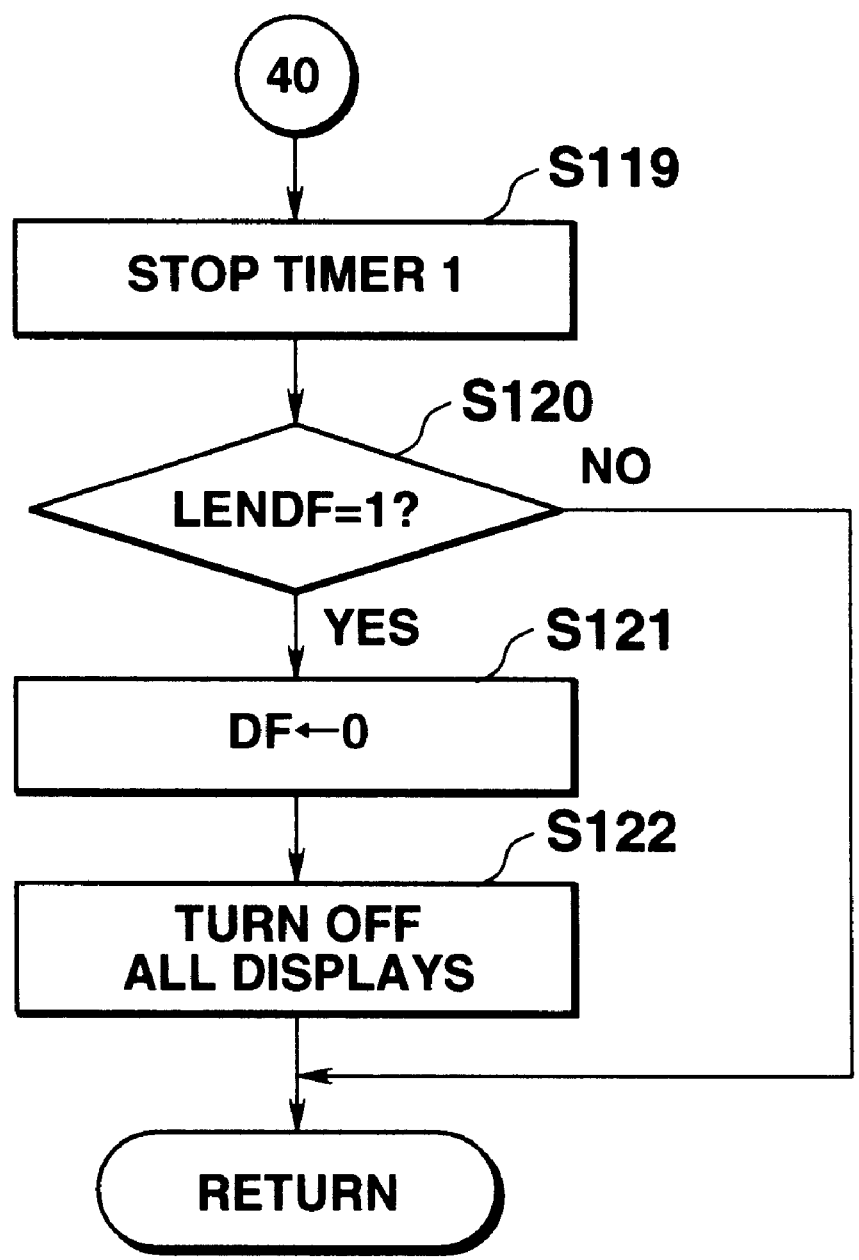

After the step S104, step S107 in FIG. 21 computes A by:

A=(RNOTE−BRNOTE)×RUNSI−BRUNSI), in which RNOTE represents a current note number, BRNOTE represents a previous note number, RUNSI represents a current finger and BRUNSI represents a previous finger. Step 108 checks if A is a negative or positive. If A<0, this indicates presence of turning or under of the current finger, whereas A≧0 indicates absence of turning over or under. For example, let previous note number BRNOTE be 53 (E4, mi) previous finger number BRUNSI be 3 (representative of the middle finger), current note number RNOTE be 54 (F4, fa) and current finger number RUNSI be 1 (thumb). In this case, step S107 computes A by: (54−53)× 1−3)=−2<0. Thus A becomes a negative. As another example, let the previous note number BRNOTE be 54 (F4, fa), previous finger number BRUNSI be 1 (thumb), current note number RNOTE be 53 (E4, mi) and current finger number RUNSI be 3 (middle finger). In this case, step S108 computes A by: (53−54)×3−1)=−2<0. Again, A is a negative. In this manner data A becomes a negative when a current finger has to turn over or under, or specifically when a current finger is naturally positioned right of a previous finger whereas a current note (key) is positioned left of a previous note or key, or vice versa. If data A is a positive or zero, there is no need for a current finger to turn over or under.

When A<0, step S109 checks if (RNOTE−BRNOTE)<0. This is the case when the current note is lower than or positioned left of the previous note. Then step S110 turns on the left direction arrow. If (RNOTE−BRNOTE)>0, step S111 turns on the right direction arrow. If A is not a negative (step S108) there is no need of displaying an arrow. Step S114 turns off or clears an arrow, if any. The step S114 may be omitted since an arrow display may be cleared at the time of noteoff (see step S106). After step S114, S110 or S111, step S112 moves the data RNOTE to BRNOTE. Step S113 moves the data of RUNSI to BRUNSI.

After the step S113 or S106, step S115 increments the right hand address pointer. Step S116 loads the event-to-event time data (RAD), indicative of a time difference between adjacent events, into time register RTIME. After the step S116 or after the step S95 finding RTIM≠0, step S117 checks RAD to see whether it has reached end of right hand music. In the negative, process returns to the main program. In the affirmative, step S118 sets the flag RENDF to "1", indicative of end of right hand display. Then step S119 in FIG. 22 stops timer 1. Step S120 checks if LENDF=1, indicative of end of left hand display. In the negative, the process returns to the main program. In the affirmative, step S121 resets the display flag DF to "0". Step S122 turns off all this displays and the process returns to the main program.

The control left hand display routine of the second embodiment is now described by reference to FIGS. 23–25.

Figure 23:
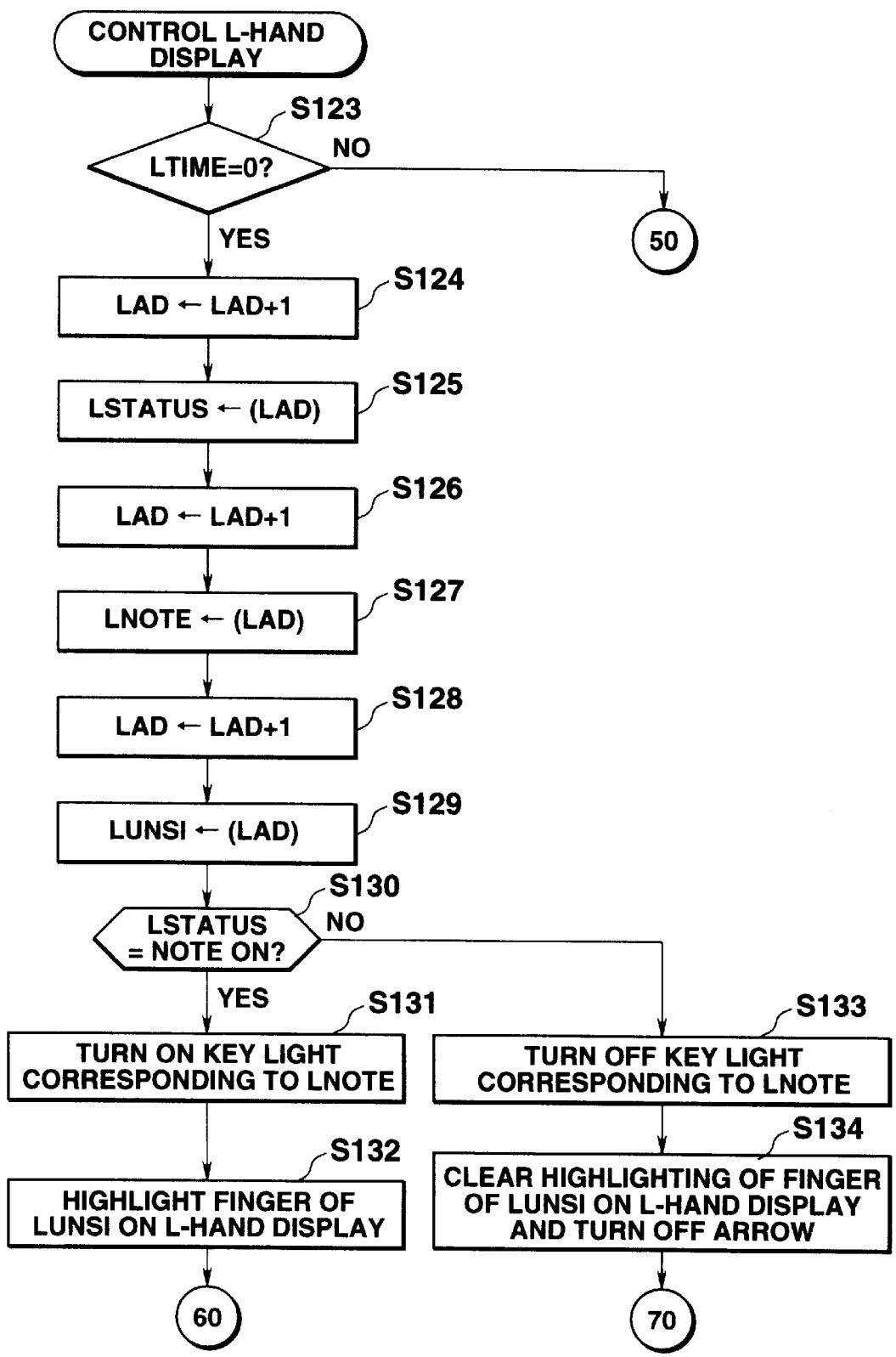
FIGS. 23–25 are flowcharts of a control left hand display routine in accordance with the second embodiment of the embodiment.

In FIG. 23, step S123 checks if LTIME=0 indicative of a new event time of note on or off. In the affirmative, step S124 increments the left hand address pointer LAD. Step S125 loads the note on or off code (LAD) into status register LSTATUS. Step S126 increments the address pointer LAD. Step S127 loads the note number data (LAD) into register LNOTE. Step S128 increments the address pointer LAD. Step S129 loads the finger number data (LAD) into register LUNSI.

Next, step S130 checks the status register LSTATUS to see whether it is a note on or off event. In the case of note on event, step S131 turns on a key light (LED) corresponding to LNOTE. Step S132 turns on or highlights the finger of LUNSI on the left hand display. In the case of note off event, step S133 turns off the key light corresponding to LNOTE. Step S134 clears highlighting of the finger of LUNSI from the left hand display and turns off an arrow, if any.

Figure 24:
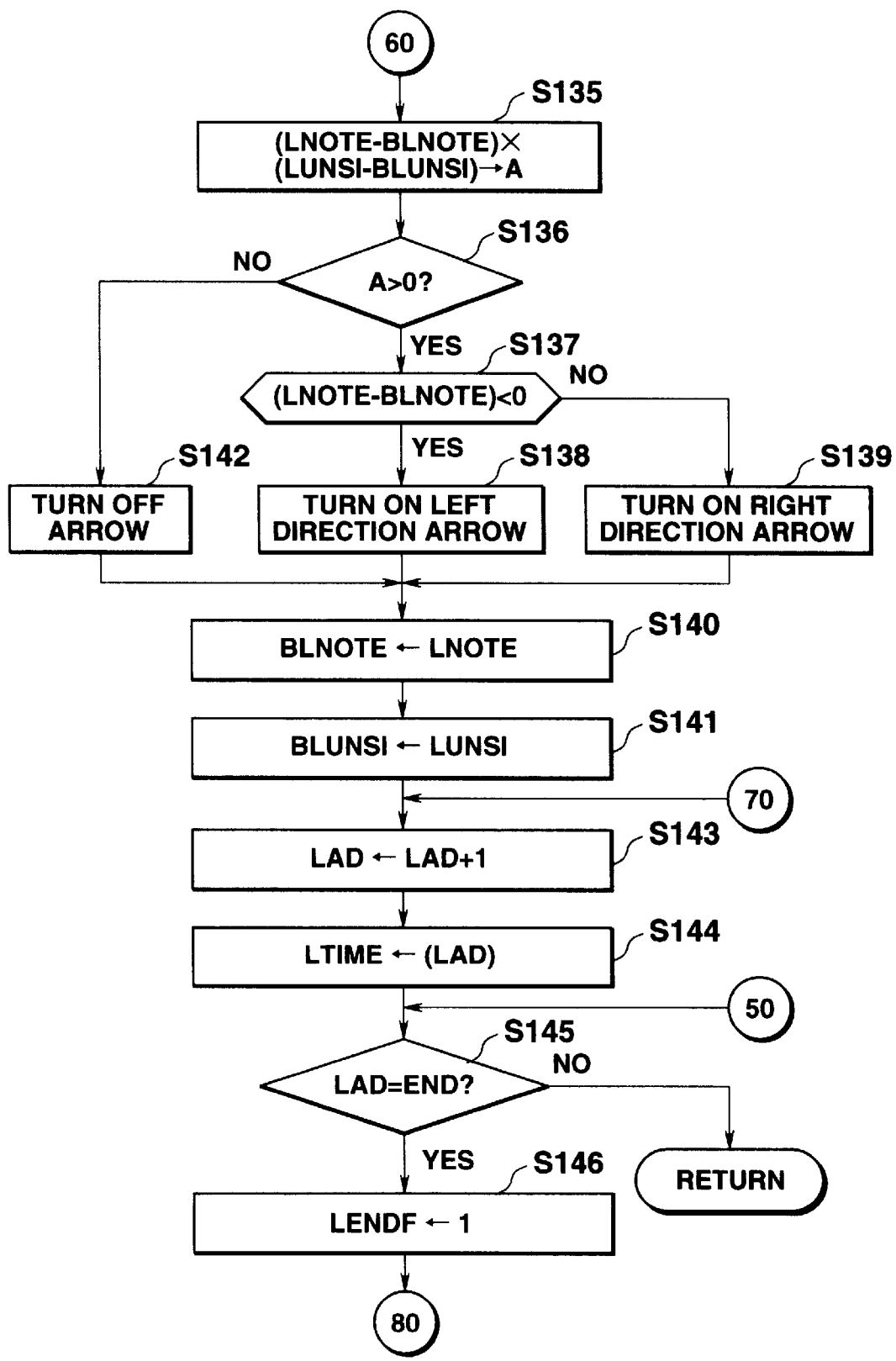
Figure 25:
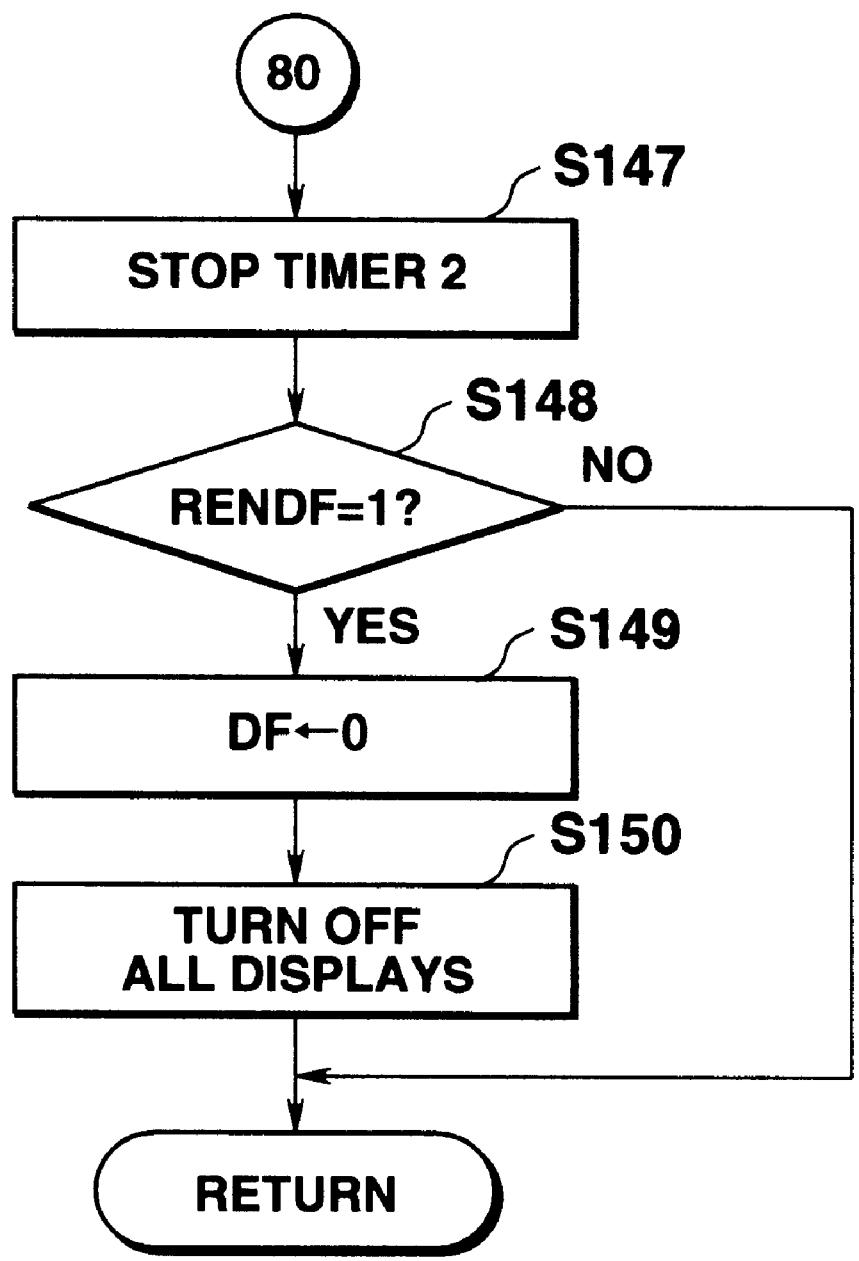

After step S132, step S135 in FIG. 24 computes A by:

A=(LNOTE−BLNOTE)×(LUNSI−BLUNSI)

in which LNOTE represents a current note, BLNOTE indicates a previous note, LUNSI indicates a current finger and BLUNSI indicates a previous finger. Step S136 checks A to see whether A>0. This indicates presence of turning over or under of A current finger whereas A≦0 indicates absence of turning over or under.

In the case of A>0, step S137 checks if (LNOTE−BLNOTE)<0, indicative of the current note lower than the previous note. If the current note is lower than the previous note, step S138 turns on or displays the left direction arrow on the left hand display since this is the case when the thumb of the left hand turns under. If (LNOTE−BLNOTE)>0, that is if the current note is higher than or positioned right of the previous note, step 139 turns on or displays the right direction arrow on the left hand display since this is the case when a finger of the left hand turns over to play the current note. If A≦0 (step S136), there is no need of displaying an arrow. Step S142 turns off or clears an arrow, if any, from the left hand display. Step S142 may be omitted since an arrow display may be cleared at the time of note off (see step S134). After step S142, S138 or S139, step S140 moves the current note number LNOTE to BLNOTE. Step 141 moves the current finger number data LUNSI to BLUNSI. After step S141 or S134, step S143 increments the left hand address pointer. Step S144 loads the event-to-event time data (LAD) to LTIME. After the step S144 or after step S123 finding LTIME≠0, step S145 checks if the left hand address pointer has reached end of left hand music. In the negative, process returns to the main program. In the affirmative, step S146 sets the flag LENDF to "1", indicative of end of left hand display. Step S147 stops the timer 2.

Next, step S148 checks if RENDF=1, indicative of end of right hand display. In the negative the process returns to the main program. In the affirmative, step S149 resets the display flag DF to "0". Step S150 turns off all displays, and the process returns to the main program. In this manner the second embodiment employs a fingered music storage which stores fingered music data. The fingered music data comprises a succession of note records each including information on a note and a finger to be used to play the note. The second embodiment also employs an image storage which stores a plurality of image data of a hand. Each image data correspond to a different one of combination of a finger and presence or absence of turning over or under. Certain image data that correspond to a combination of a finger and presence of turning over or under include visual image indication of turning over or under. Under the control of program, CPU functions as music reading means which reads the fingered music data at a tempo of play of the music. CPU also functions as determining means which determines presence or absence of turning over under of a current finger from current and previous note records. Further, CPU functions as image selecting and outputting means which selects appropriate one of the plurality of image data based on a current note record and the determined results and outputs the selected image for display control, thus providing visual image indication of turning over and under of fingers. Under the control of CPU, LCD distinctly displays or highlights a finger that turns over and under and displays an arrow showing direction of turning over or under of the finger. Visual images of fingering presented by the second embodiment are illustrated in FIG. 18. The visual image presentation of turning over and under of fingers will greatly help a player to play music on a keyboard instrument.

Features of the third embodiment are now described.

Figure 26A:
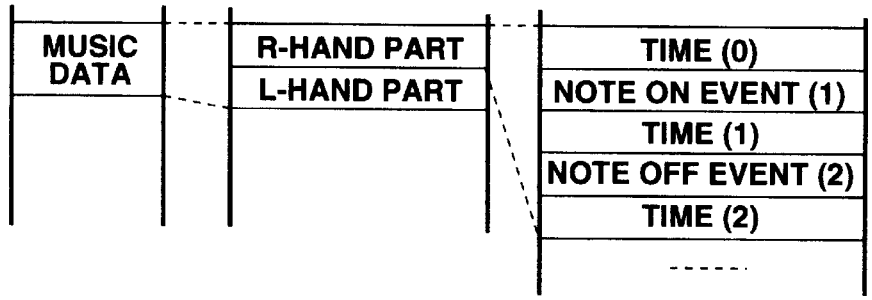
FIG. 26 is a storage map of fingered music data in accordance with the third embodiment of the invention.
Figure 26B:
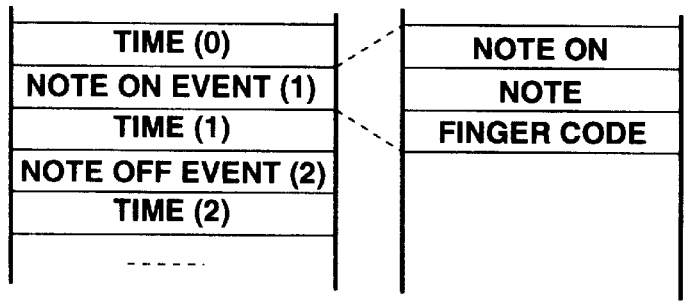
Figure 26C:
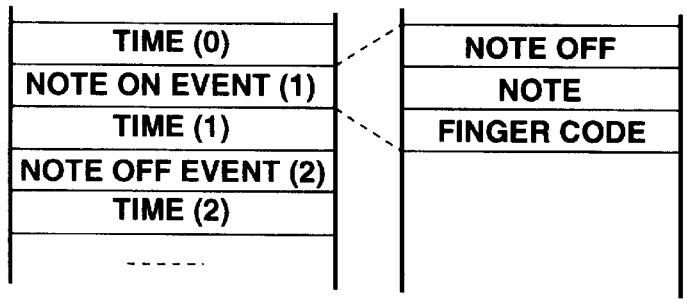

FIGS. 26A–26C show data structures of fingered music data stored in ROM in accordance with the third embodiment. The fingered music data comprises a right and left hand parts, as shown in FIG. 26A. Each music part comprises a succession of event records with event-to-event time data inserted between adjacent events, as TIME (0), NOTEONEVENT (1), TIME (1), NOTEOFFEVENT (2), TIME (2) and so on. Each NOTEONEVENT record is stored at three consecutive addresses (see FIG. 26B). The first address stores a note on code. The second address stores a note number. The third address stores a finger code. Each note off event record is also stored at three consecutive addresses (see FIG. 26C). The first address stores a note off code. The second address stores a note number. The third address stores a finger code. The finger code is so encoded as to carry information on a finger to be used play a note and presence (and the direction) or absence of turning over or under of the finger in accordance with the third embodiment.

For right hand, the finger code is encoded as follows.
21: thumb
22: index finger
23: middle finger
24: ring finger
25: little finger
26: thumb turns under in right direction
27: index finger turns over in left direction
28: middle finger turns over in left direction
29: ring finger turns over in left direction. For left hand, the finger code is encoded as follows.
31: thumb
32: index finger
33: middle finger
34: ring finger
35: little finger
36: thumb turns under in left direction
37: index finger turns over in right direction
38: middle finger turns over in right direction
39: ring finger turns over in right direction.

The control right hand display routine of the third embodiment is now described by reference to FIGS. 27–29.

Figure 27:
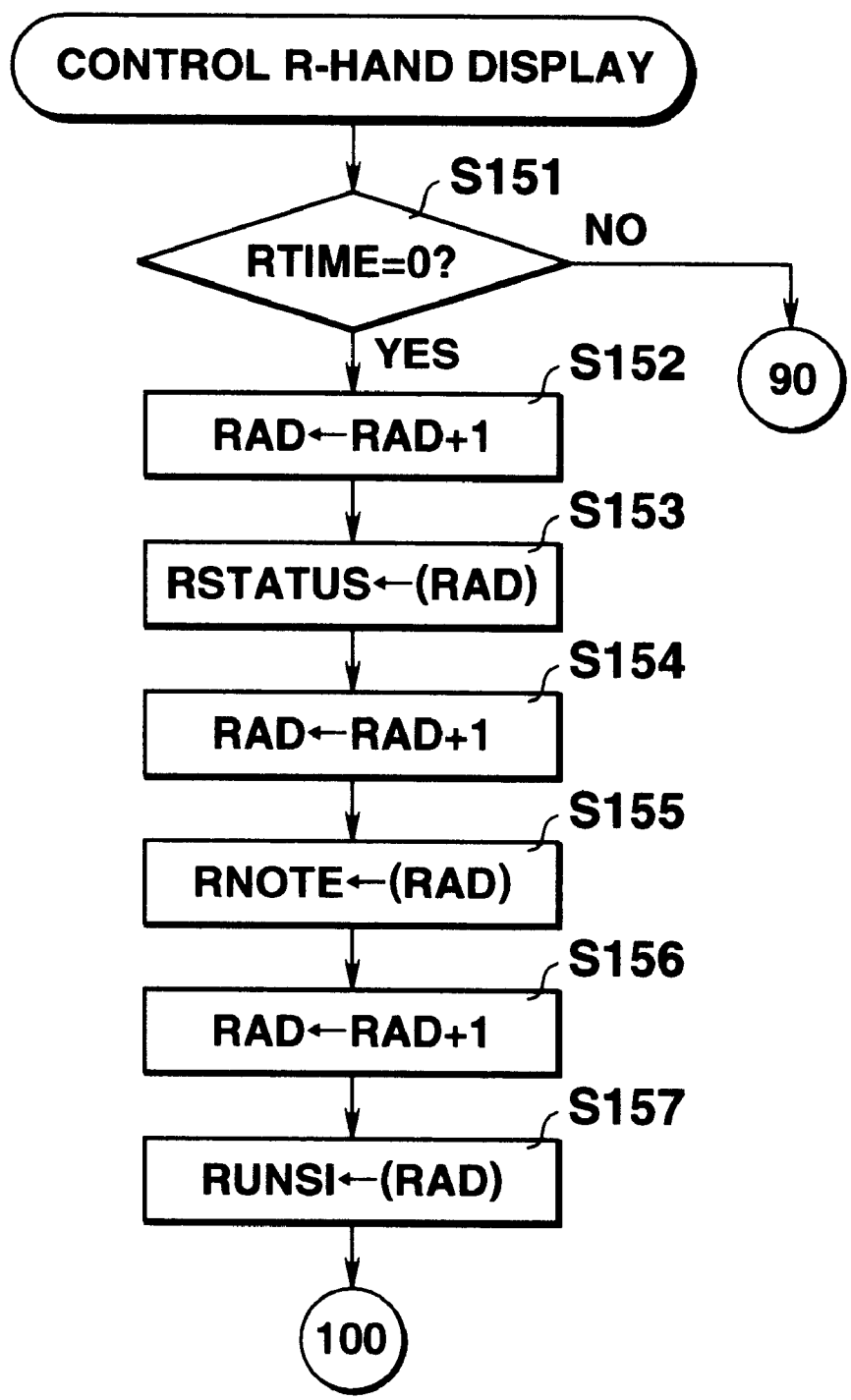
FIGS. 27–29 are flowcharts of a control right hand display routine in accordance with the third embodiment of the invention.

In FIG. 27, step S151 checks if RTIME=0, indicative of a new event time of note on or off. In the affirmative, step S152 increments the right hand music address pointer RAD. Step 153 loads the event-to-event time data (RAD) into status register RSTATUS. Step 154 increments the address pointer RAD. Step 155 loads the note number data (RAD) into current note register RNOTE. Step 156 increment the address pointer RAD. Step 157 loads the finger code (RAD) into register RUNSI.

Figure 28:
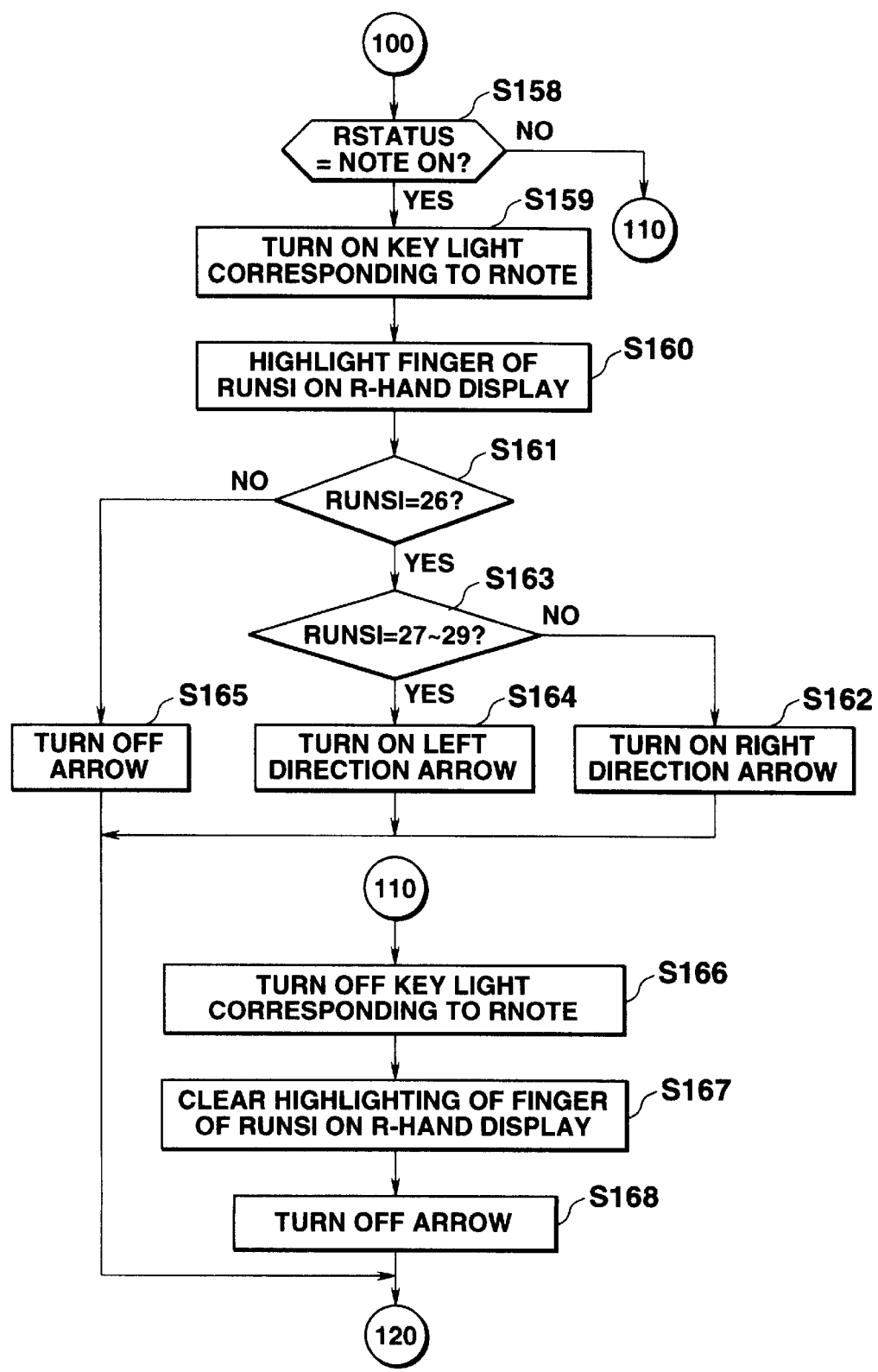
Figure 29:
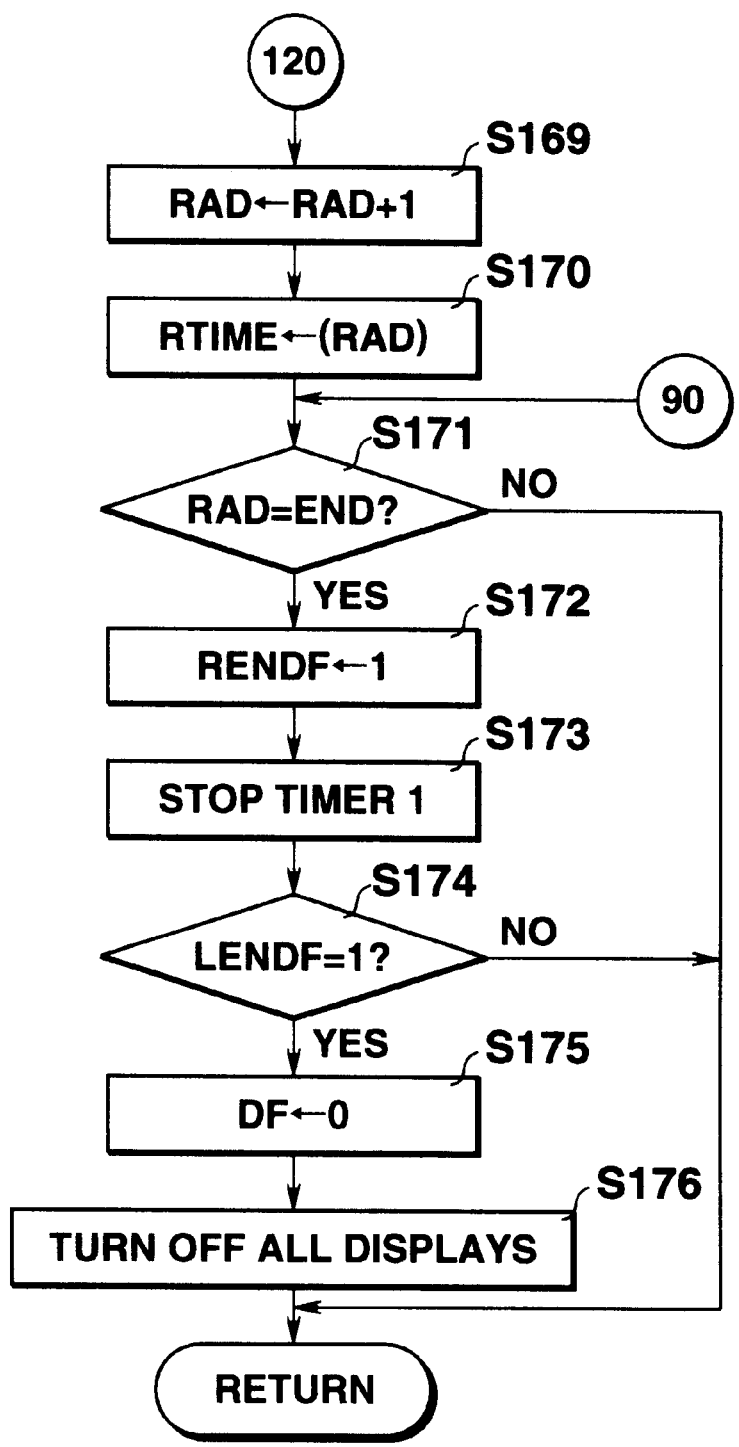

Next, in FIG. 28, step S158 checks the status register RSTATUS to see whether it is a note on event or note off event. In the case of note on event, step S156 turns on a key light corresponding to RNOTE. Step S160 turns on or highlights a finger of RUNSI on the light hand display. Then step S161 checks if RUNSI=26, indicative of the right hand thumb turning under in right direction. In the affirmative, step S162 turns on or displays the right direction arrow. If RUNSI≠26, step S163 checks if RUNSI is either 27, 28 or 29, indicative of a right hand finger turning over in left direction. In the affirmative, step S164 turns on or displays the left direction arrow. In the negative, step S165 turns off or clears an arrow, if any. The step S165 may be omitted since an arrow display may be cleared or turned off at the time of note off (see step S168).

In the case of note off event (step S158), step S166 turns off a key light (LEDA) corresponding to RNOTE. Step S167 turns off or clears highlighting of the finger of RUNSI from the right hand display. Step 168 turns off or clears an arrow, if any. After step S165 or S168, step S169 in FIG. 29 increments the right hand address pointer RAD. Step S 170 loads the event-to-event time data (RAD) into register RTIME.

After step S170, or after step S151 finding RTIME≠0, step 171 checks if RAD=END, indicative of end of right hand music. In the negative the process returns to the main program. In the affirmative, step 172 sets the flag RENDF to "1" indicative of end of right hand display. Step S173 stops timer 1. Step S174 checks if LENDF=1 indicative of end of left hand display. In the negative, the process returns to the main program. In the affirmative, step S175 resets the display flag to "0". Step S176 turns off all displays, and the process returns main program.

The control left hand display routine of the third embodiment is now described by reference to FIGS. 30–32.

Figure 30:
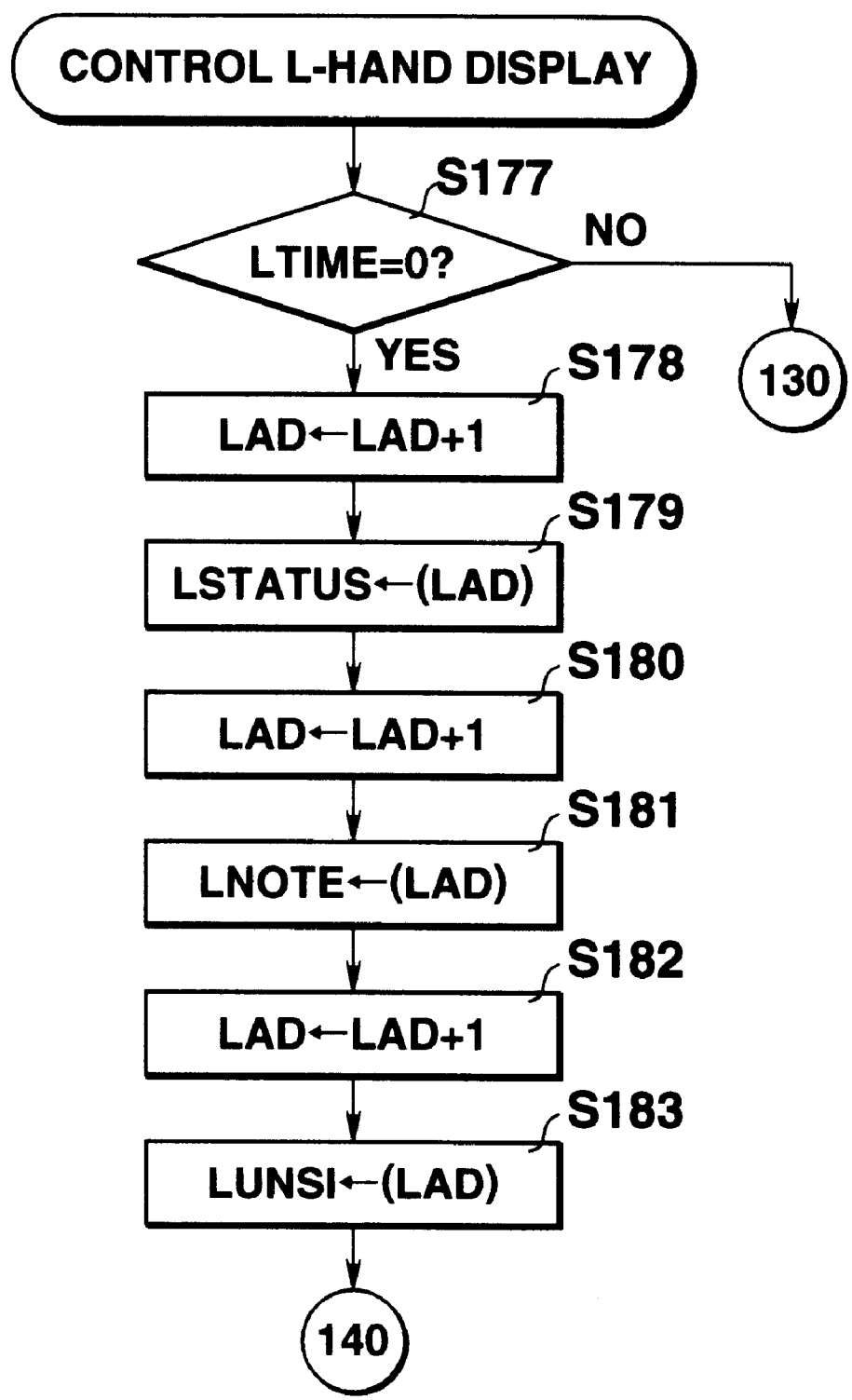
FIGS. 30–32 are flowcharts of a control left hand display routine in accordance with the third embodiment of the invention.

In FIG. 30, step S177 checks if LTIME=0, indicative of a new event time of note on or off. In the affirmative, step S178 increments left hand music address pointer LAD. Step S179 loads the note on or off code (LAD) into status register LSTATUS. Step S180 increments the address pointer LAD. Step S181 loads the note number data (LAD) into register LNOTE. Step S182 increments the address pointer LAD. Step S183 loads the finger code (LAD) into LUNSI.

Figure 31:
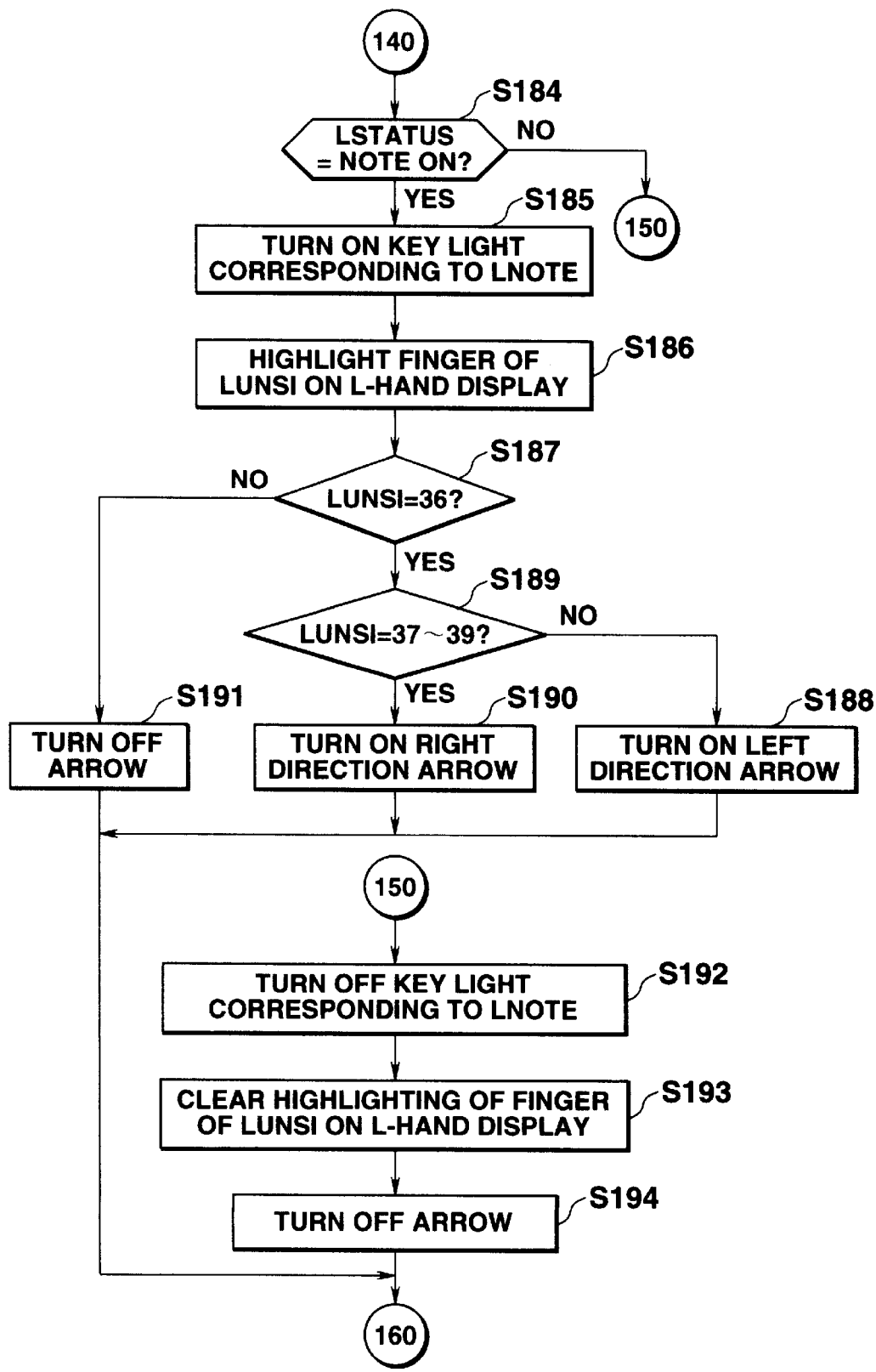
Figure 32:
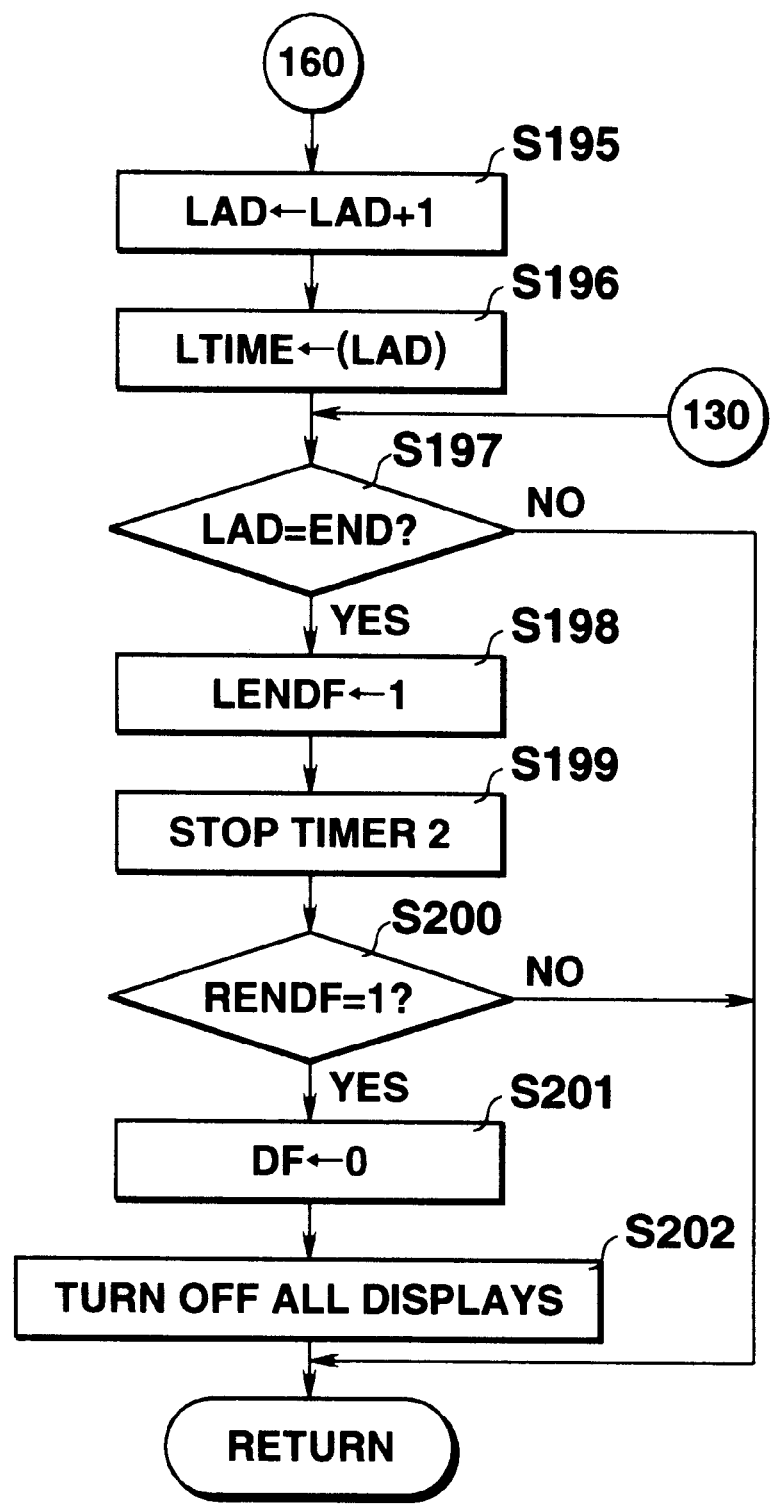

Then, in FIG. 31, step S184 checks the status register LSTATUS to see whether it is a note on event, or note off event. In the case of note on event, step S185 turns on a key light corresponding to LNOTE. Step S186 turns on or highlights a finger specified by LUNSI and turns on or displays a corresponding finger number on the left hand display. Step S187 checks if LUNSI=36, indicative of the left hand thumb turning under in left direction. In the affirmative, step S188 turns on or displays the left direction arrow. If LUNSI≠36 (step S187), step S189 checks if LUNSI is either 37, 38 or 39, indicative of a left hand finger turning over in right direction. In the affirmative, step S190 turns on the right direction arrow. In the negative, step S191 turns off or clears an arrow, if any, from the left hand display. Step S191 may be omitted since an arrow display may be cleared or turned off at the time of note off event (see step S194).

In the case of note off event (step S184), step S192 turns off a key light corresponding to LNOTE. Step S193 turns off or clears highlighting of a finger specified by LUNSI from the left hand display. Step S194 turns off or clears an arrow, if any, from the left hand display. After step S191, S190, S188 or S194, step S195 in FIG. 32 increments the left hand address pointer LAD. Step 196 loads the event-to-event time (LAD), indicative of the time difference between the current and next events, into register LTIME.

After step S196 or after step S177 finding LTIME≠0, step S197 checks if the left hand address pointer LAD has reached end of left hand music. In the negative, the process returns to the main program. In the affirmative, step S198 sets the flag LENDF to "1", indicative of end of left hand display. Step S199 stops the timer 2. Step S200 checks if RENDF=1, indicative of end of right hand display. In the negative the process returns to the main program. In the affirmative, step S201 resets the display flag DF to "0". Step 202 turns off all displays and the process returns to the main program.

It is understood that the third embodiment is very similar to the first embodiment except for data format of the information on a finger and presence (and direction) or absence of turning over or under of the finger. Therefore, the third embodiment provides visual image presentation of turning over and under of fingers (see FIGS. 18A–18C), thus greatly helping a performer play music on a keyboard.

Features of the fourth embodiment are now described.

The data structure of fingered music data employed by the fourth embodiment is identical with that of the third embodiment (see FIGS. 26A–26C). No further description is required.

The control right hand display routine of the fourth embodiment is now described by reference to FIGS. 33–35.

Figure 33:
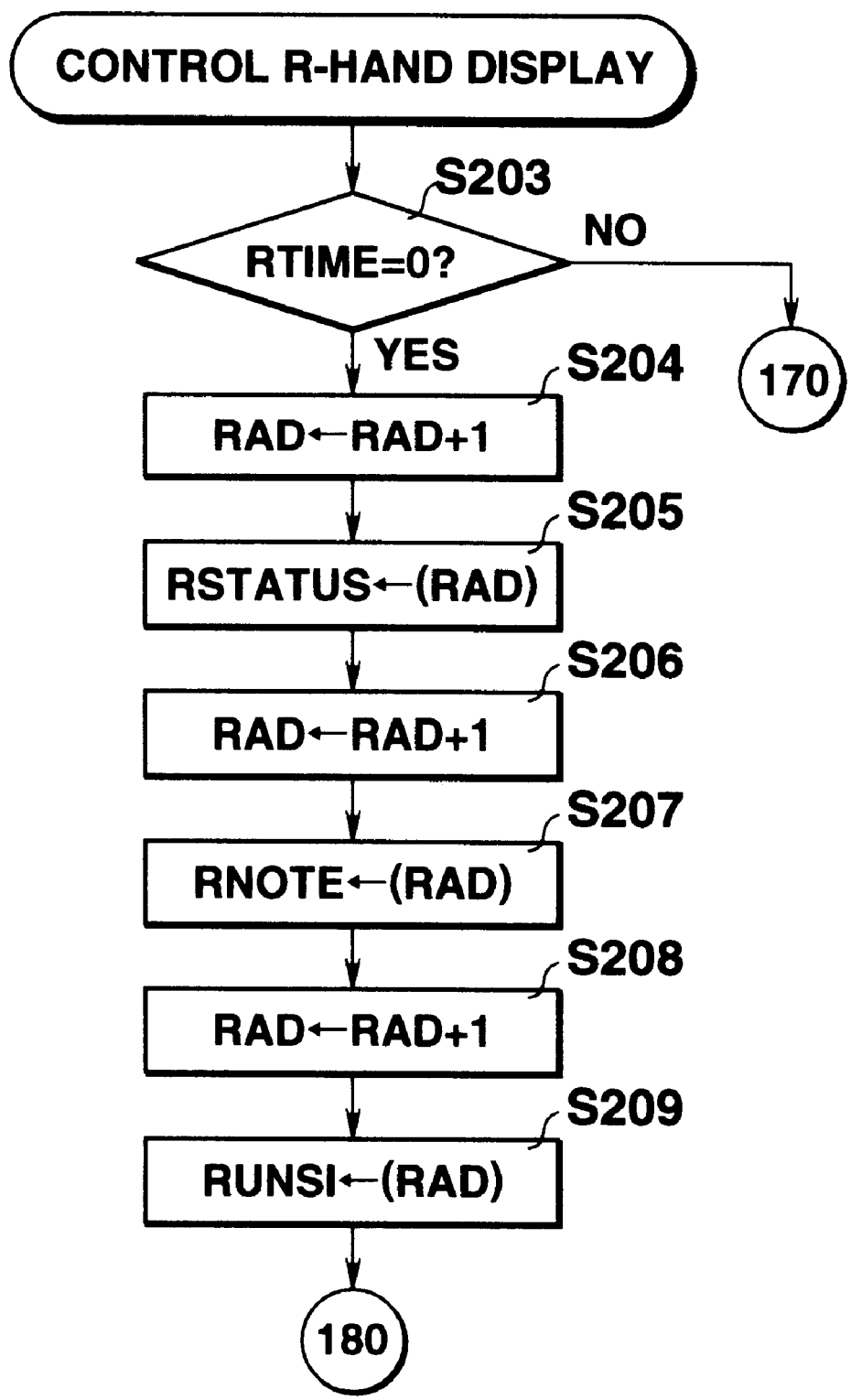
FIGS. 33–35 are flowcharts of a control right hand display routine in accordance with the fourth embodiment of the invention.

In FIG. 33 step S203 checks if RTIME=0, indicative of new event time of note on or off. In the affirmative, step S204 increments the right hand music address pointer RAD. Step S205 loads the note on or off code (RAD) into status register RSTATUS. Step S206 increments the address pointer RAD. Step S207 loads the note number data (RAD) into register RNOTE. Step S208 increments the address pointer RAD. Step S209 loads the finger code (RAD) into register RUNSI.

Figure 34:
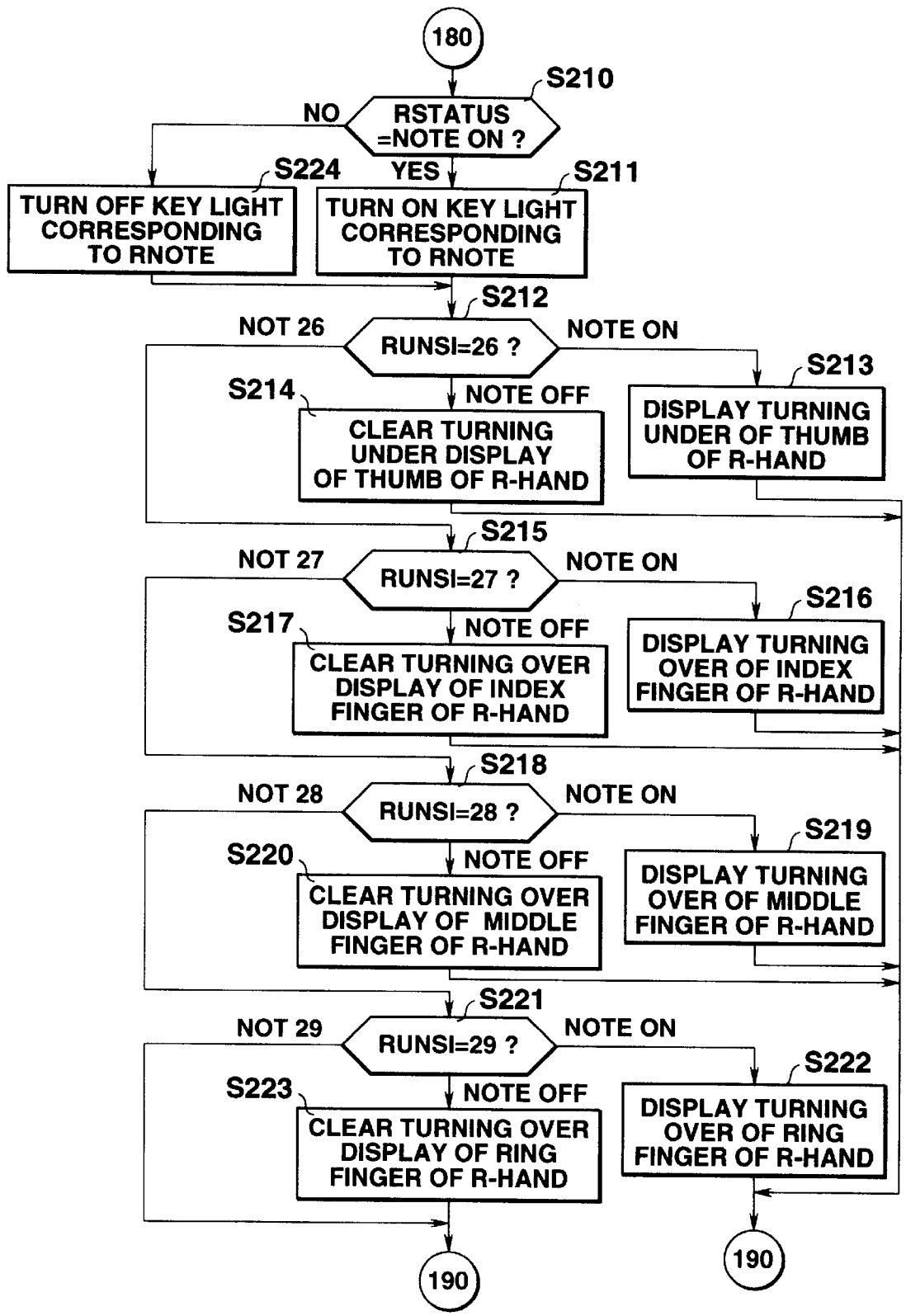
Figure 39A:
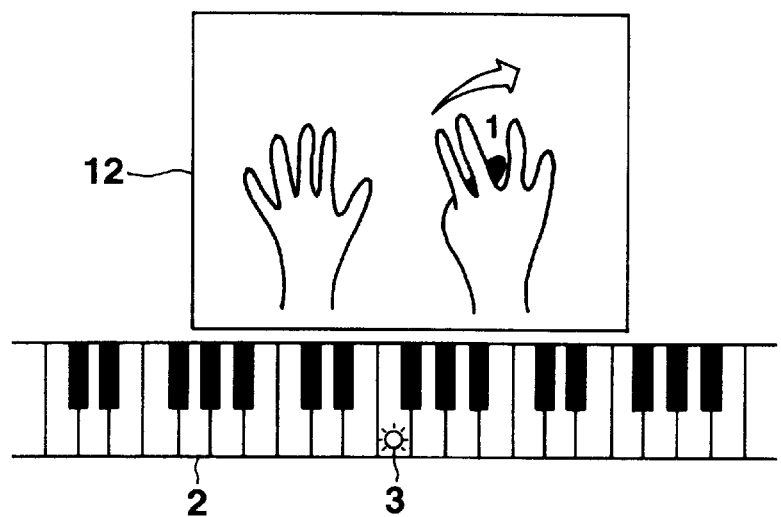
FIGS. 39A–C illustrate visual hand image presentations provided by the fourth embodiment of the invention.
Figure 39B:
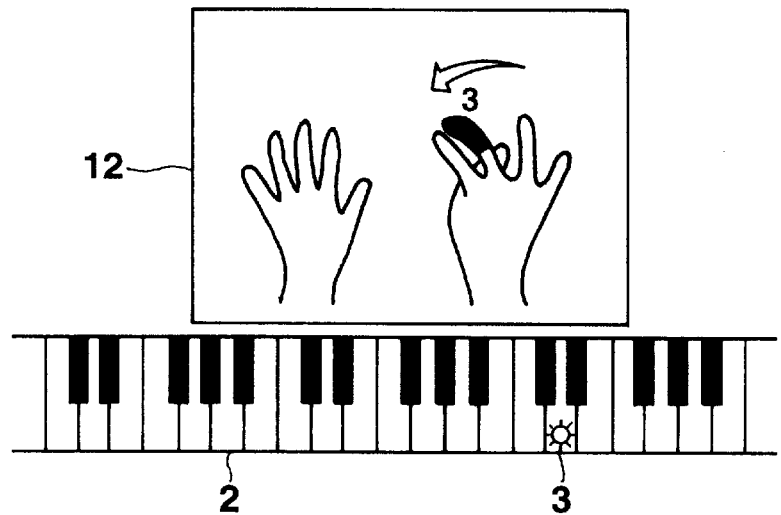
Figure 39C:
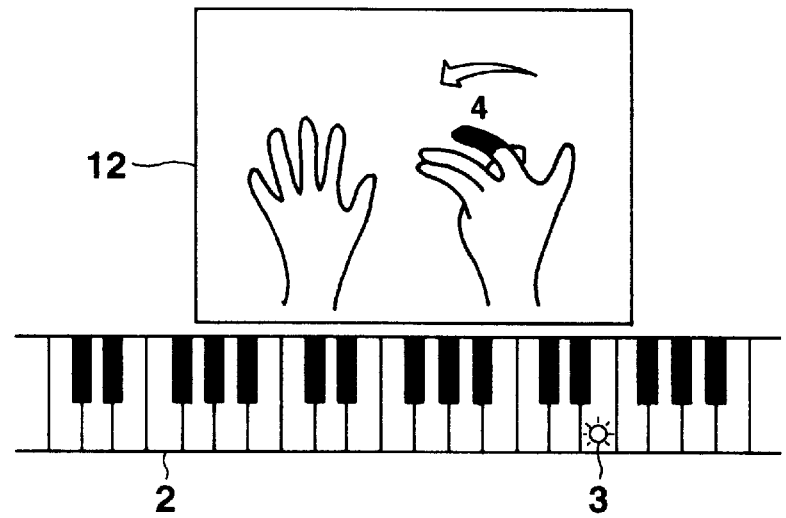

Then, in FIG. 34, step S210 checks the status register RSTATUS to see whether it is a note on event, or not off event. In the case of note on event, step S201 turns on a key light corresponding to RNOTE. In the case of note off event, step S224 turns off the key light corresponding to a note. Then, step S212 checks if a note on or off event occurs with RUNSI=26. When a note on event occurs with RUNSI=26, step S213 displays turning under of the thumb of the right hand on the right hand display (see FIG. 39A–39C). Thus, a visual image of a hand is presented in which the right hand thumb is highlighted and turns under fingers, such as index and middle fingers, and a corresponding finger number 1 and an arrow showing direction of the turning under are indicated. If a note off event occurs with RUNSI=26, step S214 clears the turning under display of the thumb of the right hand from the right hand display screen.

If RUNSI≠26, step S215 checks if a note on or off event occurs with RUNSI=27. If a note on event occurs with RUNSI=27, step S216 displays turning over of the index finger of the right hand on the right hand display. Thus a visual image of a hand is presented in which the right hand index finger is highlighted and turns over the thumb, and a corresponding finger number 2 and an arrow showing direction of the turning over are indicated. If a note off event occurs with RUNSI=27, step S217 clears the turning over display of the index finger of right hand.

If RUNSI≠27, step S218 checks if a note on or off event occurs with RUNSI=28. If a note on event occurs with RUNSI=28, step S219 displays turning over of the middle finger of the right hand on the right hand display. Thus a visual image of hand is presented (see FIG. 39B) in which the right hand middle finger is highlighted and turns over the thumb, and a corresponding finger number 3 and an arrow showing the direction of the turning over are indicated. If a note off event occurs with RUNSI=28, step S220 clears the turning over display of the middle finger of the right hand.

If RUNSI≠28, step 221 checks if a note on or off event occurs with RUNSI=29. If a note on event occurs with RUNSI=29, step S222 displays turning over of the ring finger of the right hand on the right hand display. Thus a visual image of a hand is presented (see FIG. 39C) in which the right hand ring finger is highlighted and turns over the thumb, and a corresponding finger number 4 and an arrow showing the direction of the turning over are indicated. If a note off event occurs with RUNSI=29, step S223 clears the turning over display of the ring finger of the right hand.

Figure 35:
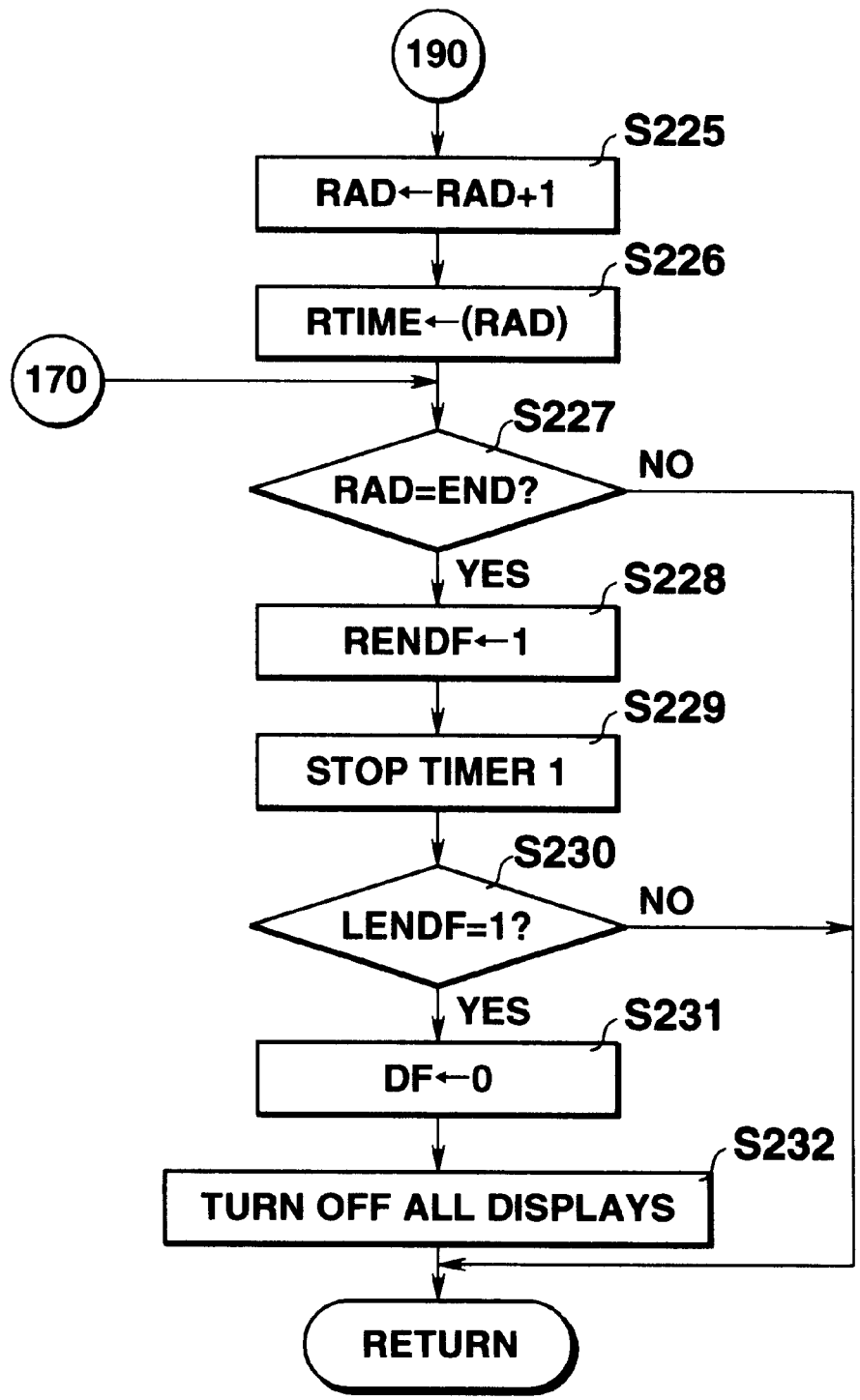

After step S222 or S223, or after step S221 finding RUNSI≠29, step 225 in FIG. 35 increments the right hand music address pointer. Step S226 loads the event-to-event time data (RAD) into register RTIME.

After step S226 or after step S203 finding RTIME≠0, step S227 checks if the right hand music address pointer has reached end of the right hand music part. In the negative, the process returns to the main program. In the affirmative, step S228 sets the flag RENDF to "1", indicative of end of right hand display. Step S229 stops the timer 1. Step S230 checks if LENDF=1, indicative of end of left hand display. In the negative, the process returns to the main program. In the affirmative, the step S231 resets the display flag DF to "0". Step S232 turns off all displays, and process returns to the main program.

The control left hand display routine of the fourth embodiment is now described by reference to FIGS. 36–38.

Figure 36:
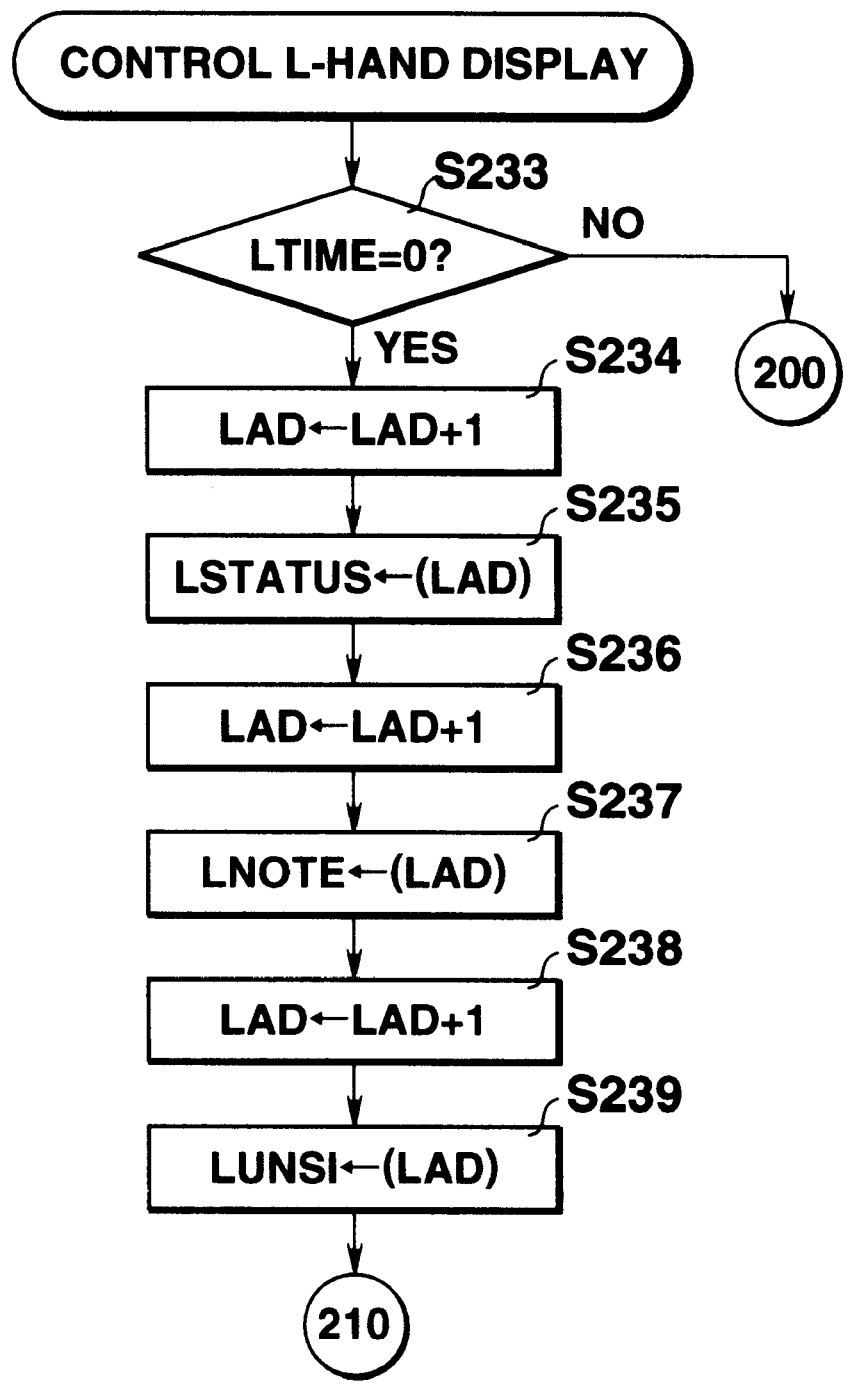
FIGS. 36–38 are flowcharts of a control left hand display routine in accordance with the fourth embodiment of the invention.
Figure 37:
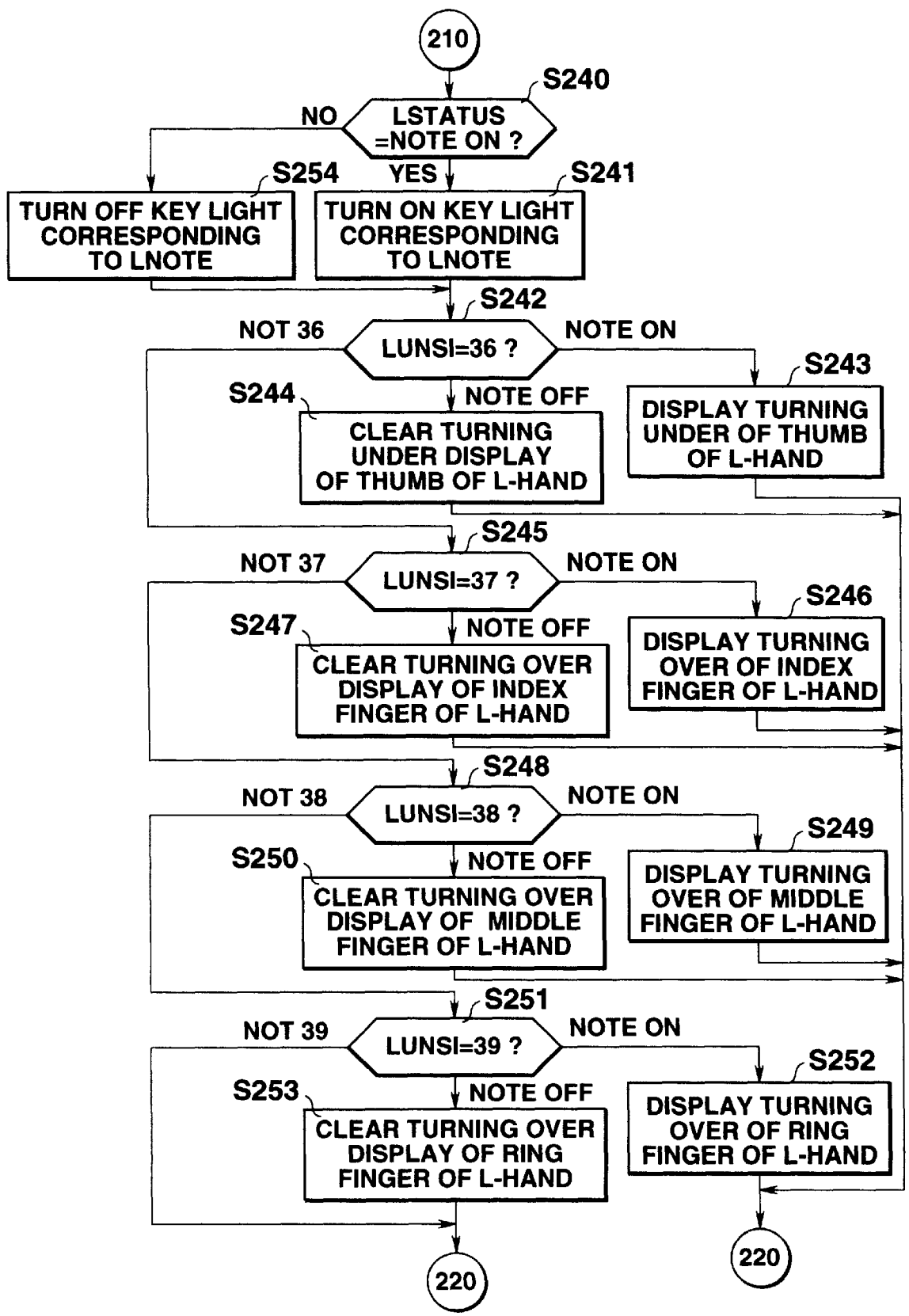

In FIG. 36, step S233 checks if LTIME=0, indicative of a new event time of note on or off. In the affirmative, step S234 increments the left hand music address register. Step S235 loads the note on or off code (LAD) into a status register LSTATUS. Step S236 increments the address pointer LAD. Step S237 loads the note number data (LAD) into register LNOTE. Step S238 increments the address pointer LAD. Step S239 loads the finger code (LAD) into register LUNSI. Then, in FIG. 37, step S240 checks the status register LSTATUS to see whether it is a note on event, or off event. In the case of note on event, step S241 turns on a key light (LED) corresponding to LNOTE. In the case of note off event, step S254 turns off the key light corresponding to LNOTE.

Then, step S242 checks if a note on or off event occurs with LUNSI=36. If a note on event occurs with LUNSI=36, step S243 displays turning under of the left hand thumb on the left hand display. Thus a visual image of the left hand is presented in which the left hand thumb is highlighted and turns under other fingers, such as index and middle, and a corresponding finger number 1 and an arrow showing direction of the turning under are indicated. If a note off event occurs with LUNSI=36, step S244 clears the turning under display of the thumb of the left hand from the left hand display. If step S242 finds LUNSI≠36, step S242 checks if a note on or off event occurs with LUNSI=37. If a note on event occurs with LUNSI=37, step S246 displays turning over of the left hand index finger on the left hand display. Thus, a visual image of the left hand is presented on the display screen, in which the left hand index finger is highlighted and turns over the thumb, and a corresponding finger number 2 and an arrow showing direction of the turning over are indicated. If a note off event occurs with LUNSI=37, step S247 clears the turning over display of the left hand index finger.

If the step S245 finds LUNSI≠37, step S248 checks if a note on or off event occurs with LUNSI=38. If a note on event occurs with LUNSI=38, step S249 displays turning over of the left hand middle finger. Thus, the display screen presents a visual image of the left hand in which the middle finger is highlighted and turns over the thumb, and a corresponding finger number 3 and an arrow showing the direction of the turning over are indicated. If a note off event occurs with LUNSI=38, step S250 clears the turning over display of the left hand of the middle finger.

If the step S248 finds LUNSI≠38, step S251 checks if a note on or off event occurs with LUNSI=39, indicative of ring finger turning over in right direction. If a note on event occurs with LUNSI=39, step 252 displays turning over of the left hand ring finger. Thus, the display screen of LCD12 presents a visual image of the left hand in which the ring finger is highlighted and turns over the thumb, and a corresponding finger number 4 and an arrow showing direction of the turning over are indicated. If a note off event occurs with LUNSI=39, step S253 clears the turning over display of the left hand ring finger.

Figure 38:
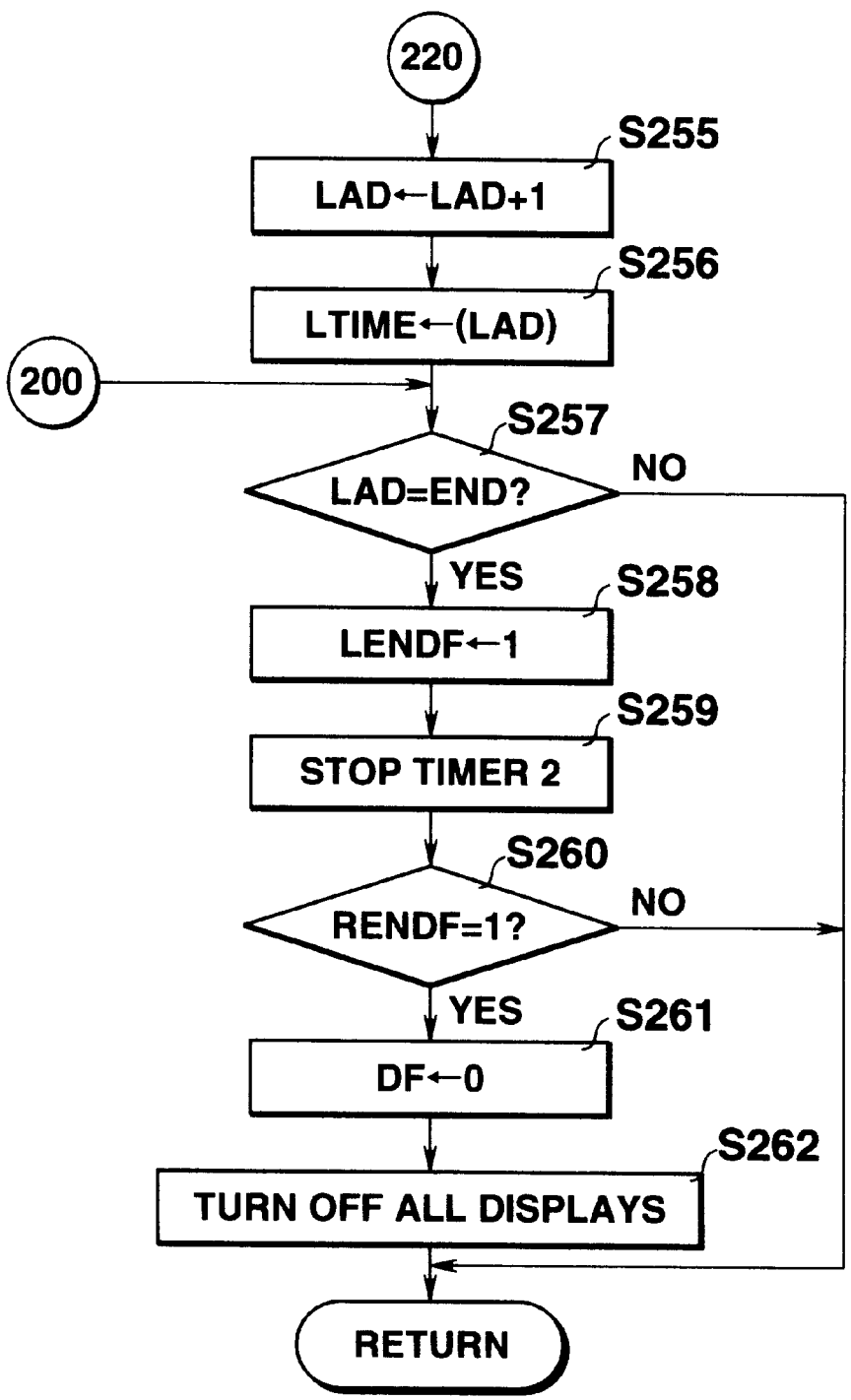

After the step S253 or S252, or after the step S251 finding LUNSI≠39, step S255 in FIG. 38 increments the left hand music address pointer LAD. Step S256 loads the event-to-event time (LAD) into register LTIME.

After the step S256 or after the step S233 finding LTIME≠0, step S257 checks if the left hand music address pointer has reached end of the left hand music part. In the negative the process returns to the main program. In the affirmative, step S258 sets the flag LENDF to "1", indicative of end of left hand display. Step S259 stops the timer 2. Step S260 checks if RENDF=1, indicative of end of right hand display. In the negative the process returns to the main program. In the affirmative, step S261 resets the display flag DF to "0". Step S262 turns off all displays, and the process returns to the main program.

In accordance with the fourth embodiment, an apparatus for controlling navigation display for music performance comprises a fingered music storage which stores fingered music data. The fingered music data comprises a succession of note records each including information on a note, a finger to be used play the note and presence (and direction) or absence of turning over or under of the finger. The apparatus further comprises an image storage which stores a plurality of image data of a hand. Each image data corresponds to a different one of combination of a finger and presence or absence of turning over or under. Such image data that correspond to a combination of a finger and presence of turning over or under includes visual hand image indication of turning over or under. Under the control of the program, CPU reads fingered music data at a tempo of play of the music, selects appropriate image data based on a note record currently read and output it for display control. During the play of music, a display such as LCD timely provides visual image indication of turning over and under of fingers, thus helping a player play music on a keyboard instrument.

Features of the fifth embodiment are now described. In accordance with the fifth embodiment, a time difference between a previous note time and a current note time is used to determine presence or absence of turning over or under of a current finger. The time difference between a previous note off time and a current note on time defines a rest time (absence of note time). If the rest time is long enough, there is no need of turning over or under of a finger even when a hand shifts or moves from one position to another.

Figure 40:
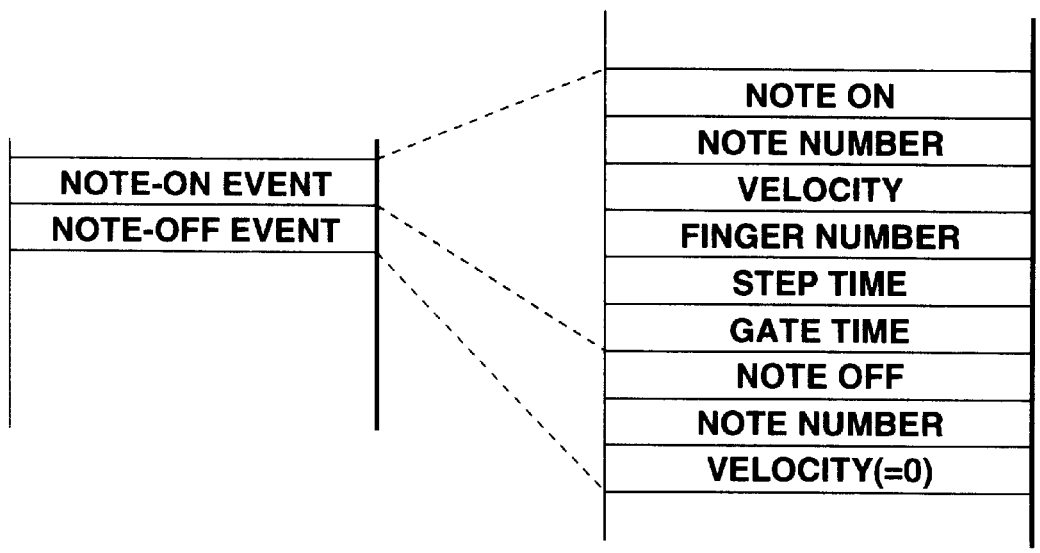
FIG. 40 shows a data structure of fingered music data in accordance with fifth embodiment of the invention.

FIG. 40 shows a data structure of fingered music stored in ROM 5. The fingered music data comprises a succession of event (note on or off) records. Each note on event records comprises a note on code, note number, velocity, finger number indicative of a finger to be used to play the note, step time indicative of the time difference between the current note on time and the next note on time, and gate time indicative of note duration. Each note off event records comprises a note off code, note number and velocity that is set to "0".

Figure 41:
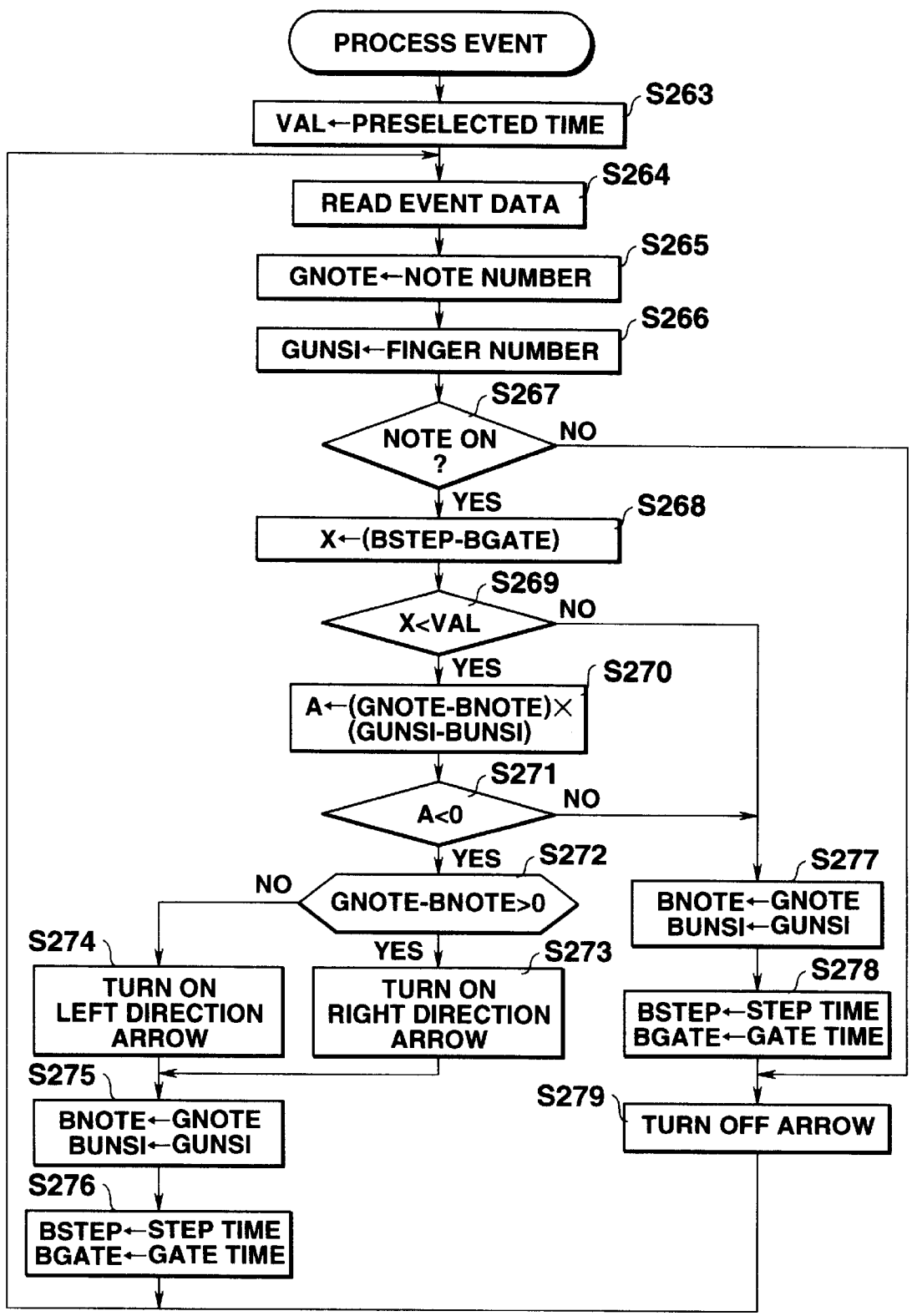
FIG. 41 is a flowchart of a process event routine in accordance with the fifth embodiment of the invention.

FIG. 41 shows a flowchart of a process event routine (control right or left hand display).

Step S263 loads preselected time data into register VAL. The preselected time data may be stored in ROM 5 as fixed data or may be updated by user and stored in RAM 6, as a variable.

In the loop of S264–S279, step S264 reads a new event record from the fingered music storage. Step S265 loads the note number data into a current note register G note. Step S266 loads the finger number data into current finger register GUNSI. Step S267 checks if a note on or off time has come. When a note on time has come, step S268 computes X by:

X=BSTEP−BGATE, in which BSTEP indicates the time difference between the previous note on time and the current note on time and BGATE indicates previous note duration. Thus, the X indicates a rest time between the previous note off time and current note on time. Then step S269 compares X with VAL. If the rest time X is shorter than the preselected time value VAL (X<VAL), there is a possibility of turning over or under of the current finger to play the current note. Thus, step S270 computes A by:

A=(GNOTE−BNOTE)×GUNSI−BUNSI), in which GNOTE indicates the current note, B note indicates the previous note, GUNSI indicates the current finger and BUNSI indicates the previous finger. Step S271 checks if A<0 for right hand, or checks if A>0 for left hand. In the affirmative, step S272 checks if GNOTE−BNOTE>0, indicative a current note higher than a previous note. In the affirmative, step S273 turns on or displays the right direction arrow whereas in the negative, step S274 turns on or displays the left direction arrow. Then step S275 moves the current note data GNOTE to BNOTE and moves the current finger data GUNSI to BUNSI. Step S276 loads step time data of the current note on event record into BSTEP and loads the gate time data into BGATE.

If step S269 finds X≧VAL, or if step S271 finds A<0 for right hand or A>0 for left hand, step S277 moves the current note data GNOTE to BNOTE and moves the current fingered data GUNSI to BUNSI. Step S278 loads the step time data of the current note on event record into BSTEP and loads the gate time data into BGATE. Step S279 turns off or clears an arrow, if any, from the hand display. After the step S276 or S279, the process returns to step S264 to repeat the loop.

Figures 42A, 42B:
FIGS. 42A and B show music staff, and corresponding fingered music data used in the fifth embodiment of the invention.

An operation of the fifth embodiment is described by reference to FIGS. 42A and B. FIG. 42A illustrates a staff of music to be played by the right hand. Metronomic indication of tempo is 120 quarter notes per minute. FIG. 42B shows stored fingered music data corresponding to the staff music shown in FIG. 42A. In the fingered music data, 21, 22 and 23 stand for the thumb, index and middle fingers of the right hand, respectively. Since the tempo is 120 quarter notes per minute, each note on event record E1, E3, E5, E7 has a step time of 0.5 second. The predetermined time value VAL may be chosen to 0.18 second.

In response to the first note on event E1, step S269 finds X>VAL. Thus the steps S277, S278 and S279 are executed, so that BNOTE is set to note number C3, BUNSI set to finger number 21, BSTEP set to 0.5 and BGATE set to 0.3. In this case, no arrow is displayed on the hand display, thus, indicating the right hand thumb is naturally used to play the note C3 without turning under. In response to the second note on event E3, step S269 finds X>VA (=0.18) since X=BSTEP (0.5)−BGATE(0.3)=0.2. Thus, the steps S277−S279 are executed, so that BNOTE is set to a note number D3, BUNSI set to note number 22, BSTEP set 0.5 and BGATE set to 0.3. In this case, no arrow is displayed on the hand display, thus indicating that the right hand index finger is noramally used to play the note D3 without turning over.

In response to the third note on event B5, step S269 finds X>VAL since X=DSTEP (0.5)−BGATE (0.3)=0.2. Thus, steps S277−279 are executed, so that BNOTE is set to note number E3, BUNSI set to finger number 23, BSTEP set to 0.5 and BGATE set to 0.35. Again, no arrow is displayed on the hand display, thus indicating that the right hand middle finger is normally used to play the note E3 without turning over.

In response to the fourth note on event E7, step S269 finds X<VA L since X=BSTEP(0.5)−BGATE(0.35)=0.15. Thus, steps S270 and S271 are executed, finding A<0 since A=(F3−E3)×(21−23)=−2. Thus the step S273 is executed to turn on the right direction arrow. Then, steps S275 and 276 are executed, so that BNOTE is set to note number F3, BUNSI set to finger number 21, BSTEP set to 0.5 and BGATE set to 0.3. In this manner, the note on event E7 causes the process to turn on or display the right direction arrow, thus indicating that the right hand thumb has to turn under the index and middle fingers to play the note F3. In response to the note off event E8, step S279 is executed, so that the right direction arrow is turned off or cleared from the hand display.

In accordance with the fifth embodiment of the invention, CPU computes a rest time between a previous note off time and current note on time and uses the rest time to determine possibility of turning over and under of a current finger. Specifically, if the rest time is long enough, CPU finds no need of turning over or under of a current finger. If the rest time is short, CPU examines possibility of turning over or under of the current finger, using previous and current note number data, and previous and current finger data. Like the other embodiments, the fifth embodiment provides visual image presentation of turning over and under of fingers, thus helping a player to play music on a keyboard instruments. The data format of the fingerrf music data shown in FIG. 40 is only illustrative. For example, in place of step time data, time data indicative of a time difference from start of music may be used. The fifth embodiment may be applied to the fingered music data having a data structure shown in FIGS. 11A−C with obvious modification. In the data structure in FIGS. 11A−C, in place of event-to-event time data, event time data indicative of a time difference measured from start of music may be used.

In either case, a rest time defined by a previous note off time and current note on time can readily be computed from time data included in stored fingered music data in accordance with the invention.

In place of the rest time, a time difference between note on events may be used to determined possibility of turning over or under. To this end, step S268 is omitted and step S269 is modified so as to compare BSTEP with the predetermined time value VAL. If BSTEP<VAL, the process examines possibility of turning over or under in the manner as described (see steps S270 and S271). If BSTEP≧VAL, there is no need of turning over or under.

Each embodiment described so far is arranged to indicate turning over and under of fingers by a still picture. It may be indicated, however, in a motion picture. A motion picture presentation of turning over and under of fingers clarify details thereof and makes the displayed fingering more realistic. Such a motion picture of fingering operations may be made using an animation cartoon. In the alternative, it may be made using a movie camera which takes a motion picture of actual fingering operations of music performance on a keyboard instrument. Computer graphics may be used to provide such a motion picture. The invention can also be applied to a module connectable to an electronic music instrument, or a unit to be built in electronic music instruments.

The sixth embodiment of the invention is now described by reference FIGS. 43−57E.

Figure 43:
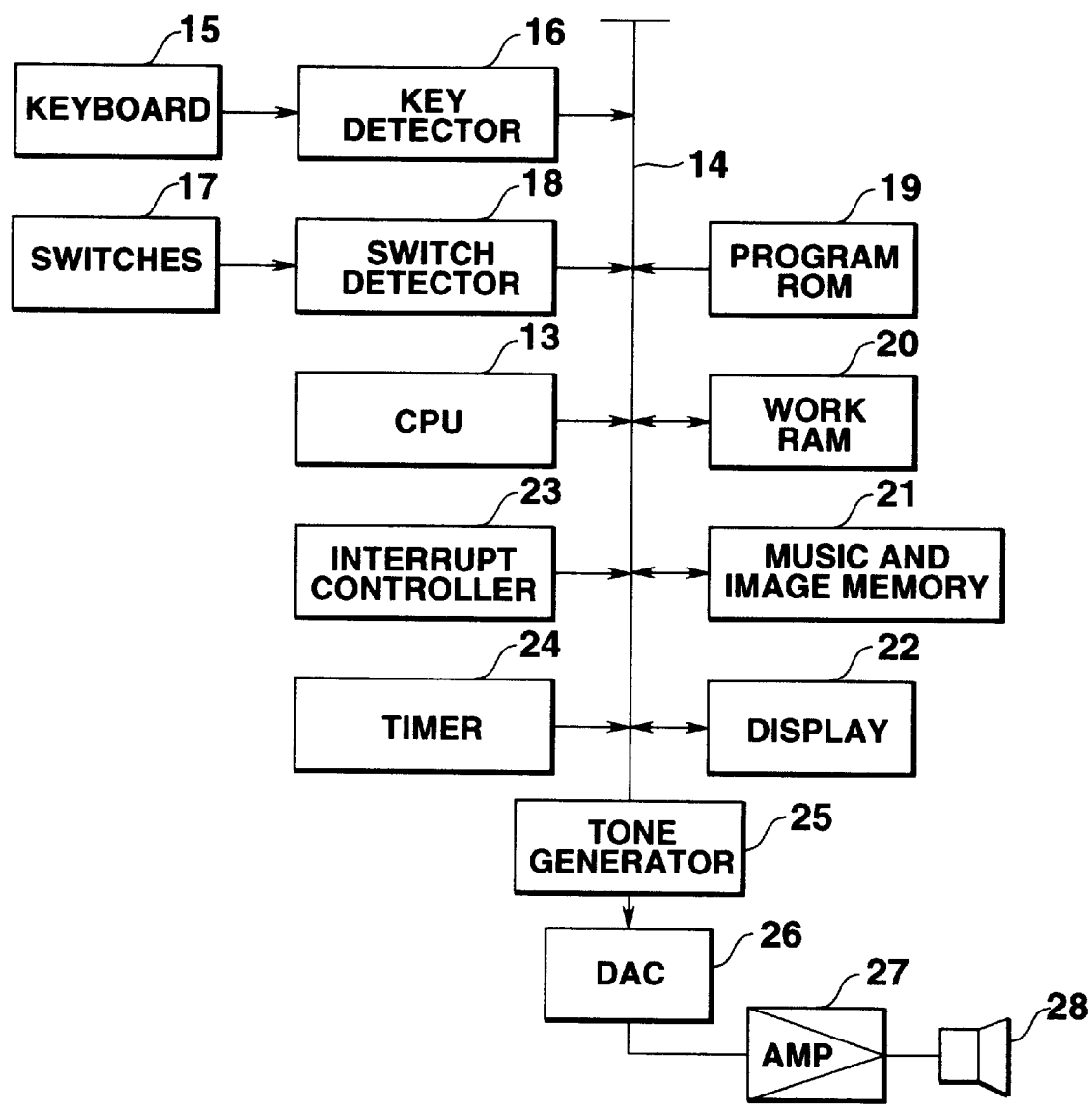
FIG. 43 is a block diagram of a hardware arrangement of an electronic music instrument in accordance with the sixth embodiment of the invention.

FIG. 43 shows a system arrangement of an electronic keyboard instrument in accordance with the sixth embodiment of the invention. CPU 13 communicates data and commands with respective components by way of a system bus 14 to control the entirety of the electronic keyboard instrument. A keyboard 15 signals key operations to CPU 13 via a key detector 16. Switches 17 signal switch operations to CPU13 via a switch detector 18.

Program ROM 19 stores programs for controlling CPU 13 and data for system initialization. Work RAM 20 is used by CPU13, as a work area for storing data in process.

Music and image memory 21 comprises a fingered music storage and hand image storage. The fingered music storage stores fingered music data of a music piece. The fingered music data comprises a plurality of music parts or lines. For instance, the fingered music data comprises right and left hand parts or lines. If desired, the music data may further include automatic accompaniment parts or lines. Each music line (right or left hand part) comprises a succession of note records including information on notes and fingers to be used to play the notes.

Figure 44:
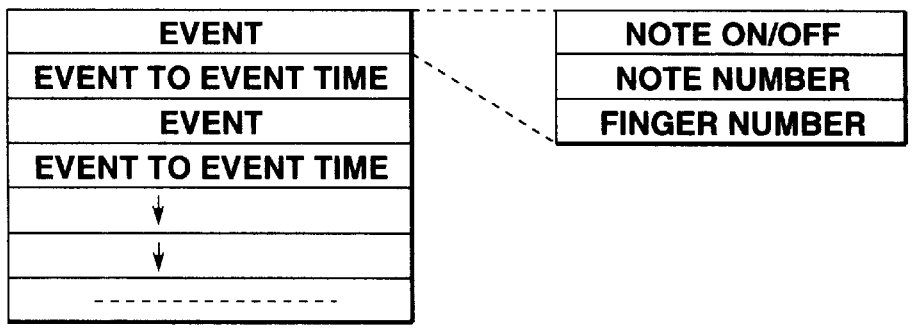
FIG. 44 shows a data structure of fingered music data in accordance with the sixth embodiment of the invention.

FIG. 44 shows a data structure of music data of a right or left hand music line. The music data comprises a succession of event records with event-to-event time data inserted between adjacent event records. Each event record comprises a note on or off code, note number data, and finger number data indicative of a finger to be used to play the note.

The hand image storage stores a plurality of hand image data representative of fingering motion of a hand. Each hand image corresponds to a different one of combinations of old and new notes and old and new fingers. In the sixth embodiment of the invention, the hand image storage takes a form of a look-up table which stores a plurality of such hand image data. Each hand image is addressable by arguments of a new (next) and an old (current) code fingers and difference of a new (next) note from an old (current) note.

This is illustrated in FIG. 53. In FIG. 53, the first argument is called current finger: finger numbers 1, 2, 3, 4 and 5 stand for thumb, index, middle, ring and little finger, respectively. The second argument is called next finger: the finger numbers is 1, 2, 3, 4 and 5 similarly stand for thumb, index, middle, ring and little finger, respectively. The third argument is called a note difference (NEXT NOTE−CURRENT NOTE). The note difference ranges from −12 to +12. Thus, the hand image storage of the sixth embodiment stores 625 hand images in total for all possible combinations of new (next) and old (current) fingers and note difference of a new (next) note from an old (current) note.

For navigation display for music performance, CPU 13 reads note records from the fingered music storage at a tempo of play of the music, selects appropriate hand image data from the hand image storage based on current and next note records and outputs the selected hand image data to a display 22.

It is desired to select, as the appropriate hand image data, a sequence of image data representative of fingering motion of a hand in playing current and next note in a motion picture manner.

To this end, a feature of the sixth embodiment controls CPU13 so as to function as segmenting means which divides a time interval between a current note time (e.g., current note on time) and a next note time (e.g., next note on time) into a plurality of (e.g., four) time segments, selecting means which selects, for each of the plurality of time segments, appropriate hand image data from the hand image storage based on current and next notes and current and next fingers, and outputting means which outputs the selected image data at the time of each time segment, thus providing visual and animated image presentation of fingering motion in playing notes.

In accordance with another feature of the sixth embodiment, CPU13 functions as determining means which determines whether a rest time between a current note-off time and next note-on time is longer than a predetermined time value. In the affirmative, CPU 13 selects hand image data from the hand image storage based on a current note record. This is done by looking up the hand image storage using the current finger number as the first and the second arguments and "0" as the third argument (note difference). Then CPU 13 shifts a display position of the selected hand image data and outputs resultant hand image data, thus providing visual image presentation of a moving hand.

Turning back to FIG. 43, the display 22 may comprises ALCD display which displays a selected hand image at a selected display position. A timer 23 pediorically generates and supplies an interrupt request signal to CPU13. An interrupt controller 24 arbitrates priorities among a plurality of interrupt request signals including one from the timer 23. A tone generator 25 produces a tone signal under the control of CPU 13. A digital-to-analog converter 26 converts a digital tone signal from the tone generator 25 to a corresponding analog signal. An amplifier 27 filters and level-controls the analog tone signal from digital to analog converter 26 and supplies the resultant signal to a speaker 28 which emits a corresponding sound.

FIG. 45 shows variables (registers, counters and flags) residing in the work RAM 20.

A variable or register REST TIME indicates a rest time between a current note off time a next note on time. A register NOTE-TO-NOTE TIME indicates a time interval between a current note on time and next note on time. A register CURRENT NOTE indicate a current note number. A register NEXT NOTE indicate a next note number. A register BIAS indicate a normal key distance between current and next fingers. The key distance BIAS may be given by 2×(NEXT FINGER−CURRENT FINGER). Thus, the key distance BIAS represents a number of keys normally spanned by current and next fingers used to play current and next notes on a keyboard.

A NOTETIME COUNTER is used to measure lapse of each quarter of NOTE-TO-NOTE TIME. A TEMPO COUNTER is used to measure lapse of a tempo time value which depends on actual tempo of music and represents a musical time unit. An ELAPSED TIME COUNTER is used to measure lapse of a time of a music line. A DISPLAY COUNTER indicates a current time segment of the time interval NOTE-TO-NOTE TIME. In the first quarter of NOTE-TO-NOTE TIME, the DISPLAY COUNTER is set to "0". In the second quarter it is set to "1". Similarly, in the third and fourth quarters, it is set to "2" and "3", respectively. A REST FLAG indicates absence or presence of a note. The REST FLAG is "on" in the absence of a note whereas it is "off" in presence of a note. A SHIFT FLAG indicates whether a hand moves to play a next note. The SHIFTFLAG is set to "ON" when a rest time between a current note off time and a next note on time is longer than a predetermined time value. In the negative, it is reset to "OFF". The variables shown in FIG. 45 are provided for each music part or line (right hand part, left hand part).

Figure 46:
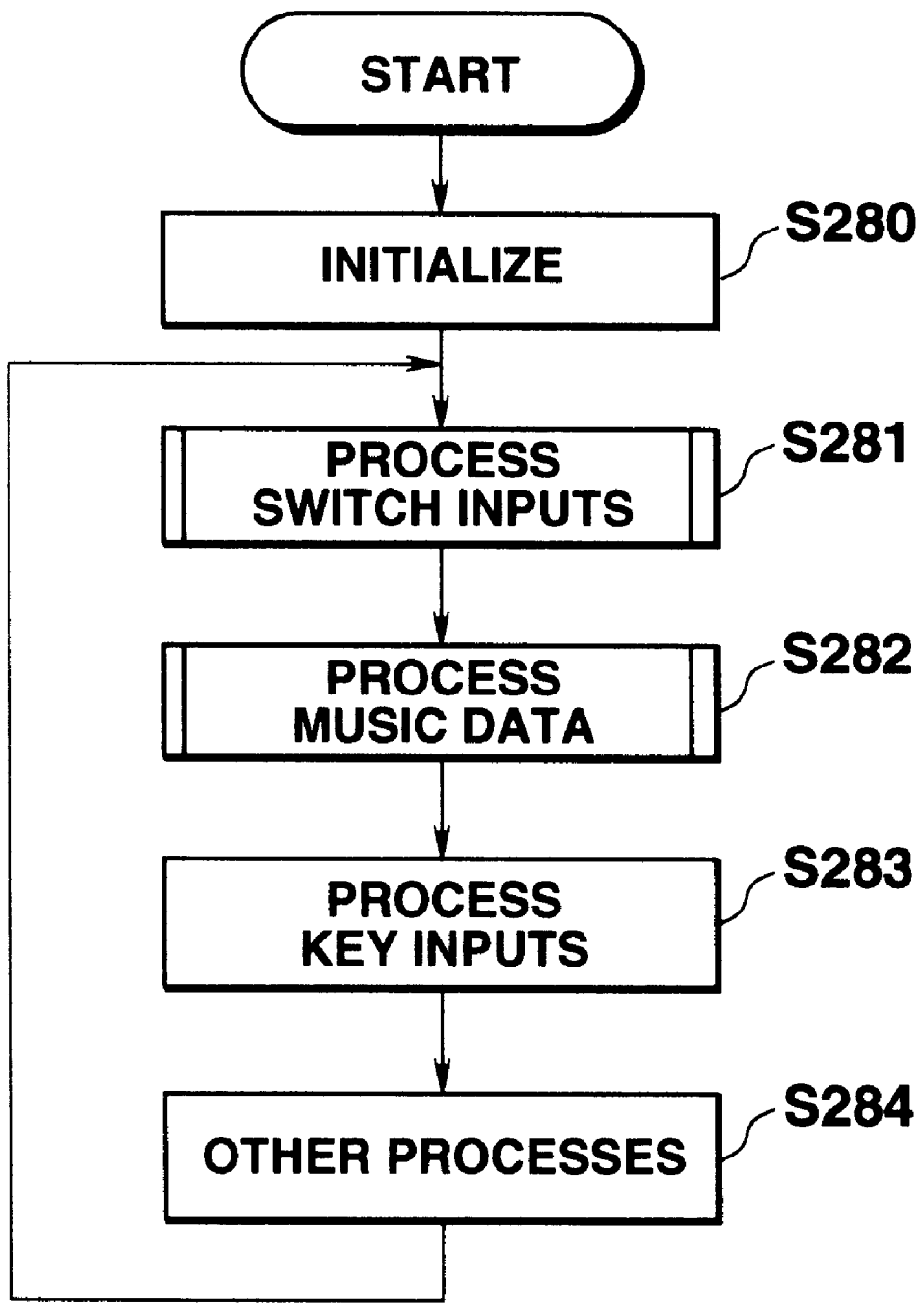
FIG. 46 is a flowchart of a main program in accordance with the sixth embodiment of the invention.

FIG. 46 shows a flowchart of a main program executed by CPU 13 in accordance with the sixth embodiment of the invention. Step S280 initializes the system, including initializing or clearing registers, counters and flags in work RAM 20. In the main loop, step S281 processes switch input. Step S282 processes music data. Step S283 processes key inputs. Step S284 executes other processing.

Figure 47:
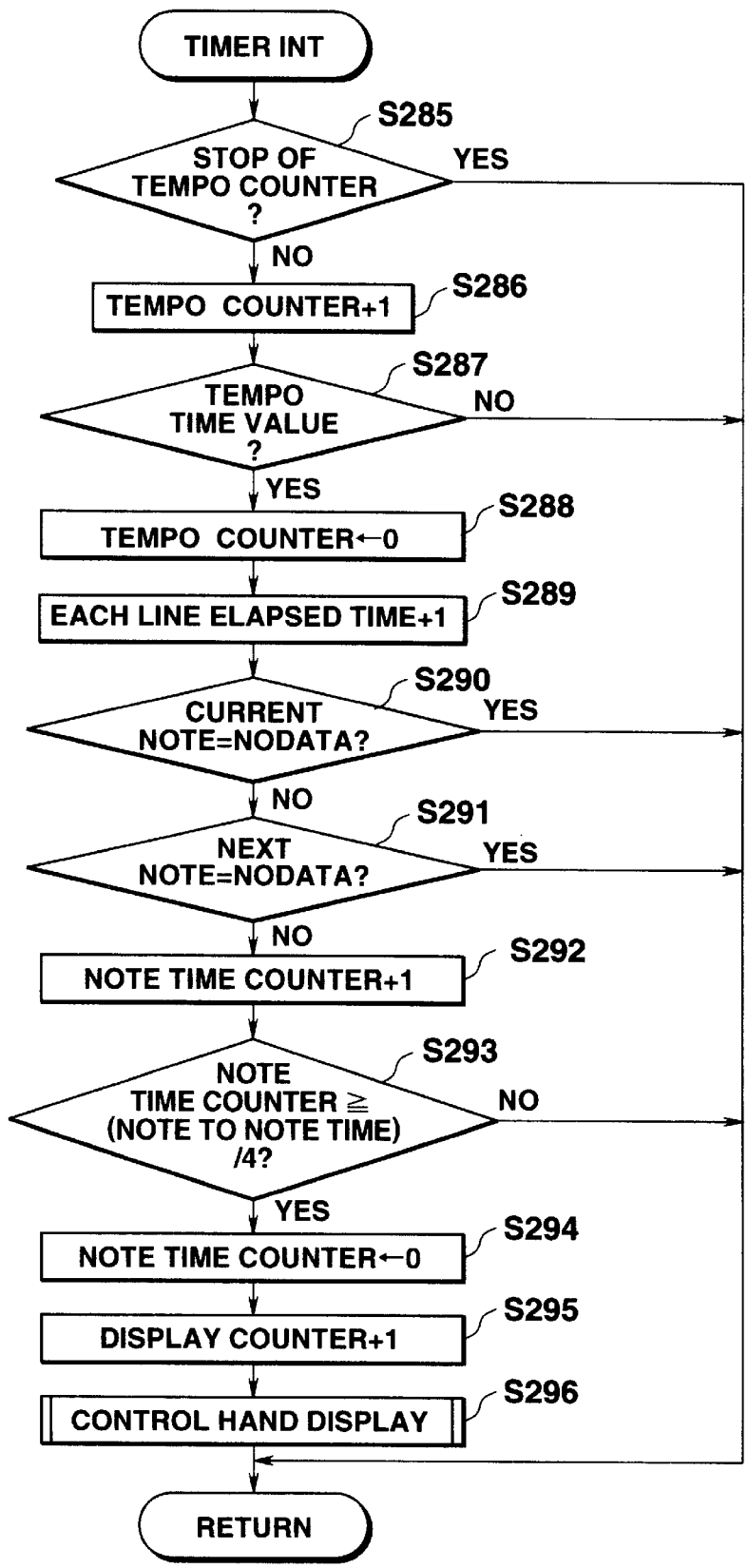
FIG. 47 is a flowchart of a timer interrupt routine in accordance with the sixth embodiment of the invention.
Figure 48:
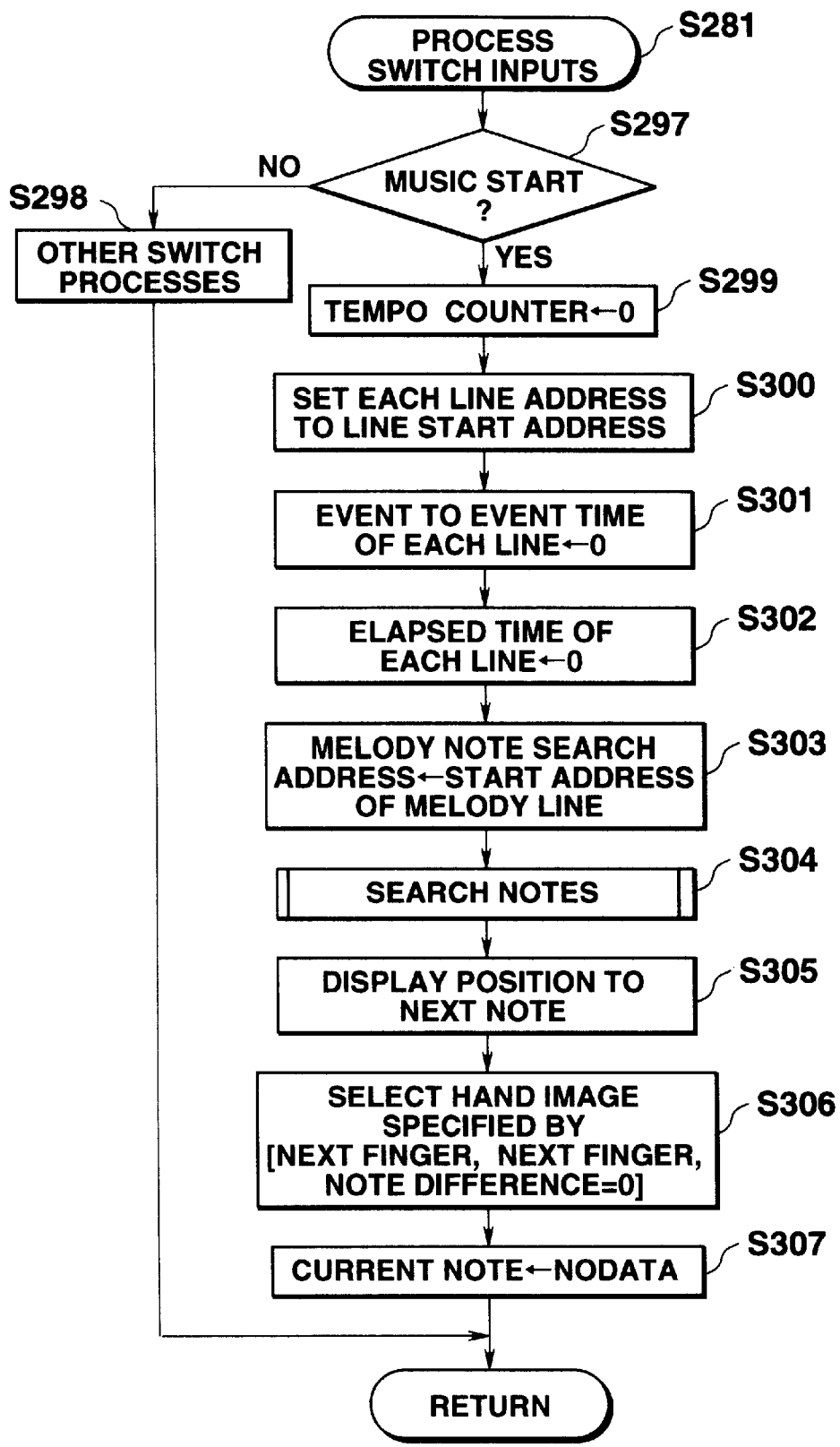
FIG. 48 is a flowchart of a process switch inputs routine in accordance with the sixth embodiment of the invention.

FIG. 47 shows a flowchart of a timer interrupt routine called each time when the timer 23 generates an interrupt request signal. Step S285 checks if the TEMPO COUNTER is stopped. In the affirmative, the process returns to the main program. In the negative, step S286 increments the TEMPO COUNTER. Step S287 checks if the TEMPO COUNTER has reached a predetermined tempo time value.

In the negative, the process returns to the main program. In the affirmative, step S302 clears ELAPSED TIME COUNTER of each line to "0". Step S303 initializes MELODY NOTE SEARCH ADDRESS POINTER to start address of melody line. Step S304 searchs notes according to a flowchart of FIG. 49. In the search notes step S304, certain variables including NEXT NOTE and NEXT FINGER are determined. At this time (music start time), NEXT NOTE and NEXT FINGER respectively indicates, note number and finger number in the first note on event record of melody line. Step S305 initializes display position of a hand image to NEXT NOTE. Step S306 selects hand image data specified by [NEXT FINGER, NEXT FINGER, NOTE DIFFERENCE=0]. This means CPU 13 uses NEXT FINGER as the first and second arguments and uses "0" as the third argument to look up appropriate hand image data in the hand image storage. In the step S306, CPU 13 sends the selected hand image data and display position data to the display 22, so that display 22 displays an initial hand image at a designated position. A picture of keyboard may be printed on the display screen of the display 22. In this case, the initial hand image is positioned such that the image segment of next finger is placed on the next note key printed. The initial hand image represents a hand normally placed on a keyboard. Step S307 loads null NODATA into CURRENT NOTE.

Figure 50:
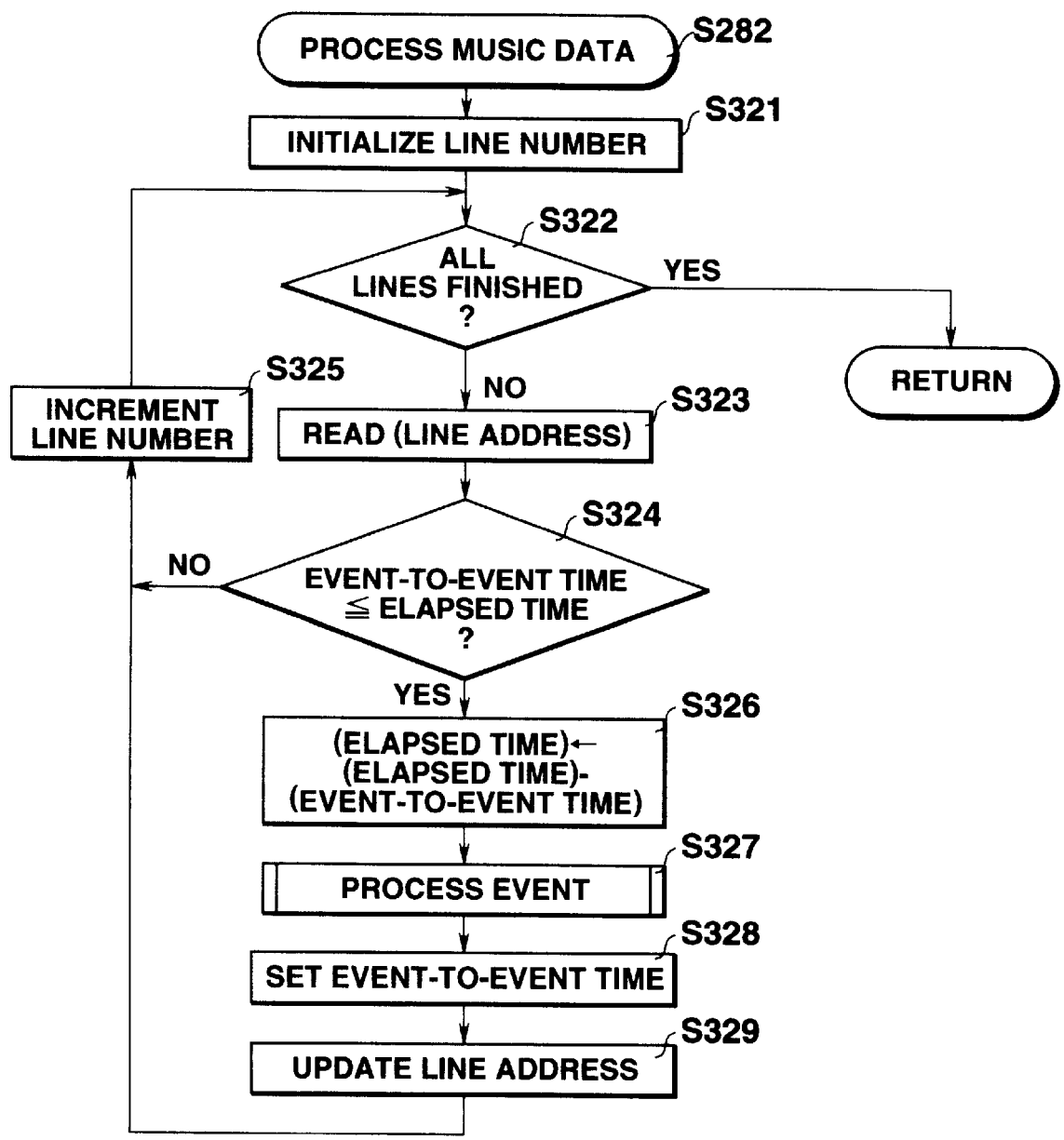
FIG. 50 is a flowchart of a process music data routine in accordance with the sixth embodiment of the invention.

FIG. 50 is a flowchart of the process music data routine called in step S182. Step S321 initializes a line number. In the loop of step S322–329, step 322 checks if all lines are finished. In the negative, step S323 reads a new event record using the line address. Step 324 checks if EVENT-TO-EVENT TIME≦ELAPSED TIME. This is the case when a note on or off time has come. In the negative, step S325 increments LINE NUMBER, and the process returns to step S322.

If step S324 finds EVENT-TO-EVENT TIME≦ELAPSED TIME, step S326 sets ELAPSED TIME to ELAPSED TIME–EVENT-TO-EVENT TIME, thus updating ELAPSED TIME. Step S327 processes the event according to a flowchart of FIG. 51. Step S327 sets EVENT-TO-EVENT TIME to event-to-event time data in the event record. Step S329 updates LINE ADDRESS. If the step S322 finds that all lines are finished, the process returns to the main program.

Figure 51:
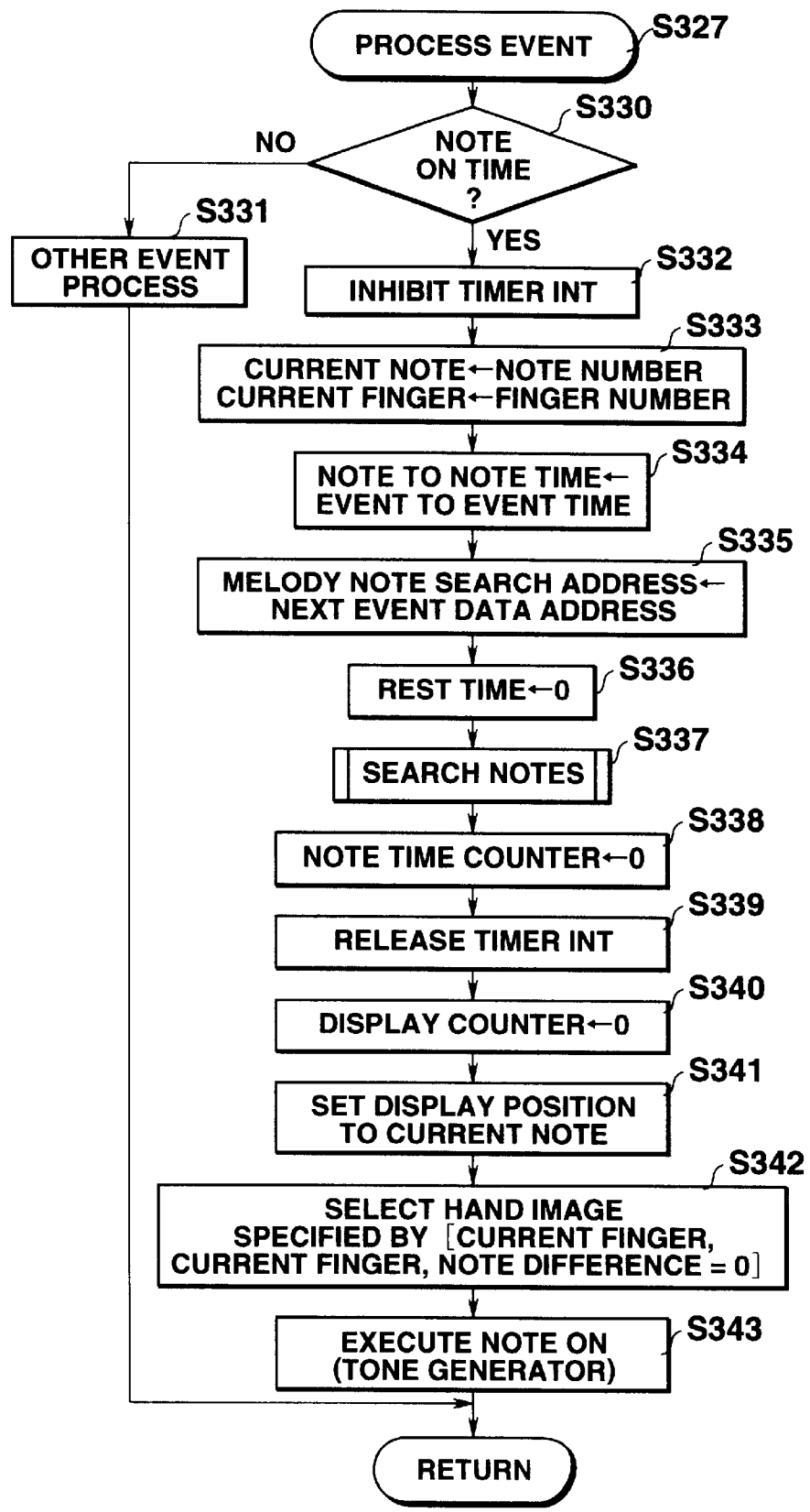
FIG. 51 is a flowchart of a process event routine in accordance with the sixth embodiment of the invention.

FIG. 51 shows a flowchart of the process event routine called in step 327. Step S330 checks if it is a note on time. In the affirmative, steps S332–S343 are executed to process the note on event.

Specifically, step S332 inhibits the timer interrupt. Step S333 loads the note number of the note on event record into CURRENT NOTE and loads the finger number data into CURRENT FINGER. Step S334 loads event-to-event time data of the note on event record into NOTE-TO-NOTE TIME. At this time, NOTE-TO-NOTE TIME indicates a time between a current note on and off i.e., duration of the current note. Step S335 updates MELODY NOTE SEARCH ADDRESS to next event data address. Step S336 initializes REST TIME to "0". Step S337 calls a search notes routine (FIG. 49).

Figure 49:
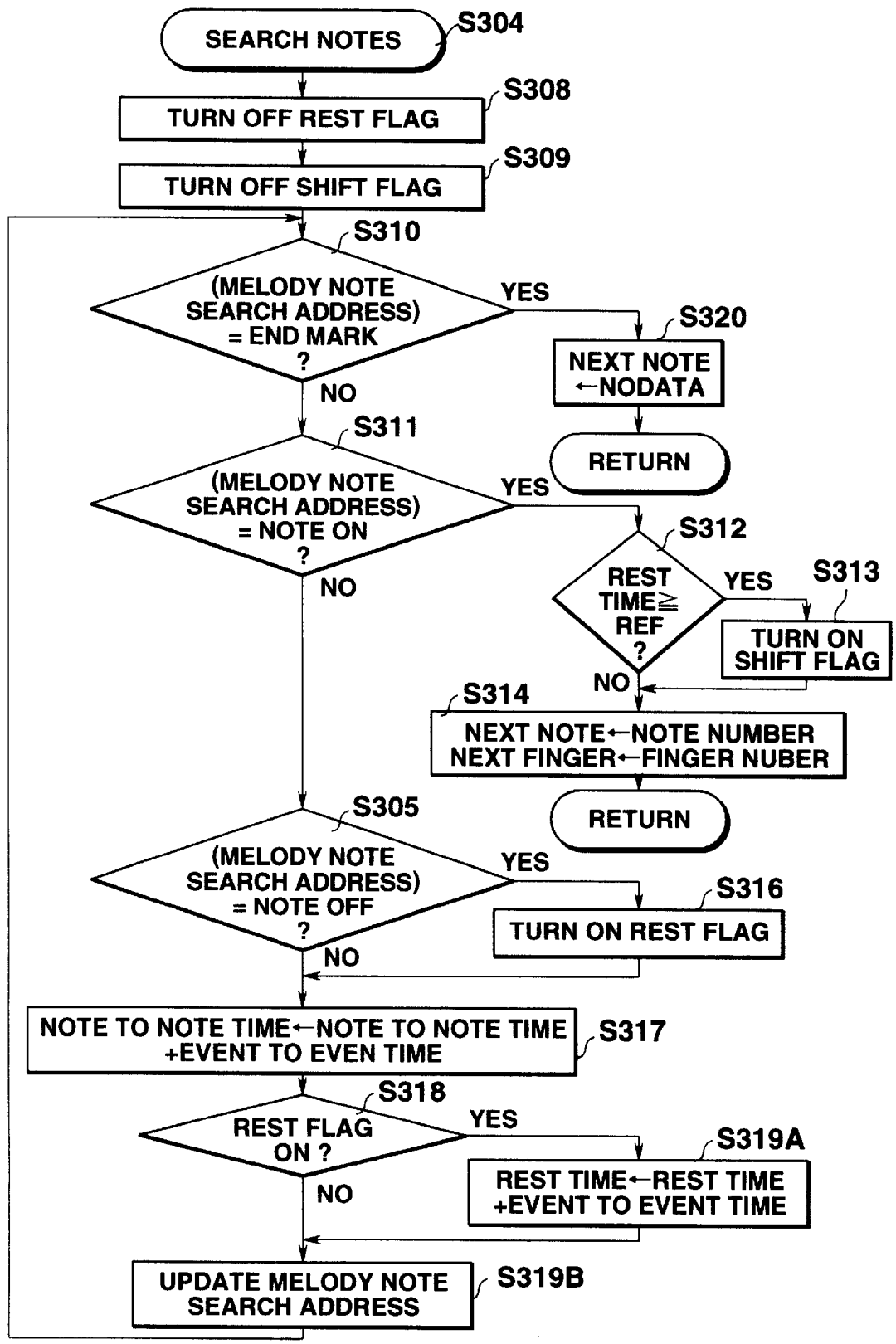
FIG. 49 is a flowchart of a search notes routine in accordance with the sixth embodiment of the invention.

It is now convenient to describe the search note routine shown in FIG. 49.

Step S308 turns off REST FLAG. Step S309 turns off SHIFT FLAG. Step S310 checks if data at MELODY NOTE SEARCH ADDRESS is an end mark.

In the negative, step S311 checks if the data at MELODY NOTE SEARCH ADDRESS is a note on code.

In the negative, step S305 checks if data at MELODY NOTE SEARCH ADDRESS is a note off code. If this is the case, step S316 turns on REST FLAG.

After step S316 or after step S305 finding the data is not a note off code, step 317 adds event-to-event time data in the event record to NOTE-TO-NOTE TIME. At the NOTE-TO-NOTE TIME now indicates a time interval between a current note on and a next note on. Step S318 checks if REST FLAG is on. In the affirmative, step S319A adds event-to-event time data of the event record to REST TIME. Now, REST TIME indicates a time difference between a current note off time and next note on time.

After step S319A or after step S318 finding REST FLAG off, step S319B is executed to update MELODY NOTE SEARCH ADDRESS. At this time, the MELODY NOTE SEARCH ADDRESS pointer points to a next note on event record.

Thus, in the second pass of the loop, step S311 finds a note on code. Then step S312 is executed to check if REST TIME≧REF. This is the case when the REST TIME between a current note off and a next note on is longer than a predetermined time value REF. In the affirmative, step S313 is executed to turn on SHIFT FLAG. In the negative, SHIFT FLAG remains "OFF".

After step S313 or after step S312 yielding NO to REST TIME≧REF, step S314 loads the note number data of the note on event record to NEXT NOTE and loads finger number data of the note on event record to NEXT FINGER. After the step S314, the search note routine returns to the calling routine.

If a current note on event is the last note on event of music line, search notes routine finds at step S310 in the first pass of the loop that data at the MELODY NOTE SEARCH address is an end mark. In this case, step S320 is executed to loads null NODATA into NEXT NOTE. Then, the search note is routine returns to the calling routine.

Turning back to FIG. 21, step S338 (after step S337) clears NOTE TIME COUNTER to "0". Step S339 releases the timer interrupt. Step S340 initializes DISPLAY COUNTER to "0". Step S341 sets the display position of a hand image to CURRENT NOTE. Step S342 selects hand image specified by [CURRENT FINGER, CURRENT FINGER, NOTE DIFFERENCE=0]. This means using CURRENT FINGER as the first and second arguments, and "0" as the third argument to look up appropriate hand image data in the hand image storage. CPU 13 sends the selected hand image data and display position data to the display 22 which thus displays a corresponding hand image at specified position. Step S343 executes note on. That is, CPU 13 sends a note on command to the tone generator 25 which thus generates a corresponding tone.

If step S330 finds it is a note off time, step S331 processes the note off event. After step S343 or S331, the process event routine returns to the process music data routine (FIG. 50).

Figure 52:
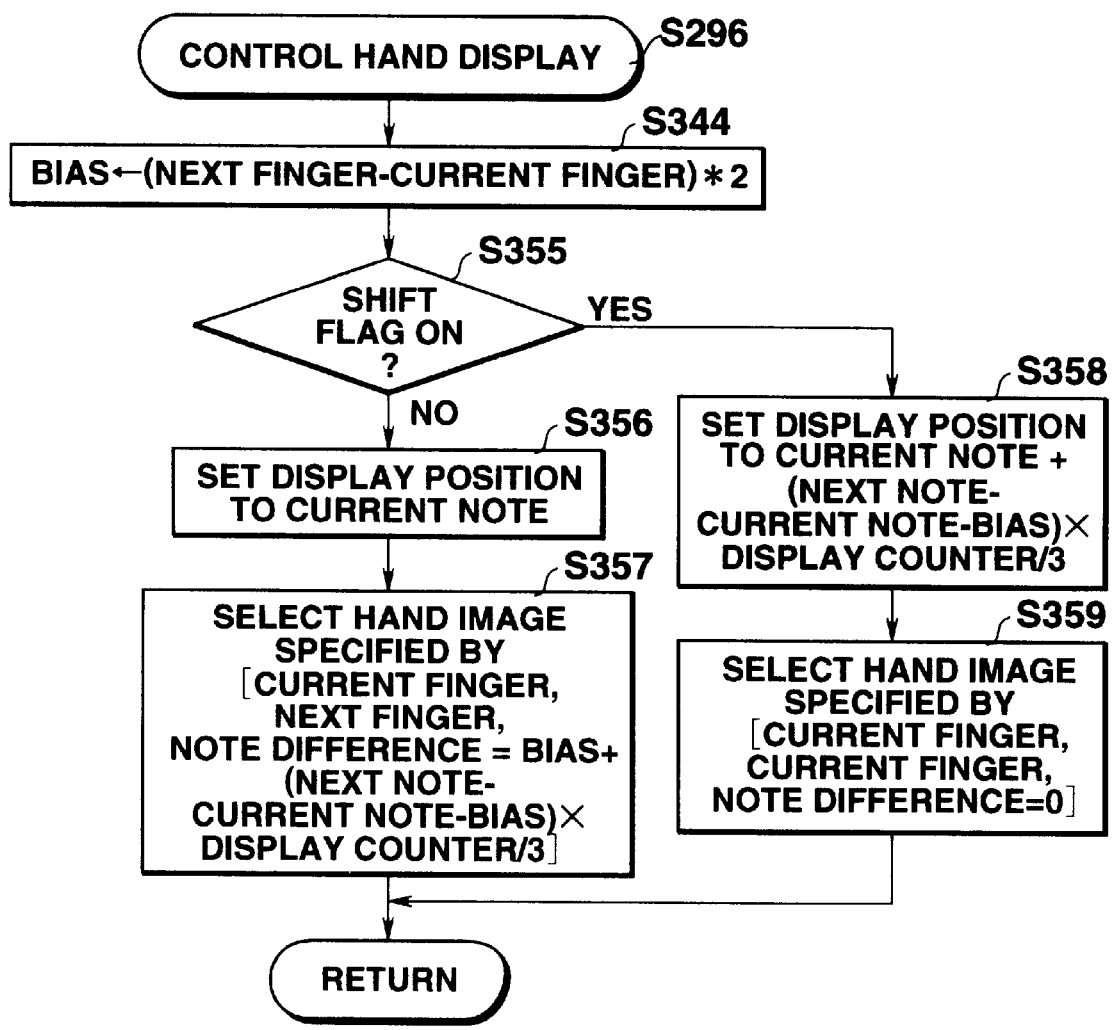
FIG. 52 is a flowchart of a control hand display routine in accordance with the sixth embodiment of the invention.

FIG. 52 is a flowchart of the control hand display routine called in step S296 in the timer interrupt routine (FIG. 47). Step S344 uses CURRENT FINGER and NEXT FINGER to compute a normal key distance BIAS by:

$$BIAS=(NEXT\ FINGER-CURRENT\ FINGER)\times 2$$

Step S355 checks if SHIFT FLAG is on. This is the case when a rest time between a current note off and a next note on is longer than a predetermined time value REF.

If the SHIFT FLAG is off, indicative of a rest time shorter than the predetermined time value, step S356 is executed to set DISPLAY POSITION to CURRENT NOTE. Then step S357 selects hand image data specified by [CURRENT FINGER, NEXT FINGER, NOTE DIFFERENCE=BIAS+ (NEXT NOTE−CURRENT NOTE−BIAS)×DISPLAY COUNTER/3]. This means using CURRENT FINGER as the first argument, NEXT FINGER as the second argument and NOTE DIFFERENCE=BIAS+(NEXT NOTE−CURRENT NOTE−BIAS)×DISPLAY COUNTER/3 as the third argument to look up appropriate hand image data in the hand image storage. If BIAS+(NEXT NOTE−CURRENT NOTE−BIAS)×DISPLAY COUNTER/3<−12, NOTE DIFFERENCE is set to −12. If BIAS+(NEXT NOTE−CURRENT NOTE−BIAS)×DISPLAY COUNTER/3>12, NOTE DIFFERENCE is limited to 12.

Clearly, the selected hand image depends on CURRENT FINGER and NEXT FINGER. The selected hand image also depends on a current time segment in the time interval NOTE TO NOTE TIME between a note on and a next note on since the DISPLAY COUNTER indicates the current time segment.

In step S357, CPU 13 sends the selected hand image and display position data to the display 22 which thus displays a corresponding hand image at specified position.

It is now understood that the displayed hand image dynamically changes depending on current time segment as well as current finger and next finger. This is an animated hand image presentation showing fingering motion of a hand in playing current and next notes in a motion picture manner.

If step S355 finds SHIFT FLAG "ON", indicative of a rest time longer than the predetermined time value, step S358 executed to set DISPLAY POSITION to CURRENT NOTE+(NEXT NOTE−CURRENT NOTE−BIAS)× DISPLAY COUNTER/3. This means shifting hand display position as a function of time, depending on DISPLAY COUNTER or current time segment.

Then step S359 selects hand image data specified by [CURRENT FINGER, CURRENT FINGER, NOTE DIFFERENCE=0]. This means using CURRENT FINGER as the first and second arguments, and "0" as the third argument to look up an appropriate hand image in the hand image storage.

It is noted that selected hand image in question is in dependent from a current time segment or DISPLAY COUNTER.

In step S359, CPU 13 sends the selected hand image data and display position data to the display 22 which thus displays a corresponding hand image at specified position.

Therefore, in the case of a rest time longer than a predetermined time value, the display 22 provides visual image presentation of a moving hand. That is, the displayed hand image simply moves from current note play position to next note play position.

Figure 54A:
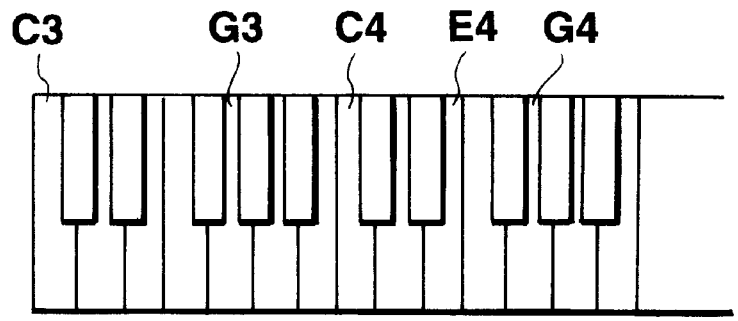
FIGS. 54A–C, 55A–E, 56A–E and 57A–E illustrate hand image presentations provided by the sixth embodiment of the invention.
Figure 54B:
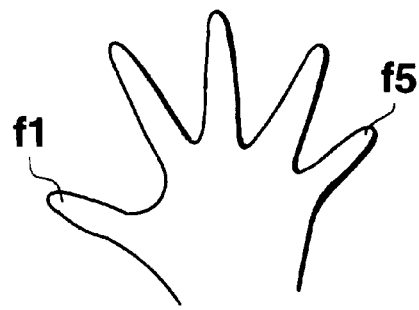
Figure 54C:
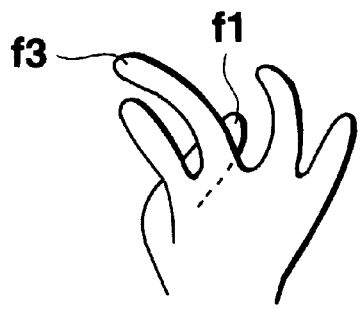

Operation examples of the sixth embodiment are now described by reference to FIGS. 54A–C, 55A–E, 56E and 57A–E. In FIGS. 54A–C, let us suppose a keyboard player plays G3 note using the right hand thumb and then uses the little finger to play G4 note (see FIG. 54A). At the time of playing G3 note, a hand image specified by [CURRENT FINGER=1, CURRENT FINGER=1, NOTE DIFFERENCE=0] is selected and displayed. This hand image is not shown in FIGS. 54A–C but displayed on the screen such that the thumb image f1 corresponds to C3 note and the little finger image f5 corresponds to D4 note or near by. If there is no or little rest time before playing the next note G4, the player must extend or stretch out the right hand to reach G4 note. For music performance navigation, another hand, such as shown in FIG. 54B, is selected and displayed at the time of playing the next note G4 in such a manner that the thumb finger F1 still corresponds to C3 note whereas the little finger now corresponds to G4 note. This extended hand image is specified by

[CURRENT FINGER=1, NEXT FINGER=5, NOTE DIFFERENCE=12]

Let us now suppose that a keyboard player plays C4 note with the right hand thumb and then uses the middle finger to play G3 note. At the time of playing C4 note, a hand image specified by [CURRENT FINGER=1, CURRENT FINGER=1, NOTE DIFFERENCE=0] is selected and displayed in such a manner that the thumb image f1 corresponds to C4 note and the little finger generally corresponds to G4 note. If there is no or little rest time before playing the next note G3 with the middle finger, the player must control the middle finger to turn over the thumb to reach G3 note. For music performance navigation, another hand image, such as shown in FIG. 54C, is selected and displayed at the time of playing G3 note. This hand image clearly indicates the middle finger f3 that turns over the thumb f1. The middle finger image f3 corresponds to G3 note whereas the thumb image f1 still corresponds to C4 note.

In the discussion of FIGS. 54A–C, it is assumed that the apparatus select and displays a hand image at each time of playing a note.

In accordance with a motion picture presentation feature of the sixth embodiment, the displayed hand image changes depending on a current time segment in the time interval between note on events, thus showing more realistic fingering motion of a hand in playing current and next note. The examples are shown in FIGS. 55A–E, 56A–E and 57A–E.

Figure 55A:
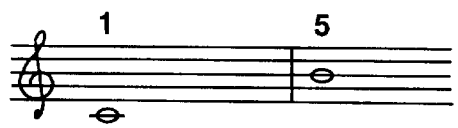
Figure 55B:
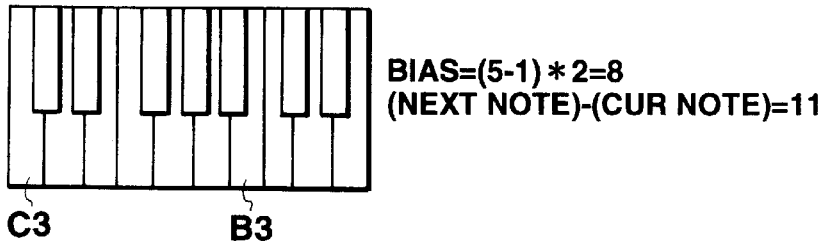
Figure 55C:
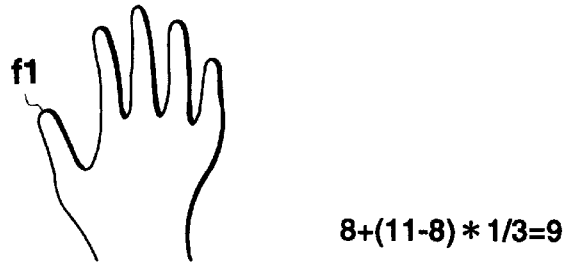
Figure 55D:
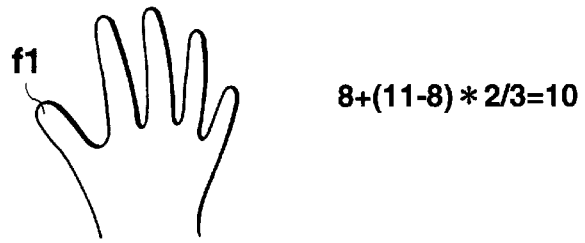
Figure 55E:
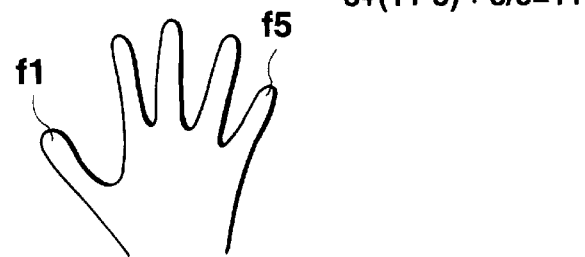

In FIGS. 55A–E, a fingered music staff (see FIG. 55A) indicates that a whole note of C3 is played with the thumb and then whole note of B3 is played with the little finger. No rest is indicated between the notes. Since the CURRENT FINGER is "thumb" and the NEXT FINGER is "little finger", the key distance BIAS between the thumb and the little finger is given by BIAS=(5−1)×2=8, as shown in FIG. 55B. The note difference between current and next notes is given by (NEXT NOTE B3−CURRENT NOTE C3)=11. Since there is no rest between the notes, SHIFT FLAG is "OFF". When DISPLAY COUNTER=0, indicative of the first quarter of the time inter between C3 note on and B3 note on, a hand image (note shown) is selected and displayed in such a manner that thumb image f1 corresponds to C3 note and the little finger generally corresponds to G3 note. When DISPLAY COUNTER=1, indicative of the second quarter of the time interval NOTE-TO-NOTE TIME, and a hand image such as shown in FIG. 55C is selected and displayed in such a manner that the thumb image f1 corresponds to C3 note and the little finger corresponds to A3 note. This hand image is specified by [CURRENT FINGER=1, NEXT FINGER=5, NOTE DIFFERENCE=9]. When display DISPLAY COUNTER=2, indicative of third quarter of the time interval between C3 note on and B3 note on, a hand image such as shown in FIG. 55D is selected and displayed in such a manner that the thumb corresponds to C3 note and the little finger corresponds to the boundary between A3 and B3 notes. This hand image is specified by [CURRENT FINGER=1, NEXT FINGER=5, NOTE DIFFERENCE= 10]. When DISPLAY COUNTER=3, indicative of the fourth or last quarter of the time interval between C3 note on and B3 note on, a hand image such as shown in FIG. 55E is selected and displayed. The hand image is such that the thumb image f1 correspond to C3 note and the little finger correspond to B3 note. This hand image is specified by

[CURRENT FINGER=1, NEXT FINGER=5, NOTE DIFFERENCE=11]. In this manner, a sequence of hand images are presented, showing fingering motion of spreading.

Figure 56A:
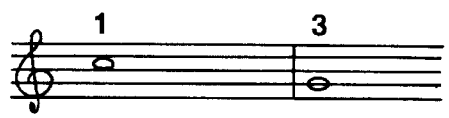
Figure 56B:
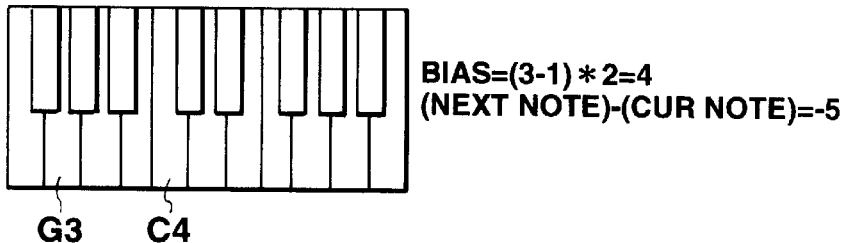
Figure 56C:
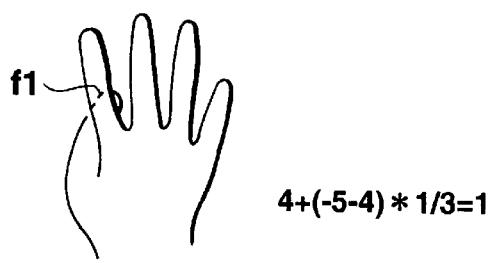
Figure 56D:
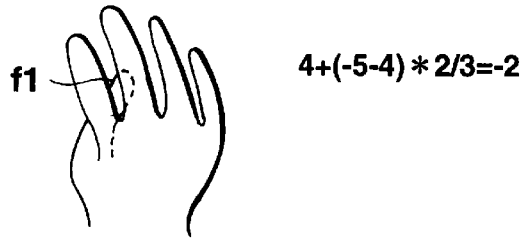
Figure 56E:
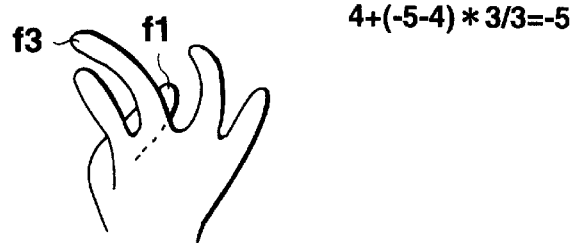

In FIGS. 56A–E, a fingered music staff (FIG. 56A) indicates that a whole note of C4 is played with the thumb and a next whole note of G3 is played with a middle finger. No rest is indicated between the notes. Since the CURRENT FINGER is "thumb" and the NEXT FINGER is "middle", the key distance BIAS is given by BIAS=(3−1)×2=4. The note difference between current and next notes is given by (NEXT NOTE−CURRENT NOTE)=−5. In absence of rest, SHIFT FLAG is placed "OFF". When DISPLAY COUNTER=1, a hand image such as shown in FIG. 56C, is selected and displayed. This hand image is specified by [CURRENT FINGER=1, NEXT FINGER=3, NOTE DIFFERENCE=1] and indicates start of turning over of the middle finger. When DISPLAY COUNTER=2, a hand image, such as the one shown in FIG. 56D, and specified by [CURRENT FINGER=1, NEXT FINGER=3, NOTE DIFFERENCE=−2], is selected and displayed. This hand image indicates a next phase of turning over of the middle finger. When DISPLAY COUNTER=3, a hand image, such as the one shown in FIG. 56E, and specified by [CURRENT FINGER=1, NEXT FINGER=3, NOTE DIFFERENCE=−5], is selected and displayed. This hand image shows that the middle finger f3 now reaches G3 note with the thumb f1 corresponding to the C3 note. In this manner, a sequence of hand images are presented showing, fingering motion of turning over in a motion picture manner.

Figure 57A:
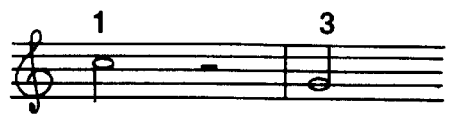
Figure 57B:
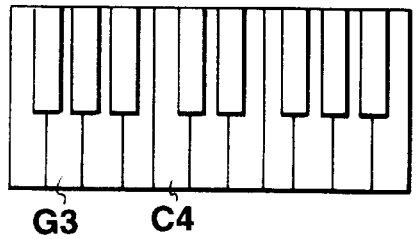
Figure 57C:
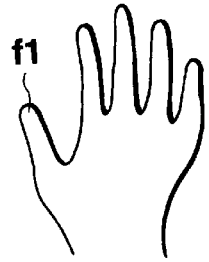
Figure 57D:
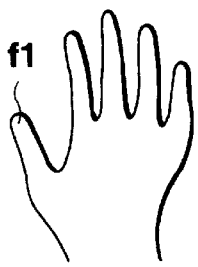
Figure 57E:
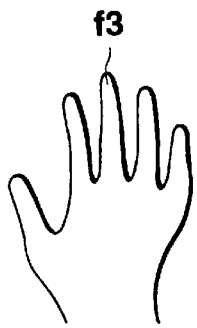

In FIGS. 57A–E, a fingered music staff (see FIG. 57A) indicates that a first half note of C4 is played with the thumb, a half rest follows and a next half note of G3 is played with the middle finger. In this case, the key difference BIAS is given by BIAS=(3−1)×2=4, as shown in FIG. 57B. NOTE DIFFERENCE between current and next notes is given (NEXT NOTE)−CURRENT NOTE)=−5. Since the half rest is long enough, SHIFT FLAG is set to "ON".

When DISPLAY COUNTER=0, a hand image specified by [CURRENT FINGER=1, NEXT FINGER=3, NOTE DIFFERENCE=5] is selected and displayed in such a manner that the thumb image f1 corresponds to C4 note and the little finger image generally corresponds to G4 note. When DISPLAY COUNTER=1 (second quarter), a similar hand image is selected and displayed but the display position is shifted left (see FIG. 57C) such that the thumb image f1 corresponds to the boundary between G3 and A3 notes. The display position of the thumb is given by C4+(−5−4)×⅓= C4−3. When DISPLAY COUNTER=2 (third quarter), a similar or identical hand image is selected and displayed but the display position is shifted further to the left (see FIG. 57D) so that the thumb image f1 corresponds to F3 note. The display position of the thumb is given by C4+(−5−4)×⅔= C4×6. When DISPLAY COUNTER=3 (fourth or last quarter), a similar or identical hand image is selected and displayed but the display position is further shifted to the left (see FIG. 57E) so that the thumb image f1 corresponds to D3 note and the middle finger corresponds to G3 note to play it. The display position of the thumb is given by C4+(−5−4)× ⅔=C4−9. In this manner, a sequence of hand images are successively selected and displayed, showing a moving hand from current note play position to the next note play position.

The sixth embodiment of the invention has been described. Various modifications and applications can be made in accordance with the invention.

For example, in the argument table of FIG. 53, the column of the third argument "(NEXT NOTE)−(CURRENT NOTE)" does not contain information on type of key (white or black) of current and next notes. The third argument (note difference) may be modified to carry such key type information, as W-8B which reads: next note is a white key, next note is lower than current note by eight semitones and current note is a black key. In this connection, each hand image in the hand image storage is specified or addressed by the modified third argument in combination with first and second arguments (current and next fingers).

The hand image storage may be modified such that each hand image data corresponds to a different one of combinations of two or more notes sequentially played and fingers to be used to play the notes. To this end, arguments of "PREVIOUS FINGER" and "(CURRENT NOTE)− (PREVIOUS NOTE)" may be added to the argument table of FIG. 53, as fourth and fifth arguments.

The hand image storage may be divided into a depth-two storage and a depth-three. The depth-two storage stores a plurality of hand image data each addressable by the first to third arguments whereas the depth-three storage stores a plurality of hand image data each addressable by the first to fifth arguments. For a performer playing current and next notes, the depth-two storage is used as hand image data source to present a motion picture of fingering action of a hand that starts with natural position. The natural position of a hand or "a hand in natural position" refers to a hand naturally positioned on a keyboard. The term "hand position" refers to a relative position of the fingers of a hand. The depth-three storage may be used to present a motion picture of fingering action of a hand that starts with an unnatural position (e.g., finger-spread position or form) at a current note-on time. The unnatural position of a hand depends on previous note and finger since it is still affected by the play of the previous note.

Features of the sixth embodiment can readily be applied to navigation display control for music performance played on a music instrument other than a keyboard, such as a stringed instrument. This is accomplished by changing contents of stored hand image data so as to accord with fingering operations on an applied instrument.

In the case of a guitar, for example, a player uses the left hand to finger on a finger board. For left hand music navigation, each stored left hand image data corresponds to a different one of combinations of old and new notes and old and new fingers and represents a left hand image in fingering action on a finger board. For right hand music navigation, each stored right hand image data corresponds to a different one of combinations of old and new notes and old and new fingers and represents a right hand image in fingering (e.g., plucking, strumming) action on string(s). Each note and finger record in stored music data contains information on string and fret position to be played and a finger to be used, since, in a guitar, a note is specified by which string and fret is played. In operation, guitar music navigation control provides visual and animated image presentation of fingering of the left hand and/or right hand in playing notes on a guitar in accordance with features of the sixth embodiment.

Seventh embodiment of the invention is now described by reference to FIGS. 58–61.

In accordance with the seventh embodiment, an apparatus for controlling navigation display for music formance employs a manually operable tempo selector. A tempo data entered from the tempo selector is used to compute an actual duration of a rest time between a note off event and next note on event. The actual duration of the rest time is compared with a preselected time value. If the actual real time duration is shorter than the preselect time value, the apparatus examines possibility of turning over or under of a current finger in the manner as described with respect the fifth embodiment of the invention. If the actual rest time duration is longer than the predetermined time value, the apparatus finds no need of turning over or under of the finger. Therefore, the apparatus can provide visual hand image presentation that varies depending on actual tempo of music.

Figure 58:
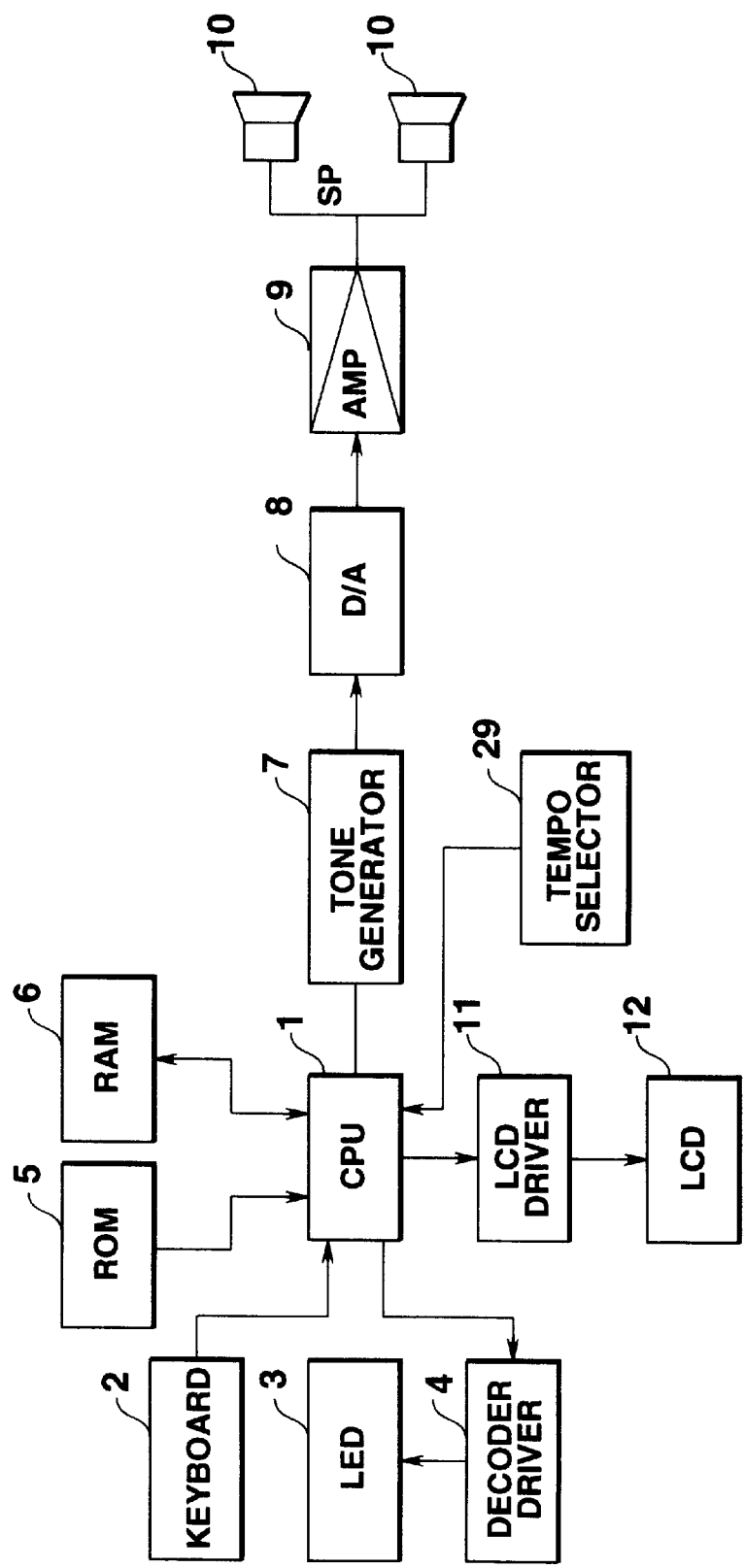
FIG. 58 is a block diagram of a hardware arrangement of an electronic music instrument in accordance with the seventh embodiment of the invention.
Figure 59:
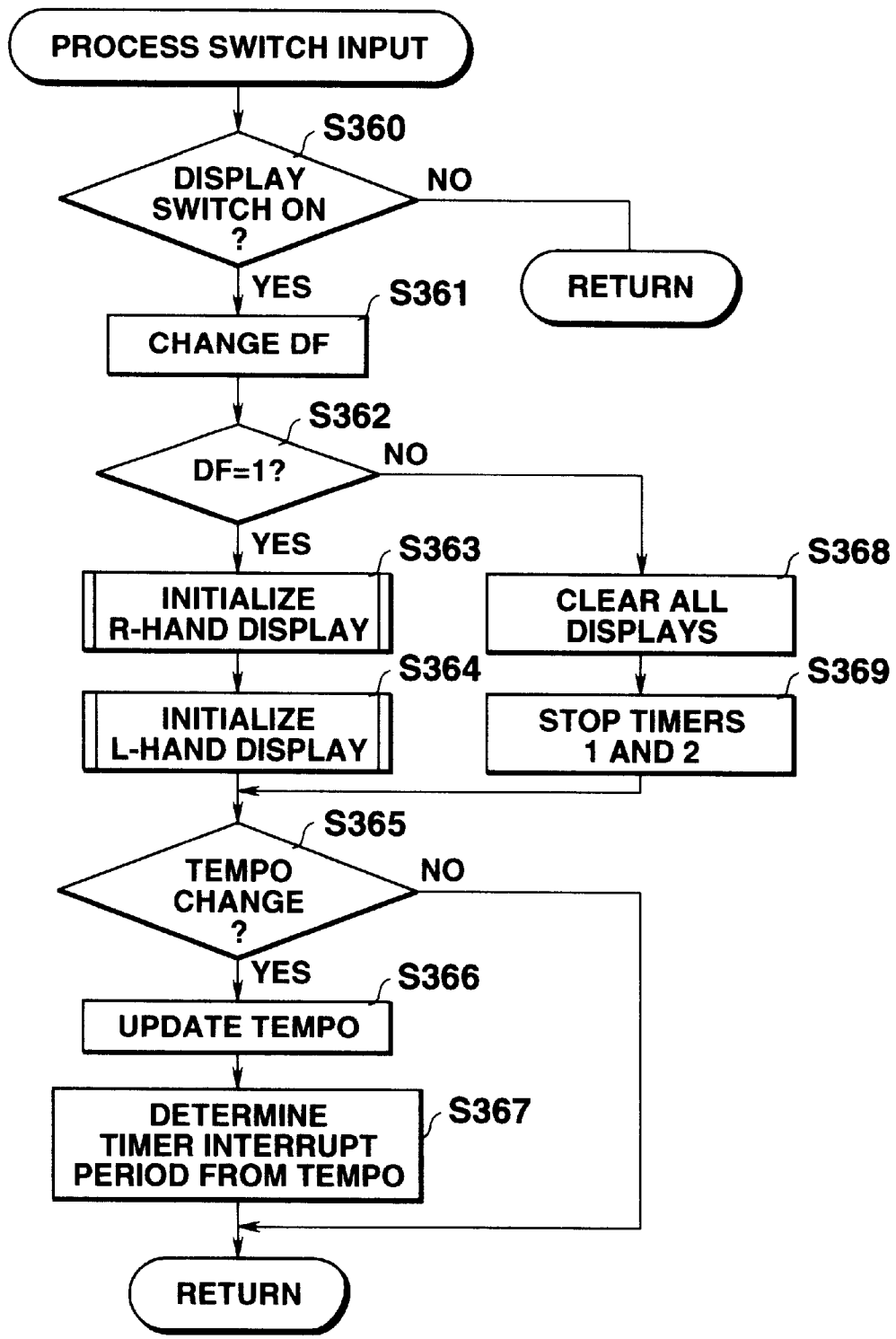
FIG. 59 is a flowchart of process switch inputs routine in accordance with the seventh embodiment of the invention.

FIG. 58 shows a system arrangement of an electronic keyboard instrument in accordance with the seventh embodiment.

Components 1–12 in FIG. 58 are essentially identical with corresponding components 1–12 shown in FIG. 1. Thus, no further description is required.

In accordance with the seventh embodiment, a tempo selector 29 is provided. The tempo selector 29 may be implementend either up and down switches for incrementing or decrementing the actual tempo of music, or ten keys for entering desired tempo data.

Fingered music data stored and used in the seventh embodiment may be identical with that shown in FIG. 40.

FIG. 55 is a flowchart of a process switch inputs routine.

Step S360 checks if the display switch (not shown in FIG. 58) is operated. If this is the case, step S361 changes the display flag DF. Step S362 checks if DF=1. In the affirmative, step S363 initializes right hand display and step S364 initializes left hand display. If step S362 finds DF=0, step S368 clears all displays and step S369 stops timers when 1 and 2.

After step S364 or S369, step S365 checks if the tempo selector 29 has selected a new tempo. If this is the case, step S366 updates tempo data TEMPO accordingly. Then, step S367 determines a timer interrupt period from the updated tempo data TEMPO.

Figure 60:
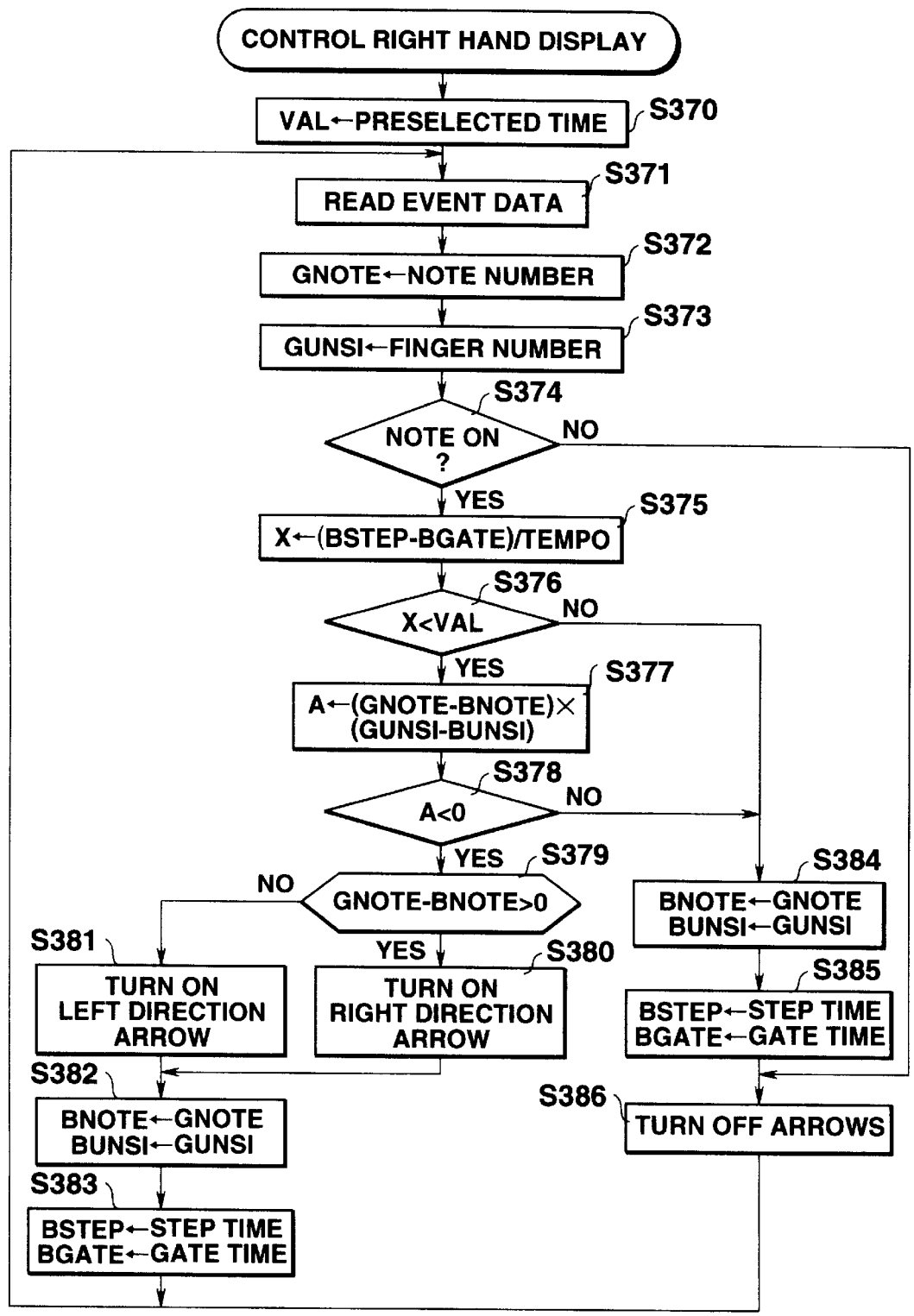
FIG. 60 is a flowchart of a control right hand display routine in accordance with the seventh embodiment of the invention.
Figure 61:
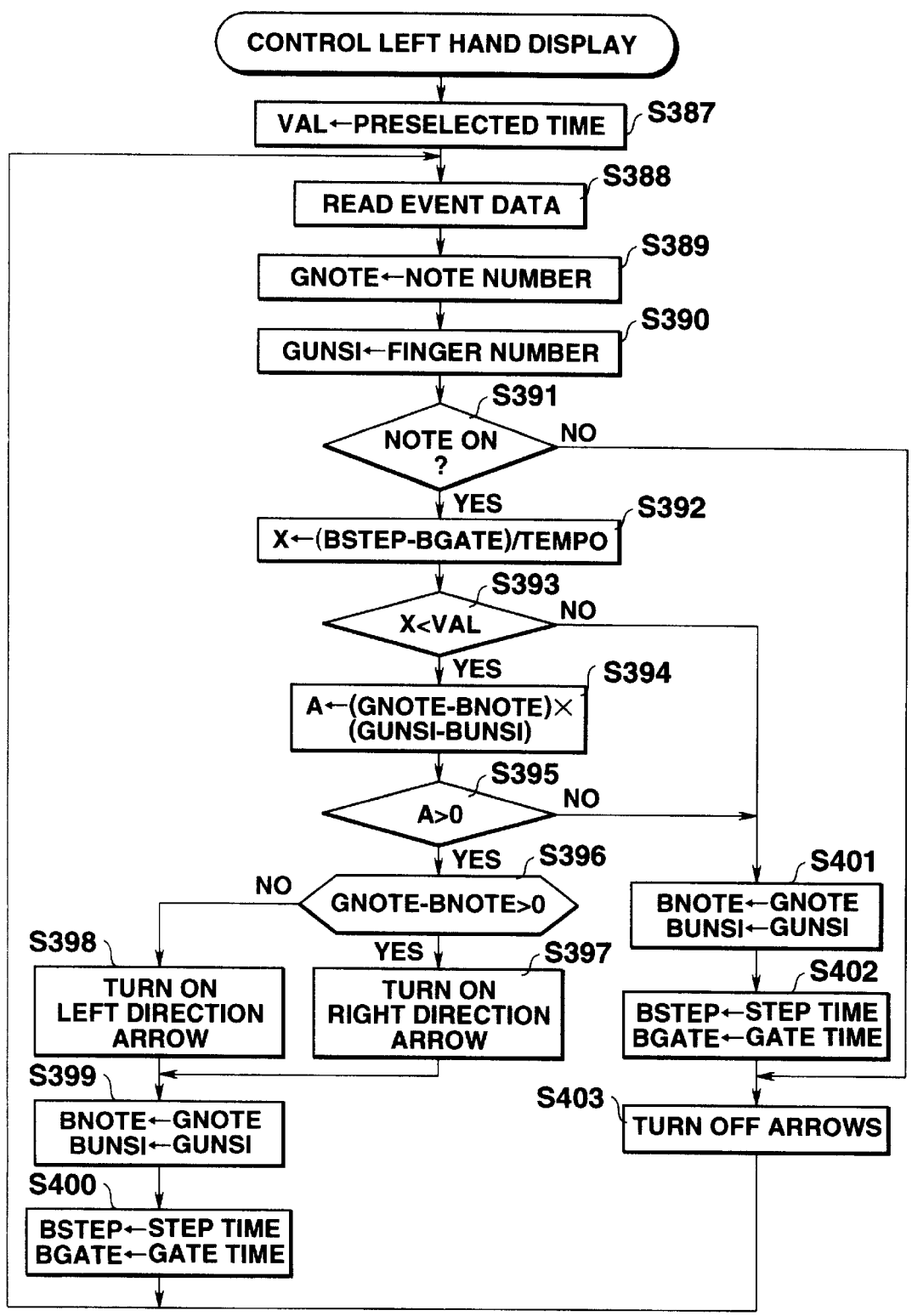
FIG. 61 is a flowchart of a control left hand display routine in accordance with the seventh embodiment of the invention.

FIG. 60 shows a flowchart of a control right hand display routine in accordance with the seventh embodiment. FIG. 61 shows a flowchart of a control left hand display routine in accordance with the seventh embodiment.

In FIG. 60, steps S370–S375 and S376–S386 are identical with steps S263–S267 and S269–S279 in FIG. 41 so that no further description is required.

In accordance with the seventh embodiment, step S375 computes the actual rest time duration X by:

X=(BSTEP−BGATE)/TEMPO, in which BSTEP indicates a time interval between a previous note on and a current note on, and TEMPO indicates a desired tempo selected by the tempo selector 29.

The actual rest time duration X is compared with predetermined time value VAL (step S269). If X<VAL, the control right hand display routine examines possibility of turning over or under of a current finger (S377, S378) in the manner described with respect to the fifth embodiment. IF X≧VAL, the routine finds no need of turning over or under of the current finger.

In FIG. 61, step S387–S393 and S395–S403 are identical with steps S370–S376 and S378–S386 in the control right hand display routine of FIG. 60.

Step S392 computes the actual rest time duration X in the same manner as step S375.

The control left hand display routine executes step S395 to check if A>0 whereas the control right hand display routine executes the step S378 to check if A<0, in view of symmetry of the right and left hands.

Stored fingered music data might possibly exclude note duration data BGATE. In such a case, time difference data BSTEP between note on events may be converted to actual time difference using tempo data TEMPO. To this end, step S375, S392 is modified to compute the actual time difference X between note on events by:

X=BSTEP/TEMPO.

If the actual time difference X is longer than the predetermined time value VAL, the control right hand display routine finds no need of turning over or under of a current finger. On the other hand, if the actual time difference X between adjacent note on events is shorter than the predetermined time value, the routine examines possibility of turning over or under of the finger in the manner described.

This concludes the detailed description. The shown and described embodiments are only illustrative. Various modifications can be made by a person having ordinal skill in the art within the invention. Therefore, the scope of the invention is solely limited by appended claims.

What is claimed is:

1. An apparatus for controlling navigation display for music performance, comprising:
   music piece storage means for storing data of a music piece, said data including information on musical notes and fingers to be played on a keyboard instrument;
   turning over and under providing means for providing information on turning over and under of fingers based on said data of the music piece;
   image storage means for storing a plurality of image data of a hand including an indication of turning over and under of fingers; and
   display control means operative when said music piece is played for successively selecting appropriate ones of said plurality of image data based on said provided information on turning over and under of fingers to thereby provide a visual image indication of an appropriate turning over and under of fingers.

2. The apparatus of claim 1 wherein said turning over and under providing means comprises storage means for storing said information on turning over and under of fingers so as to correspond to said data of the music piece.

3. The apparatus of claim 1 wherein said turning over and under providing means comprises determining means for selectively determining a turning over or under of a current finger from information on current and previous notes and current and previous fingers included in said data of the music piece.

4. The apparatus of claim 1 wherein said plurality of image data includes image data of a hand in which a finger that turns over or under is distinctly indicated.

5. The apparatus of claim 1 wherein said plurality of image data includes image data of a hand in which a finger that turns over or under is distinctly indicated and an arrow showing a direction of turning over or under of said finger is marked.

6. The apparatus of claim 1 wherein said data of the music piece comprises a succession of event data each including data items of a note, a finger to be used to play said note, a duration of said note, and a note-on time.

7. The apparatus of claim 1 wherein said turning over and under providing means comprises determining means for selectively determining an absence of a turning over or under of a current finger from current and previous note and finger data included in said data of the music piece when a rest time longer than a predetermined time value exists between a previous note-off time and a current note-on time.

8. The apparatus of claim 1 wherein said turning over and under providing means comprises determining means for selectively determining an absence of a turning over or under of a current finger from current and previous note and finger data included in said data of the music piece when a time difference between a previous note-on time and a current note-on time is longer than a predetermined time value.

9. The apparatus of claim 7 further comprising tempo selecting means for selecting a tempo of said music piece, and wherein said determining means comprises:

computing means for computing said rest time in accordance with said selected tempo; and comparing means for comparing said computed rest time with said predetermined time value.

10. The apparatus of claim 8 further comprising tempo selecting means for selecting a tempo of said music piece, and wherein said determining means comprises:

computing means for computing said time difference in accordance with said selected tempo; and comparing means for comparing said computed time difference with said predetermined time value.

11. An apparatus for controlling navigation display for music performance played on a keyboard instrument, comprising:

fingered music storage means for storing data of a music piece, said data comprising a succession of note records each including information on a note, a finger to be used to play said notes and a presence or absence of turning over or under of said finger;

image storage means for storing a plurality of image data of a hand each corresponding to a different one of combinations of a finger and a presence or absence of turning over or under of said finger, in which such image data that corresponds to a combination of a finger and the presence of turning over or under of said finger includes a visual image indication of turning over or under of said finger;

music reading means operative when said music piece is played for reading said succession of note records from said fingered music storage means at a tempo of play of said music piece; and image selecting and outputting means for selecting an appropriate one of said plurality of image data based on a note record currently read by said music reading means, and for outputting said selected image data for display control to thereby provide a visual image indication of an appropriate turning over and under of fingers.

12. An apparatus for controlling navigation display for music performance played on a keyboard instrument, comprising:

fingered music storage means for storing data of a music piece, said data comprising a succession of note records each including information on a note and a finger to be used to play said note;

image storage means for storing a plurality of image data of a hand each corresponding to a different one of combinations of a finger and a presence or absence of turning over or under of said finger, in which such image data that corresponds to a combination of a finger and the presence of turning over or under of said finger includes a visual image indication of turning over or under of said finger;

music reading means operative when said music piece is played for reading said succession of note records from said fingered music storage means at a tempo of play of said music piece;

determining means for determining a presence or absence of turning over or under of a current finger from current and previous note records read by said music reading means; and image selecting and outputting means for selecting an appropriate one of said plurality of image data based on a current note record read by said music reading means and determined results from said determining means, and for outputting said selected image data for display control to thereby provide a visual image indication of an appropriate turning over and under of fingers.

13. An apparatus for controlling navigation display for music performance, comprising:

music piece storage means for storing data of a music piece, said data including information on musical notes and fingers to be played on a keyboard instrument;

turning over and under providing means for providing information on turning over and under of fingers based on said data of the music piece; and display control signal producing means operative when said music piece is played for successively producing display control signals based on said provided information, said display control signals being convertible to a sequence of visual images including an indication of turning over and under of fingers.

14. An apparatus for controlling navigation display for music performance played on a keyboard instrument, comprising:

fingered music storage means for storing data of a music piece, said data comprising a succession of note records each including information on a note, a finger to be used to play said note, and a presence or absence of turning over or under of said finger;

music reading means operative when said music piece is played for reading said succession of note records from said fingered music storage means at a tempo of play of said music piece; and display control signal producing means for producing a display control signal based on a note record currently read by said music reading means;

said display control signal being convertible to a visual image including an indication of a presence or absence of turning over or under of a current finger.

15. An apparatus for controlling navigation display for music performance played on a keyboard instrument, comprising:

fingered music storage means for storing data of a music piece, said data comprising a succession of note records each including information on a note and a finger to be used to play said note;

music reading means operative when said music piece is played for reading said succession of note records from said fingered music storage means at a tempo of play of said music piece;

determining means for determining a presence or absence of turning over or under of a current finger from current and previous note records read by said music reading means; and display control signal producing means for producing a display control signal based on a current note record read by said music reading means and determined results from said determining means, said display control signal convertible to a visual image including an indication of the presence or absence of turning over or under of the current finger.

16. An apparatus for controlling navigation display for music performance played on a keyboard instrument, comprising:

fingered music storage means for storing data of a music piece, said data comprising a succession of note records each including information on a note and a finger to be used to play said note;

image storage means for storing a plurality of image data of a hand in fingering action, each corresponding to a different one of combinations of current and next notes and current and next fingers;

music reading means for reading said succession of note records from said fingered music storage means at a tempo of play of said music piece; and display control means for selecting appropriate image data from said plurality of image data based on current and next note records read by said music reading means, and for outputting the selected image data for display control to thereby provide a visual image presentation of fingering of a hand in playing notes, including an indication of an appropriate turning over and under of fingers.

17. An apparatus for controlling navigation display for music performance played on a music instrument, comprising:

fingered music storage means for storing data of a music piece, said data comprising a succession of note records each including information on a note and a finger to be used to play said note;

image storage means for storing a plurality of image data of a hand in fingering action, each image data corresponding to a different one of combinations of notes and fingers, said notes including current and next notes and said fingers including current and next fingers;

music reading means for reading said succession of note records from said fingered music storage means at a tempo of play of said music piece; and display control means responsive to said music reading means for selecting appropriate image data from said plurality of image data based on note records including current and next note records read by said music reading means, and for outputting the selected image data for display control to thereby provide a visual image presentation of an appropriate fingering of a hand in playing notes.

18. The apparatus of claim 17 wherein each of said note records includes:

as said information on the note, a note-on or note-off command, a note number and a note-on or note-off time, and as said information on the finger, a finger number indicative of a finger to be used to play the note on a keyboard instrument.

19. The apparatus of claim 17 wherein said image storage means comprises look-up table means for storing said plurality of image data in a manner such that each is addressable by arguments of the current and next fingers and a note difference of a next note from a current note.

20. The apparatus of claim 17 wherein said display control means comprises means for selecting, as said appropriate image data, a sequence of image data representative of fingering motion of a hand in playing the current and next notes in a motion picture manner.

21. The apparatus of claim 17 wherein said display control means comprises:

segmenting means for dividing a time interval between a current note time and a next note time into a plurality of time segments;

selecting means for selecting, for each of said plurality of time segments, appropriate image data of a hand from said plurality of image data based on the current and next notes and the current and next fingers; and outputting means for outputting the selected image data at a time of each time segment to thereby provide a visual and animated image presentation of fingering motion in playing notes.

22. An apparatus for controlling navigation display for music performance played on a keyboard instrument, comprising:

fingered music storage means for storing data of a music piece, said data comprising a succession of note records each including information on a note and a finger to be used to play said note;

image storage means for storing a plurality of image data of a hand in action of playing a note, each corresponding to a different one of combinations of current and next notes and current and next fingers;

music reading means for reading said succession of note records from said fingered music storage means at a tempo of play of said music piece;

determining means responsive to said music reading means for determining whether a rest time longer than a predetermined time value exists between a current note-off time and a next note-on time;

image selecting means operative when said determining means determines that said rest time is longer than the predetermined time value for selecting image data of a hand from said plurality of image data based on a current note record read by said music reading means; and image shifting and outputting means for shifting a display position of said selected image data, and for outputting resultant image data to thereby provide a visual image presentation of a moving hand.

23. A method for controlling navigation display for music performance, comprising the steps of:

storing data of a music piece, said data including information on musical notes and fingers to be played on a keyboard instrument;

providing means for providing information on turning over and under of fingers based on said data of the music piece;

storing a plurality of image data of a hand including an indication of turning over and under of fingers; and successively selecting appropriate ones of said plurality of image data based on said provided information on turning over and under of fingers, when said music piece is played, to thereby provide a visual image indication of an appropriate turning over and under of fingers.

24. A method for controlling navigation display for music performance played on a keyboard instrument, comprising the steps of:

storing data of a music piece, said data comprising a succession of note records each including information on a note, a finger to be used to play said note and a presence or absence of turning over or under of said finger;

storing a plurality of image data of a hand each corresponding to a different one of combinations of a finger and a presence or absence of turning over or under of said finger, in which such image data that corresponds to a combination of a finger and the presence of turning over or under of said finger includes a visual image indication of turning over or under of said finger;

reading said succession of note records at a tempo of play of said music piece; and selecting an appropriate one of said plurality of image data based on a note record currently read, and outputting said selected image data for display control to thereby provide a visual image indication of an appropriate turning over and under of fingers.

25. A method for controlling navigation display for music performance played on a keyboard instrument, comprising the steps of:

storing data of a music piece, said data comprising a succession of note records each including information on a note and a finger to be used to play said note;

storing a plurality of image data of a hand each corresponding to a different one of combinations of a finger and a presence or absence of turning over or under of said finger, in which such image data that corresponds to a combination of a finger and the presence of turning over or under of said finger includes a visual image indication of turning over or under of said finger;

reading said succession of note records at a tempo of play of said music piece;

determining a presence or absence of turning over or under of a current finger from current and previous note records read; and selecting an appropriate one of said plurality of image data based on a current note record read and determined results, and outputting said selected image data for display control to thereby provide a visual image indication of an appropriate turning over and under of fingers.

26. A method for controlling navigation display for music performance played on a keyboard instrument, comprising the steps of:

storing data of a music piece, said data comprising a succession of note records each including information on a note and a finger to be used to play said note;

storing a plurality of image data of a hand in fingering action, each corresponding to a different one of combinations of current and next notes and current and next fingers;

reading said succession of note records at a tempo of play of said music piece; and selecting appropriate image data from said plurality of image data based on current and next note records read, and outputting the selected image data for display control to thereby provide a visual image presentation of fingering of a hand in playing notes, including an indication of an appropriate turning over and under of fingers.

27. A method for controlling navigation display for music performance played on a keyboard instrument, comprising the steps of:

storing data of a music piece, said data comprising a succession of note records each including information on a note and a finger to be used to play said note;

storing a plurality of image data of a hand in fingering action, of playing a note, each corresponding to a different one of combinations of current and next notes and current and next fingers;

reading said succession of note records at a tempo of play of said music piece;

determining whether a rest time longer than a predetermined time value exists between a current note-off time and a next note-on time;

selecting image data of a hand from said plurality of image data based on a current note record read when said rest time is determined to be longer than the predetermined time value; and shifting a display position of said selected image data, and outputting resultant image data to thereby provide a visual image presentation of a moving hand.

28. A storage medium on which a program is recorded, said program being readable by a computer for controlling the computer to function as:

music piece storage means for storing data of a music piece, said data including information on musical notes and fingers to be played on a keyboard instrument;

turning over and under providing means for providing information on turning over and under of fingers based on said data of the music piece;

image storage means for storing a plurality of image data of a hand including an indication of turning over and under of fingers; and display control means operative when said music piece is played for successively selecting appropriate ones of said plurality of image data based on said provided information on turning over and under of fingers to thereby provide a visual image indication of an appropriate turning over and under of fingers.

29. A storage medium on which a program is recorded, said program being readable by a computer for controlling the computer to function as:

fingered music storage means for storing data of a music piece, said data comprising a succession of note records each including information on a note, a finger to be used to play said note, and a presence or absence of turning over or under of said finger;

image storage means for storing a plurality of image data of a hand each corresponding to a different one of combinations of a finger and a presence or absence of turning over or under of said finger, in which such image data that corresponds to a combination of a finger and the presence of turning over or under of said finger includes a visual image indication of turning over or under of said finger;

music reading means operative when said music piece is played for reading said succession of note records from said fingered music storage means at a tempo of play of said music piece; and image selecting and outputting means for selecting an appropriate one of said plurality of image data based on a note record currently read by said music reading means, and for outputting said selected image data for display control to thereby provide a visual image indication of an appropriate turning over and under of fingers.

30. A storage medium on which a program is recorded, said program being readable by a computer for controlling the computer to function as:

fingered music storage means for storing data of a music piece, said data comprising a succession of note records each including information on a note and a finger to be used to play said note;

image storage means for storing a plurality of image data of a hand each corresponding to a different one of combinations of a finger and a presence or absence of turning over or under of said finger, in which such image data that corresponds to a combination of a finger and the presence of turning over or under of said finger includes a visual image indication of turning over or under of said finger;

music reading means operative when said music piece is played for reading said succession of note records from said fingered music storage means at a tempo of play of said music piece;

determining means for determining a presence or absence of turning over or under of a current finger from current and previous note records read by said music reading means; and image selecting and outputting means for selecting an appropriate one of said plurality of image data based on a current note record read by said music reading means and determined results from said determining means, and for outputting said selected image data for display control to thereby provide a visual image indication of an appropriate turning over and under of fingers.

31. A storage medium on which a program is recorded said program being readable by a computer for controlling the computer to function as:

fingered music storage means for storing data of a music piece, said data comprising a succession of note records each including information on a note and a finger to be used to play said note;

image storage means for storing a plurality of image data of a in fingering action, each corresponding to a different one of combinations of current and next notes and current and next fingers;

music reading means for reading said succession of note records from said fingered music storage means at a tempo of play of said music piece; and display control means for selecting appropriate image data from said plurality of image data based on current and previous note records read by said music reading means, and for outputting the selected image data for display control to thereby provide a visual image presentation of fingering of a hand in playing notes, including an indication of an appropriate turning over and under of fingers.

32. A storage medium on which a program is recorded, said program being readable by a computer for controlling the computer to function as:

fingered music storage means for storing data of a music piece, said data comprising a succession of note records each including information on a note and a finger to be used to play said note;

image storage means for storing a plurality of image data of a hand in fingering action, each corresponding to a different one of combinations of current and next notes and current and next fingers;

music reading means for reading said succession of note records from said fingered music storage means at a tempo of play of said music piece;

determining means responsive to said music reading means for determining whether a rest time longer than a predetermined time value exists between a current note-off time and a next note-on time;

image selecting means operative when said determining means determines that said rest time longer than the predetermined time value for selecting image data of a hand from said plurality of image data based on a current note record read by said music reading means; and image shifting and outputting means for shifting a display position of said selected image data and for outputting resultant image data to thereby provide a visual image presentation of a moving hand.

* * * * *